United States Patent
Koga

(10) Patent No.: US 11,953,662 B2
(45) Date of Patent: Apr. 9, 2024

(54) ZOOM LENS, LENS BARREL, AND IMAGE-CAPTURING DEVICE

(71) Applicant: Ricoh Company, Ltd., Tokyo (JP)

(72) Inventor: Tomoya Koga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 435 days.

(21) Appl. No.: 17/157,031

(22) Filed: Jan. 25, 2021

(65) Prior Publication Data
US 2021/0278642 A1 Sep. 9, 2021

(30) Foreign Application Priority Data

Feb. 28, 2020 (JP) ................................. 2020-033480
Jan. 12, 2021 (JP) ................................. 2021-002696

(51) Int. Cl.
*G02B 15/14* (2006.01)
*G02B 15/16* (2006.01)

(52) U.S. Cl.
CPC ..... *G02B 15/1431* (2019.08); *G02B 15/1451* (2019.08); *G02B 15/1461* (2019.08); *G02B 15/16* (2013.01)

(58) Field of Classification Search
CPC ............... G02B 15/1431; G02B 15/16; G02B 15/1461; G02B 15/143; G02B 15/145101; G02B 15/14505; G02B 15/14509; G02B 15/145113; G02B 15/145117; G02B 15/145121; G02B 15/145125; G02B 15/145129

See application file for complete search history.

(56) References Cited

U.S. PATENT DOCUMENTS

| | | | |
|---|---|---|---|
| 2015/0043087 A1 | 2/2015 | Sudoh | |
| 2017/0192212 A1* | 7/2017 | Yamamoto | G02B 15/20 |
| 2020/0057250 A1* | 2/2020 | Noda | G02B 5/005 |
| 2020/0174269 A1 | 6/2020 | Sudoh et al. | |

(Continued)

FOREIGN PATENT DOCUMENTS

| | | |
|---|---|---|
| JP | 2014-145801 | 8/2014 |
| JP | 2015-036691 | 2/2015 |
| JP | 2017-015930 | 1/2017 |

(Continued)

*Primary Examiner* — George G. King
*Assistant Examiner* — Anna Elizabeth Smith
(74) *Attorney, Agent, or Firm* — XSENSUS LLP

(57) ABSTRACT

A zoom lens includes a first lens group having positive refractive power, a second lens group having negative refractive power, and a rear group. The second lens group consists of a second sub-first lens group having positive or negative power, and a second sub-second lens group having negative power. The second sub-second lens group consists of, sequentially from the object side toward the image: a positive second-first lens component; a negative second-second lens component; and a negative second-third lens component. During zooming from a short focal length end to a long focal length end, a distance between the first lens group and the second lens group increases, and a distance between the second lens group and the rear group decreases. A part of the second lens group is movable in a direction perpendicular to an optical axis during correction of image blurring.

20 Claims, 57 Drawing Sheets

(56) References Cited

U.S. PATENT DOCUMENTS

2020/0292797 A1    9/2020  Nakayama et al.
2020/0301117 A1    9/2020  Koga

FOREIGN PATENT DOCUMENTS

| | | | |
|---|---|---|---|
| JP | 6292898 B2 | * | 3/2018 |
| JP | 2020-086357 | | 6/2020 |
| JP | 2020-154286 | | 9/2020 |
| JP | 2020-154288 | | 9/2020 |
| KR | 20160107805 A | * | 10/2016 |

* cited by examiner

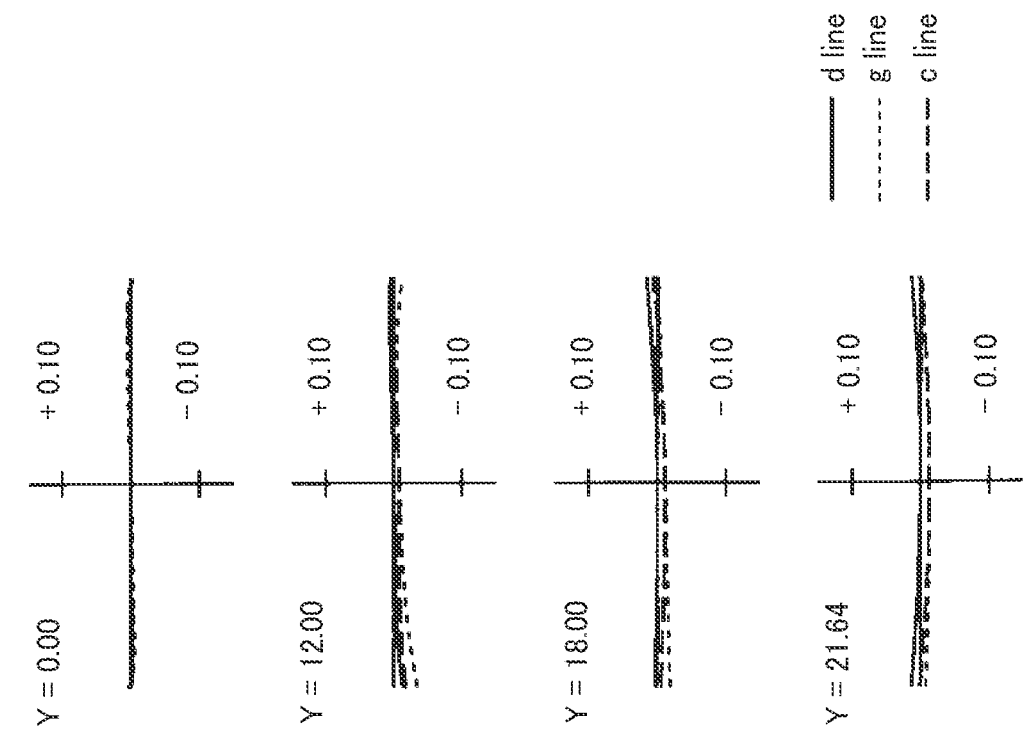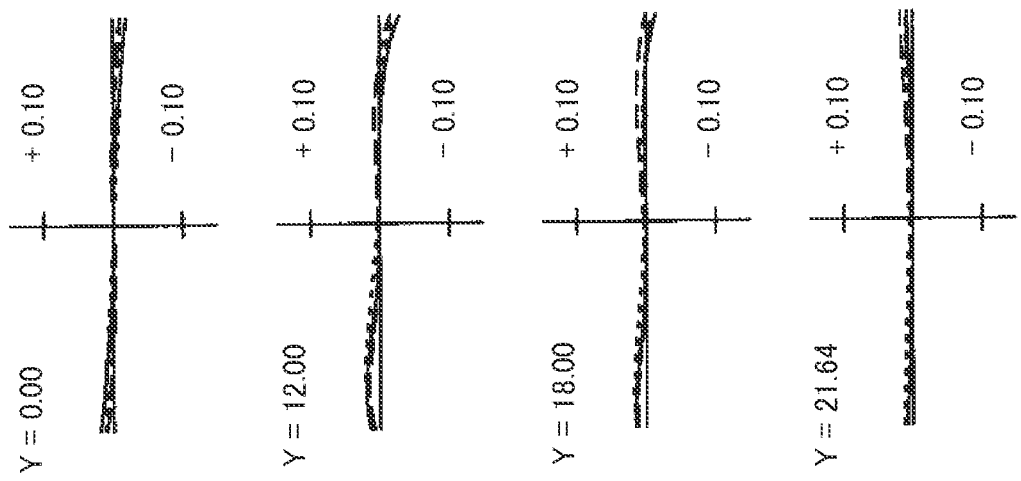

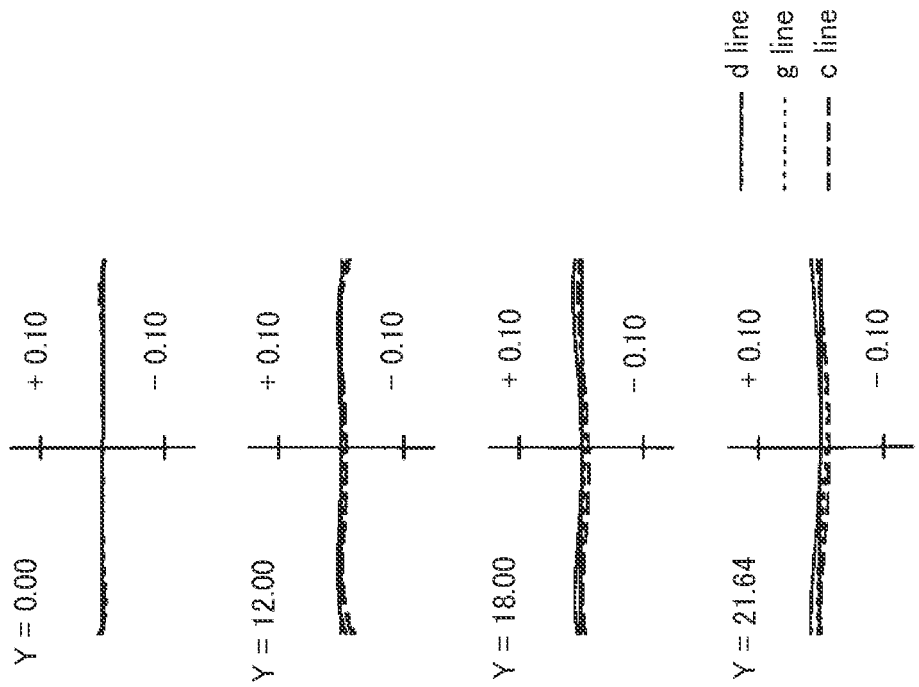
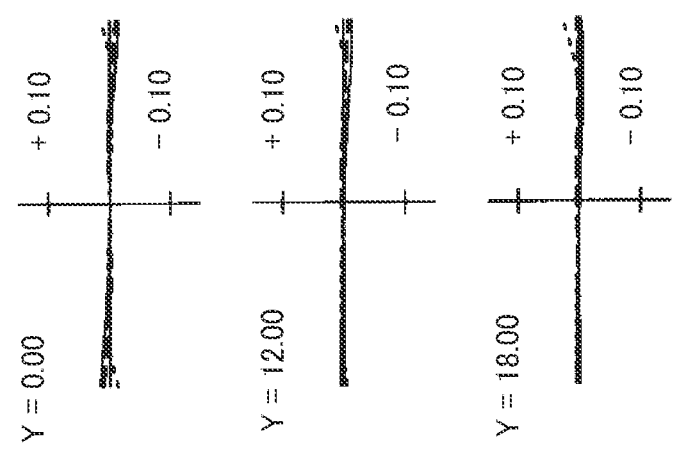

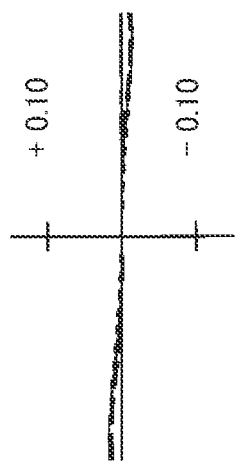
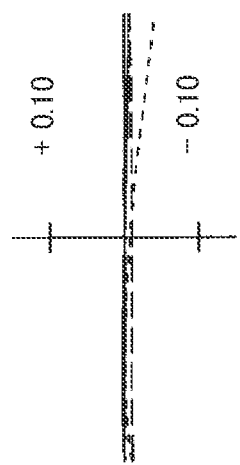
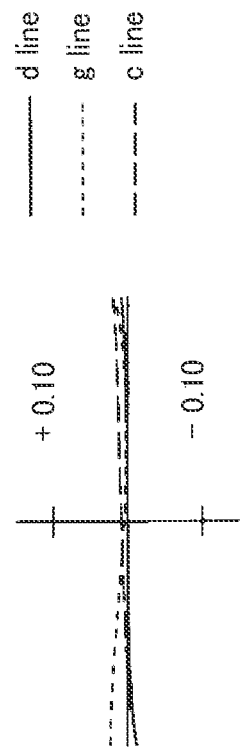
FIG. 59
FIG. 60

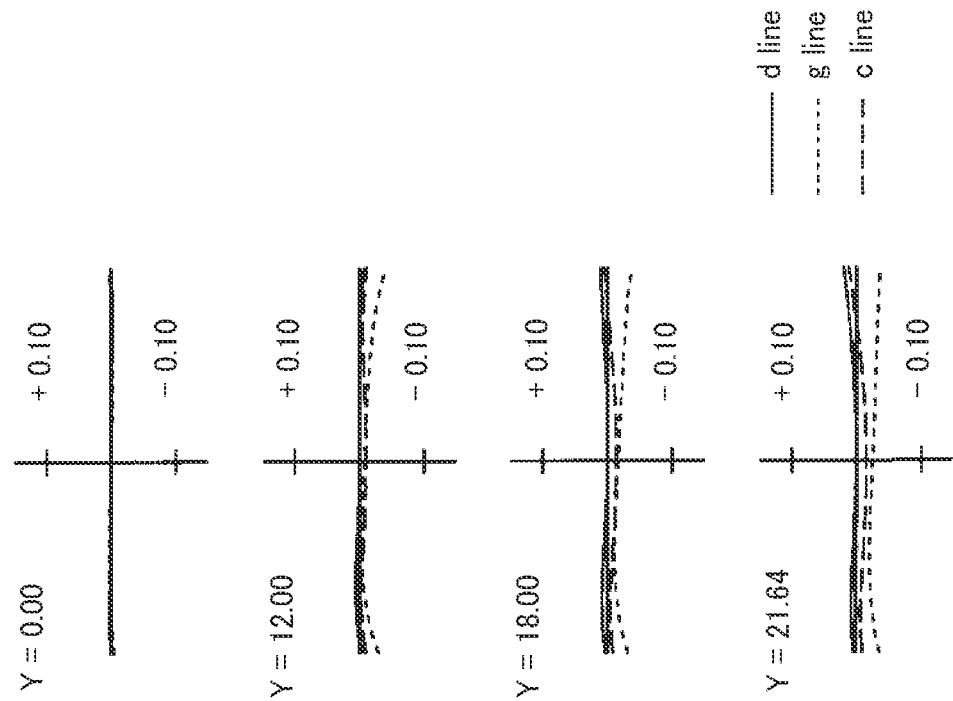
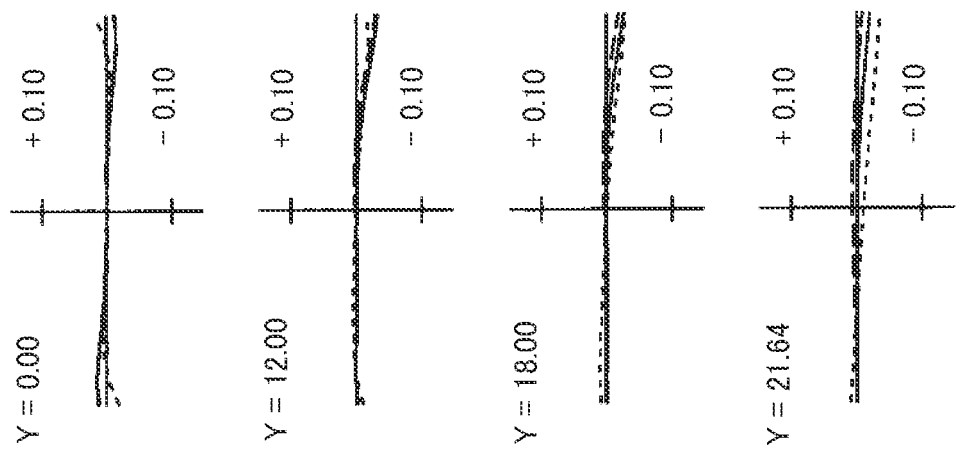

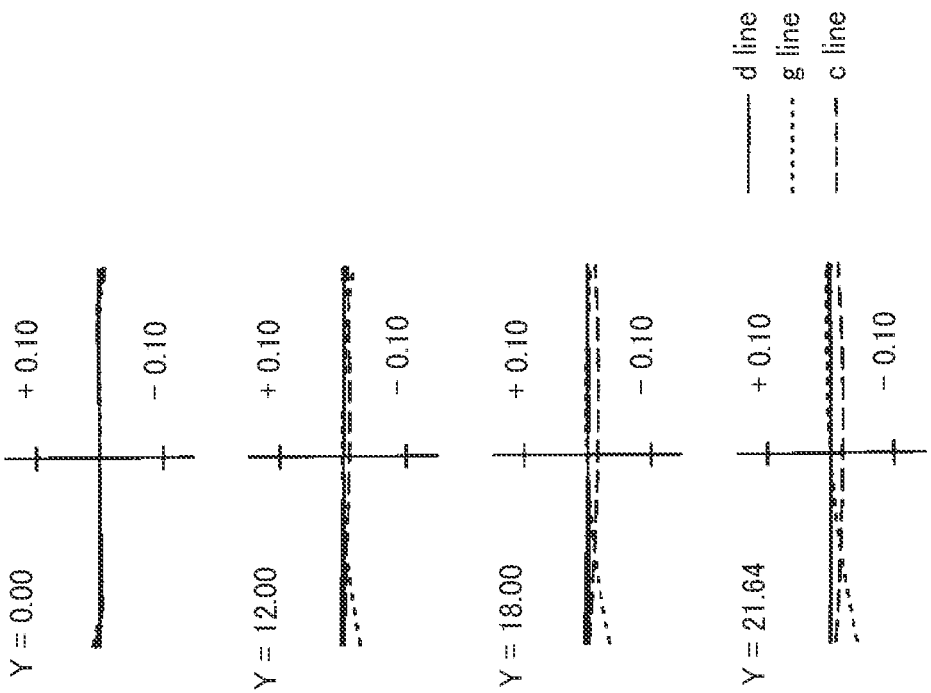
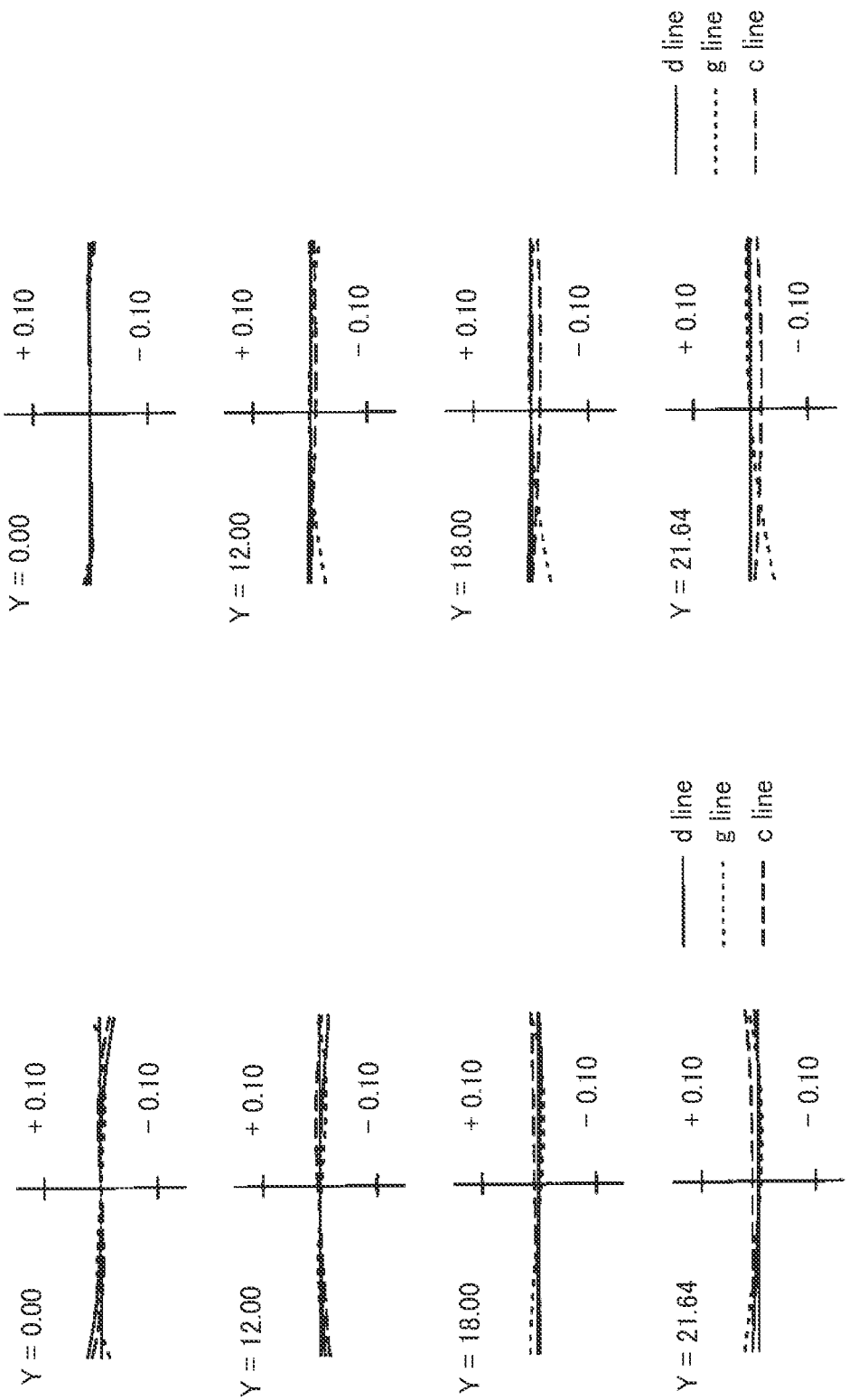

ZOOM LENS, LENS BARREL, AND IMAGE-CAPTURING DEVICE

CROSS-REFERENCE TO RELATED APPLICATIONS

This patent application is based on and claims priority pursuant to 35 U.S.C. § 119(a) to Japanese Patent Application No. 2020-033480, filed on Feb. 28, 2020 and Japanese Patent Application No. 2021-002696, filed on Jan. 12, 2021 in the Japan Patent Office, the entire disclosures of which are hereby incorporated by reference herein.

BACKGROUND

Technical Field

Embodiments of the present disclosure relate to a zoom lens, a lens barrel incorporating the zoom lens, and an image-capturing device incorporating the lens barrel for use in camcorders, digital still cameras, surveillance cameras, film cameras, and broadcast cameras, for example.

Related Art

Conventionally, various types of zoom lenses for digital cameras are known.

In particular, a positive-lead zoom lens that includes a positive group, a negative group, and a rear group disposed in that order from the object side toward the image side is used as a zoom lens whose focal length on the telephoto side is extended. Such a zoom lens system needs to be a compact zoom lens having high optical performance over the entire zoom and capturing-distance range.

When the camera is hand-held for shooting, as the exposure time become longer, the captured image might be more likely blurred due to camera shake.

To avoid such a situation, a vibration-isolating lens is desired to correct blurring of an image. It is widely known that when a camera shake occurs at the same angle, the degree of blurring increases as the focal length increases. Preferably, image blurring is corrected at a higher degree at a long focal length end (a telephoto end).

SUMMARY

In one aspect of this disclosure, there is described a zoom lens includes, sequentially from an object side toward an image side: a first lens group having positive refractive power; a second lens group having negative refractive power; and a rear group. The second lens group consists of, sequentially from the object side toward the image side: a second sub-first lens group having positive or negative power; and a second sub-second lens group having negative power. The second sub-second lens group consists of, sequentially from the object side toward the image: a positive second-first lens component; a negative second-second lens component; and a negative second-third lens component. During zooming from a short focal length end to a long focal length end, a distance between the first lens group and the second lens group increases, and a distance between the second lens group and the rear group decreases. A part of the second lens group is movable in a direction perpendicular to an optical axis during correction of image blurring.

In another aspect of this disclosure, there is disclosed a lens barrel including the above-described zoom lens.

In even another aspect of this disclosure, there is disclosed an image-capturing device comprising the above-described zoom lens.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 29 is a collection of lateral aberration diagrams of the zoom lens in FIG. 3 focused on infinity at the short focal length end;

FIG. 30 is a collection of lateral aberration diagrams of the zoom lens in FIG. 3 focused on infinity at the long focal length end;

FIG. 43 is a collection of lateral aberration diagrams of the zoom lens in FIG. 5 focused on infinity at the short focal length end;

FIG. 44 is a collection of lateral aberration diagrams of the zoom lens in FIG. 5 focused on infinity at the long focal length end;

FIG. 59 is a collection of lateral aberration diagrams of the zoom lens in FIG. 7 focused on infinity at the short focal length end during the operation of vibration isolation;

FIG. 60 is a collection of lateral aberration diagrams of the zoom lens in FIG. 7 focused on infinity at the long focal length end during the operation of vibration isolation;

FIG. 71 is a collection of lateral aberration diagrams of the zoom lens in FIG. 9 focused on infinity at the short focal length end;

FIG. 72 is a collection of lateral aberration diagrams of the zoom lens in FIG. 9 focused on infinity at the long focal length end;

FIG. 85 is a collection of lateral aberration diagrams of the zoom lens in FIG. 11 focused on infinity at the short focal length end;

FIG. 86 is a collection of lateral aberration diagrams of the zoom lens in FIG. 11 focused on infinity at the long focal length end;

Figure 1:
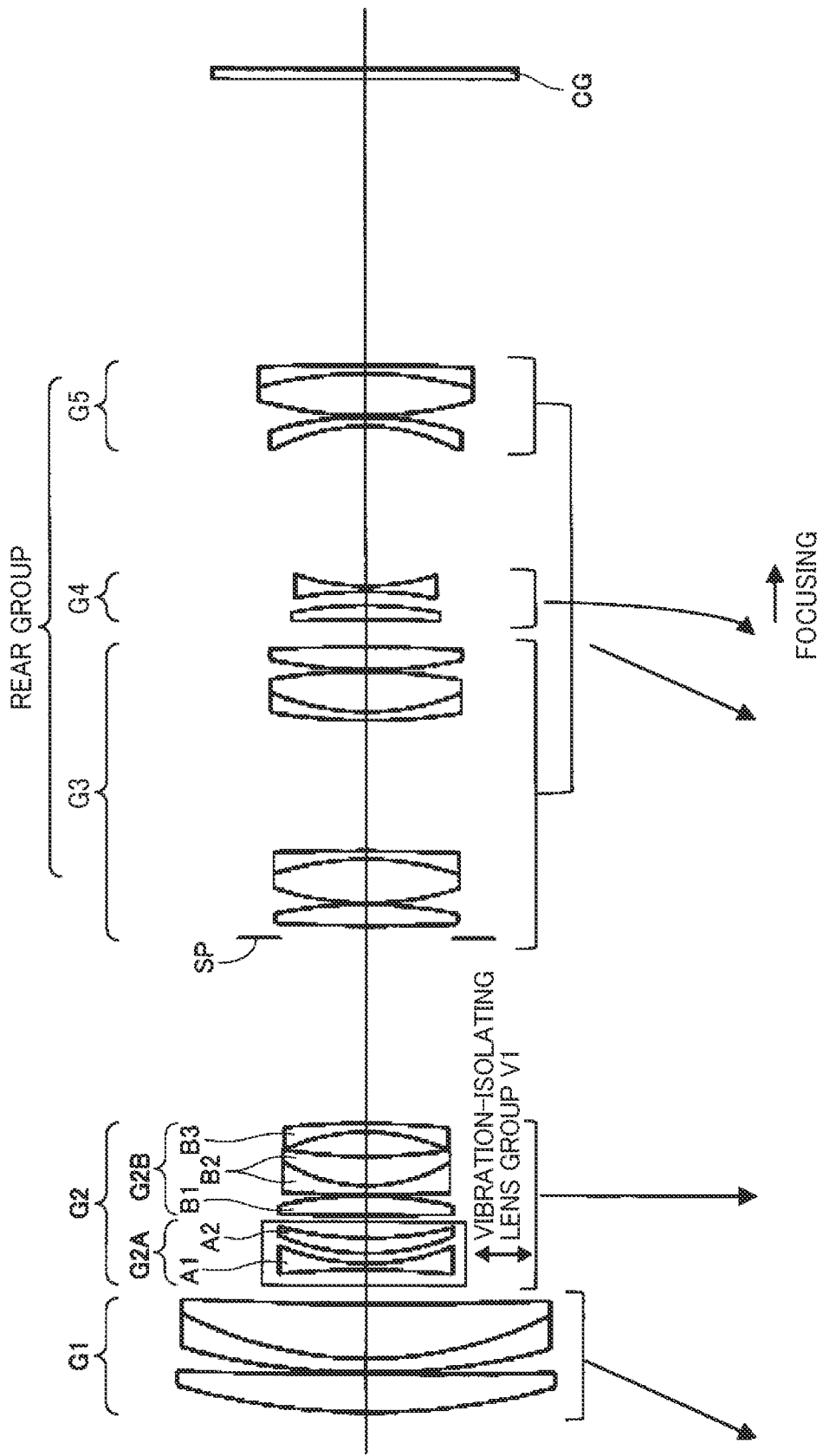
FIG. 1 is an illustration of trajectories and a configuration of a vibration-isolating lens group of a zoom lens according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure provide a zoom lens, a lens barrel incorporating the zoom lens, and an imaging device incorporating the lens barrel, which enables a successful correction of various aberrations and reduces aberration due to decentering of a lens during the operation of vibration isolation.

In the present disclosure, some terms are defined as follows. The term "lens component" in the present disclosure means a lens having only two refracting surfaces (i.e., an object-side surface and an image-side surface) in contact with air in the regular optical path, and for example, a single lens or a cemented lens corresponds to the lens component. In the following description, the term "lens component" simply refers to a single lens, and when the "lens component" refers to a cemented lens, the description is given as such.

The term "vibration isolation" refers to preventing blurring of an image, which might be caused by vibration of a lens during the capturing of an image, and the term "vibration-isolating lens" refers to a lens to be driven to prevent the blurring of an image due to vibration of a lens during the capturing of an image.

Further, in the following description, a negative sub-lens group-A G2A is referred to also as a second sub-first lens group, and a negative second sub-lens group-B G2B is referred to also as a second sub-second lens group. A positive lens component B1, a negative lens component B2, and a negative lens component B3 are referred to also as a positive second-first lens component, a negative second-second lens component, and a negative second-third lens component, respectively. A second sub-lens group-AR is referred to also as a second sub-third lens group.

FIG. 1 is an illustration of trajectories and the configuration of a vibration-isolating lens group V1 of a zoom lens according to a first numerical example of the present disclosure.

The zoom lens according to the first numerical example consists of, sequentially from the object side toward the image side, a first lens group G1 having positive refractive power, a second lens group G2 having negative refractive power, a third lens group G3 having positive refractive power, a fourth lens group G4 having negative refractive power, and a fifth lens group G5 having positive refractive power.

The third lens group G3, the fourth lens group G4, and the fifth lens group G5 form a rear group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the fifth lens group G5 and an imaging plane.

The plane-parallel plate CG is assumed to work as, for example, a low pass filter, an infrared cut-off filter, and a cover glass of an image sensor.

During the zooming from the short focal length end to the long focal length end, the first lens group G1, the third lens group G3, the fourth lens group G4, and the fifth lens group G5 are moved (extended) toward an object to be observed, relative to the image plane, whereas the second lens group G2 is stationary relative to the image plane.

The third lens group G3 and the fifth lens group G5 are moved along the same trajectory, and a mechanical structure is simplified. Zooming is performed by changing a distance between adjacent lens groups.

The second lens group G2 consists of a negative second sub-lens group-A G2A (a second sub-first lens group having negative power) and a negative second sub-lens group-B G2B (a second sub-second lens group having negative power) arranged in that order from the object side toward the image side.

The second sub-lens group-A G2A consists of a negative lens component A1 and a positive lens component A2 arranged in that order from the object side toward the image side. The second sub-lens group-AR corresponds to the second sub-lens group-A G2A.

The second sub-lens group-B G2B consists of a positive lens component B1 (positive second-first lens component), a negative lens component B2 (negative second-second lens component), and a negative lens component B3 (negative second-third lens component) in that order from the object side toward the image side.

The negative lens component B2 consists of a cemented lens formed of a negative lens and a positive lens, which are arranged in that order from the object side toward the image side.

The second sub-lens group-A G2A as a whole forms a vibration-isolating lens group V1 that is movable in a direction perpendicular to the optical axis to enable image blurring to be corrected during the correction of image blurring.

The fourth lens group G4 is a focus lens group that is movable toward an image to be formed, during a change in focus from the infinity to a short distance.

Figure 2:
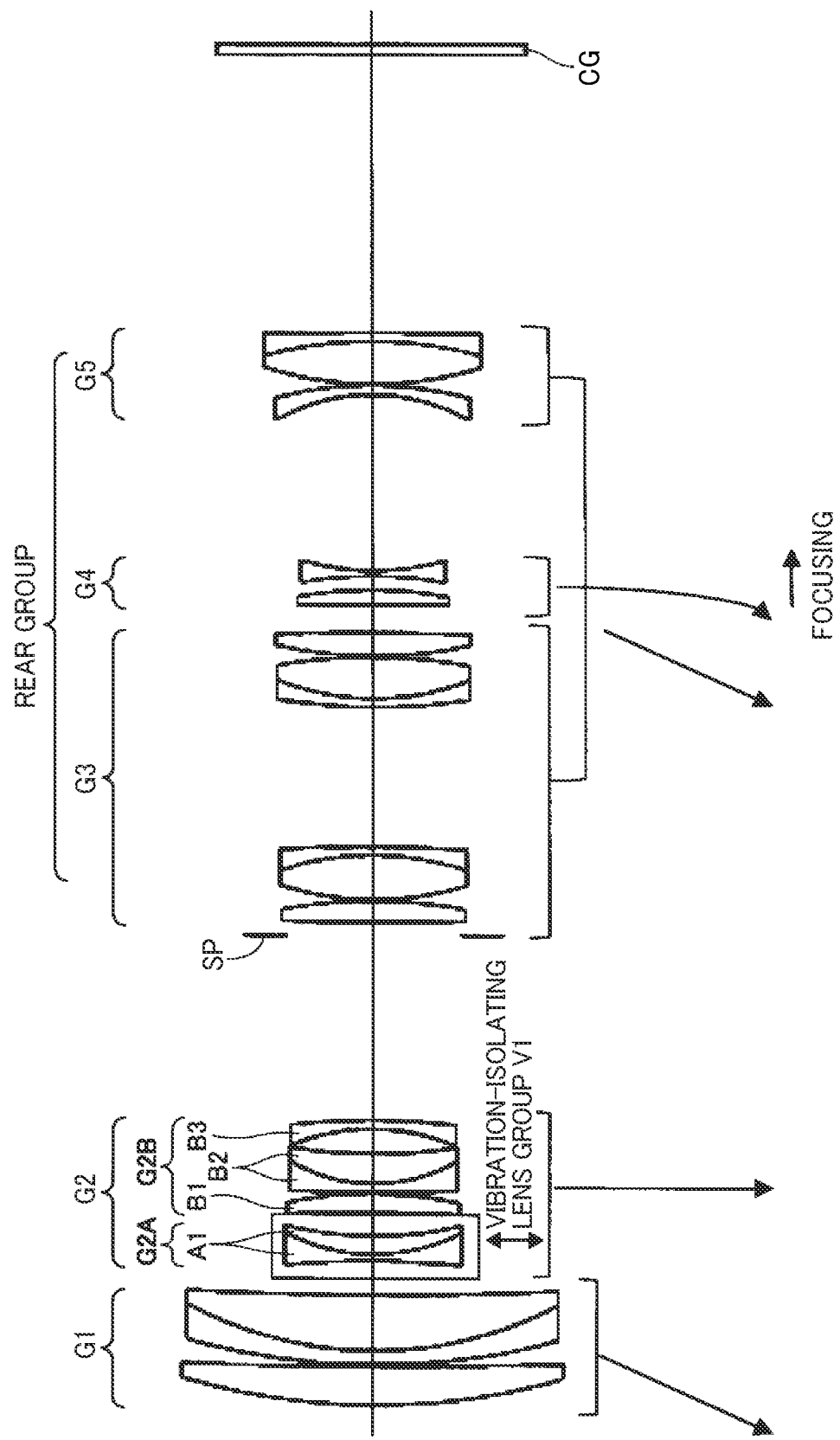
FIG. 2 is an illustration of trajectories and a configuration of a vibration-isolating lens group of a zoom lens according to another embodiment of the present disclosure.

FIG. 2 is an illustration of trajectories and the configuration of a vibration-isolating lens group V1 of a zoom lens according to a second numerical example of the present disclosure.

The zoom lens according to the second numerical example consists of, sequentially from the object side toward the image side, a first lens group G1 having positive refractive power, a second lens group G2 having negative refractive power, a third lens group G3 having positive refractive power, a fourth lens group G4 having negative refractive power, and a fifth lens group G5 having negative refractive power.

The third lens group G3, the fourth lens group G4, and the fifth lens group G5 form a rear group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the fifth lens group G5 and the image plane.

During the zooming from the short focal length end to the long focal length end, the first lens group G1, the third lens group G3, the fourth lens group G4, and the fifth lens group G5 are moved (extended) toward an object to be observed, relative to the image plane, whereas the second lens group G2 is stationary relative to the image plane.

The third lens group G3 and the fifth lens group G5 are moved along the same trajectory, and a mechanical structure is simplified. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A1 that is a cemented lens formed of a negative lens and a positive lens, which are arranged in that order from the object side toward the image side.

The second sub-lens group-AR corresponds to the second sub-lens group-A G2A.

The second sub-lens group-B G2B consists of a positive lens component B1, a negative lens component B2, and a negative lens component B3 arranged in that order from the object side toward the image side.

The negative lens component B2 consists of a cemented lens formed of a negative lens and a positive lens, which are arranged in that order from the object side toward the image side.

The second sub-lens group-A G2A as a whole forms a vibration-isolating lens group V1 that is movable in a direction perpendicular to the optical axis to enable image blurring to be corrected during the correction of image blurring.

The fourth lens group G4 is a focus lens group that is movable toward an image to be formed, during a change in focus from infinity to a short distance.

Figure 3:
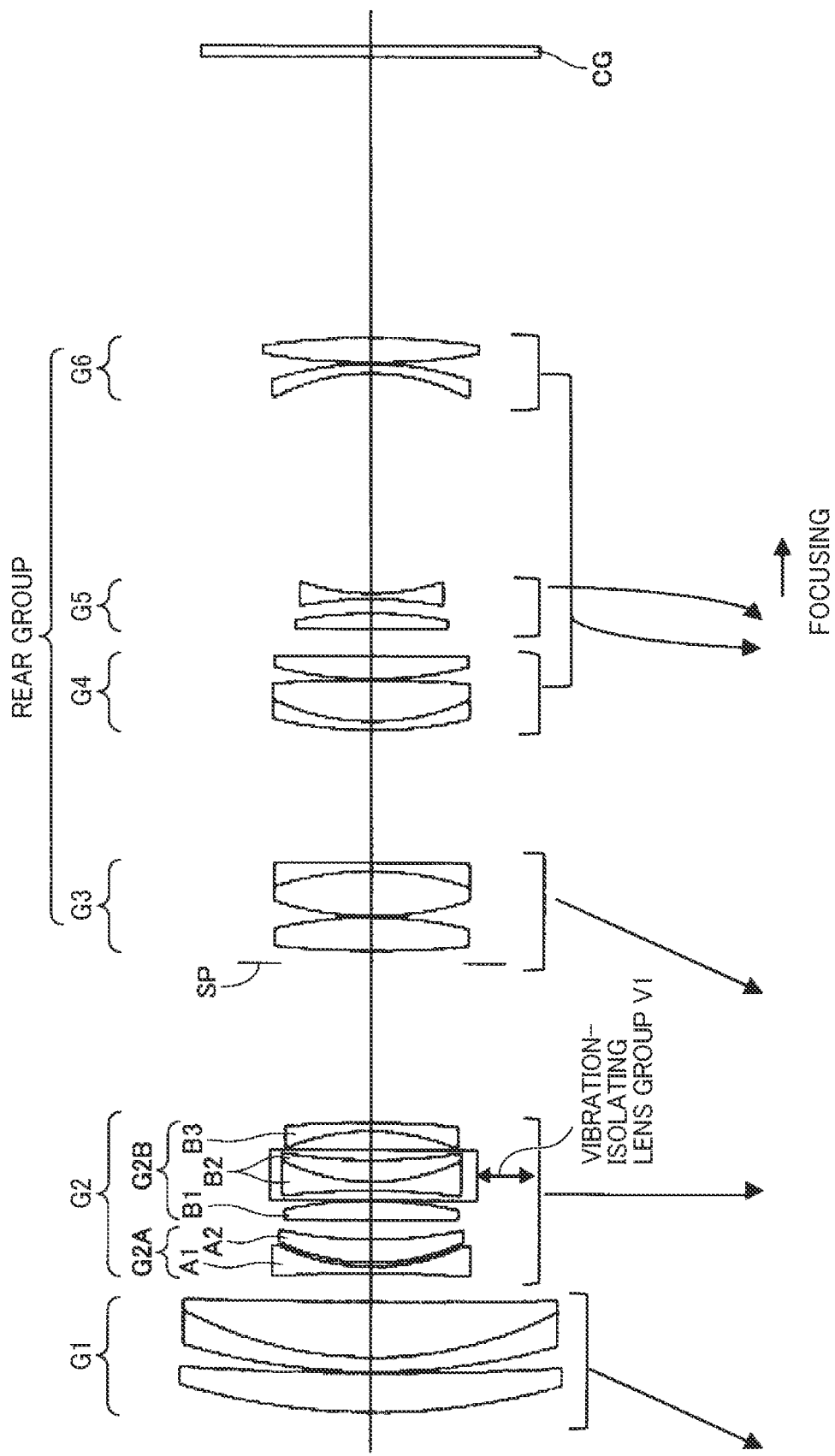
FIG. 3 is an illustration of trajectories and a configuration of a vibration-isolating lens group of a zoom lens according to another embodiment of the present disclosure.

FIG. 3 is an illustration of trajectories and the configuration of a vibration-isolating lens group V1 of a zoom lens according to a third numerical example of the present disclosure.

The zoom lens according to the third numerical example consists of, sequentially from the object side toward the image side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power.

The third lens group G3, the fourth lens group G4, the fifth lens group G5, and the sixth lens group G6 form a rear group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the sixth lens group G6 and the image plane.

During the zooming from the short focal length end to the long focal length end, the first lens group G1, the third lens group G3, the fourth lens group G4, the fifth lens group G5, and the sixth lens group G6 are moved (extended) toward an object to be observed, relative to the image plane, whereas the second lens group G2 is stationary relative to the image plane.

The fourth lens group G4 and the sixth lens group G6 are moved along the same trajectory, and a mechanical structure is simplified. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side. The second sub-lens group-AR corresponds to the second sub-lens group-A G2A.

The second sub-lens group-B G2B consists of a positive lens component B1, a negative lens component B2, and a negative lens component B3 arranged in that order from the object side toward the image side. The negative lens component B2 consists of a cemented lens formed of a negative lens and a positive lens, which are arranged in that order from the object side toward the image side.

The negative lens component B2 of the second sub-lens group-B G2B forms a vibration-isolating lens group V1 that is movable in a direction perpendicular to the optical axis to enable image blurring to be corrected during the correction of image blurring.

The fifth lens group G5 is a focus lens group that is movable toward an image to be formed, during a change in focus from infinity to a short distance.

Figure 4:
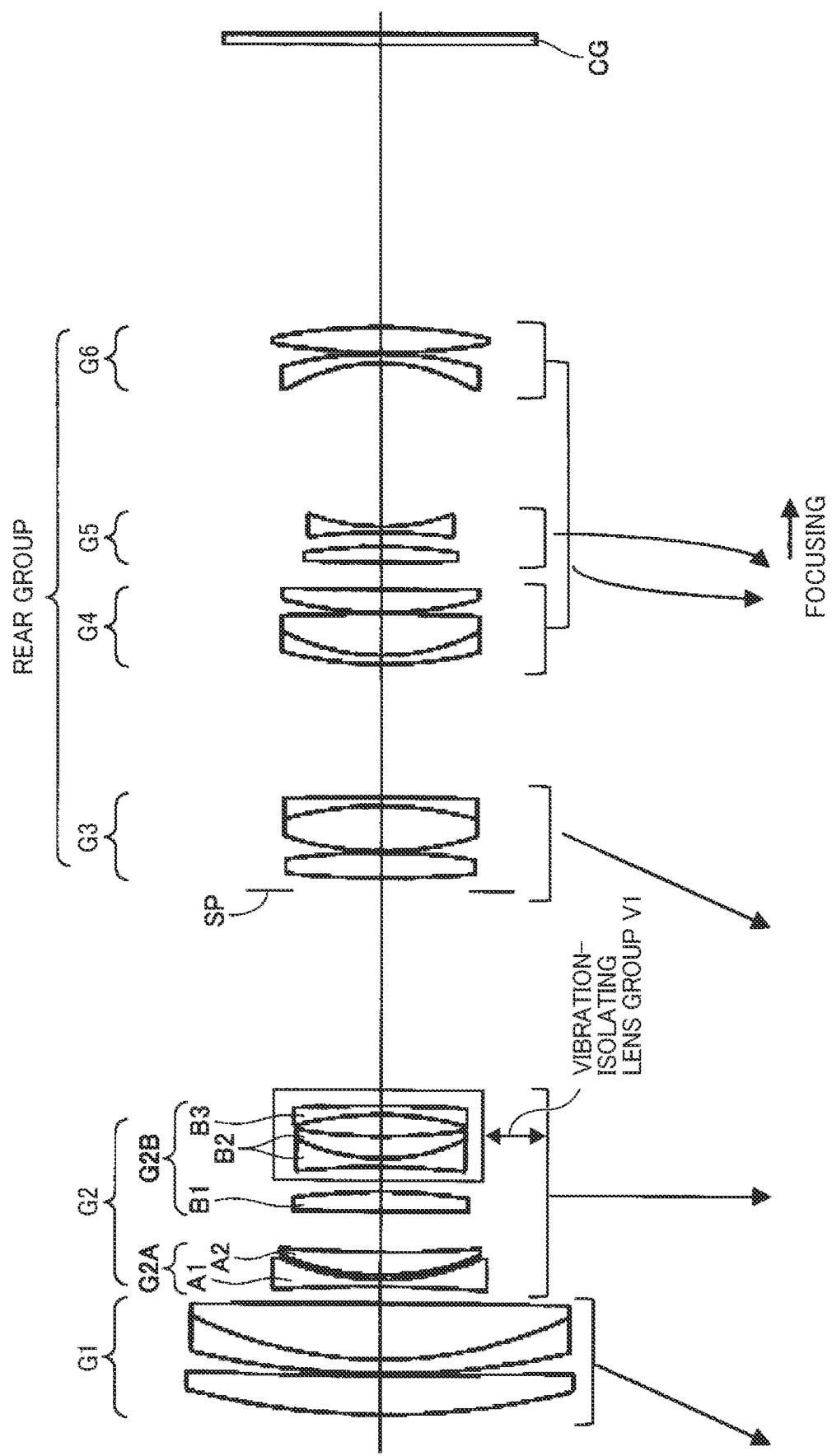
FIG. 4 is an illustration of trajectories and a configuration of a vibration-isolating lens group of a zoom lens according to another embodiment of the present disclosure.

FIG. 4 is an illustration of trajectories and the configuration of a vibration-isolating lens group V1 of a zoom lens according to a fourth numerical example of the present disclosure.

The zoom lens according to the fourth numerical example consists of, sequentially from the object side toward the image side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having negative refractive power.

The third lens group G3, the fourth lens group G4, the fifth lens group G5, and the sixth lens group G6 form a rear group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the sixth lens group G6 and the image plane.

During the zooming from the short focal length end to the long focal length end, the first lens group G1, the third lens group G3, the fourth lens group G4, the fifth lens group G5, and the sixth lens group G6 are moved (extended) toward an object to be observed, relative to the image plane, whereas the second lens group G2 is stationary relative to the image plane.

The fourth lens group G4 and the sixth lens group G6 are moved along the same trajectory, and a mechanical structure is simplified. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side. The second sub-lens group-AR corresponds to the second sub-lens group-A G2A.

The second sub-lens group-B G2B consists of a positive lens component B1, a negative lens component B2, and a negative lens component B3 arranged in that order from the object side toward the image side. The negative lens component B2 consists of a cemented lens formed of a negative lens and a positive lens, which are arranged in that order from the object side toward the image side.

The negative lens component B2 and the negative lens component B3 of the second sub-lens group-B G2B form a vibration-isolating lens group V1 that is movable in a direction perpendicular to the optical axis to enable image blurring to be corrected during the correction of image blurring.

The fifth lens group G5 is a focus lens group that is movable toward an image to be formed, during a change in focus from infinity to a short distance.

Figure 5:
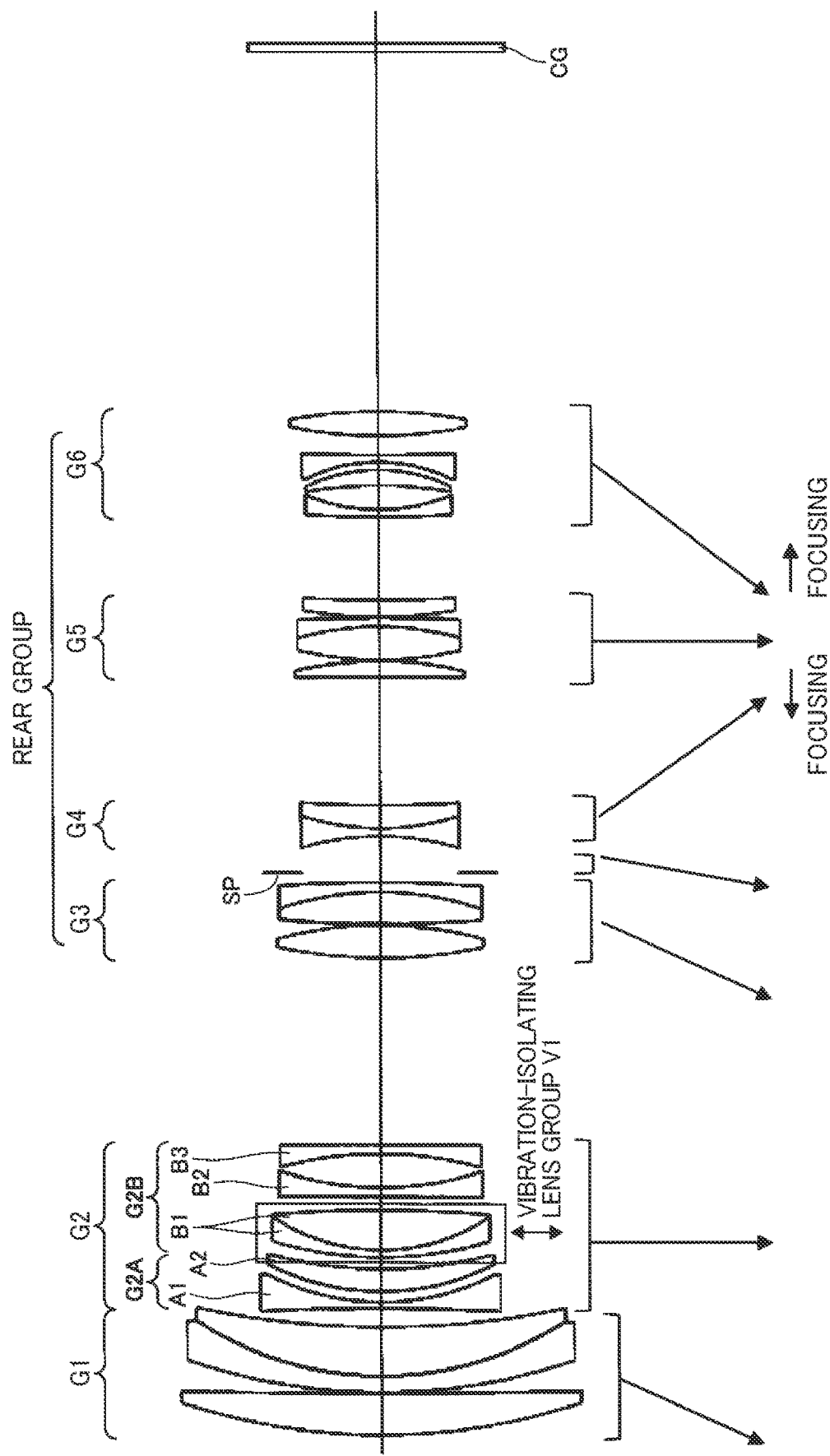
FIG. 5 is an illustration of trajectories and a configuration of a vibration-isolating lens group of a zoom lens according to another embodiment of the present disclosure.

FIG. 5 is an illustration of trajectories and the configuration of a vibration-isolating lens group V1 of a zoom lens according to a fifth numerical example of the present disclosure.

The zoom lens according to the fifth numerical example consists of, sequentially from the object side toward the image side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The third lens group G3, the fourth lens group G4, the fifth lens group G5, and the sixth lens group G6 form a rear group.

Between the third lens group G3 and the fourth lens group G4, a stop SP for adjusting the intensity of light is disposed. The stop SP is movable independently of each lens group. A plane-parallel plate CG is provided between the sixth lens group G6 and the image plane.

During the zooming from the short focal length end to the long focal length end, the first lens group G1, the third lens group G3, and the sixth lens group G6 are moved (extended) toward an object to be observed, relative to the image plane, the fourth lens group G4 is moved toward an image to be formed relative to the image plane, and the second lens group G2 and the fifth lens group G5 are stationary relative to the image plane. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side. The second sub-lens group-AR corresponds to the second sub-lens group-A G2A.

The second sub-lens group-B G2B consists of a positive lens component B1, a negative lens component B2, and a negative lens component B3 arranged in that order from the object side toward the image side. The positive lens component B1 consists of a cemented lens formed of a negative lens and a positive lens, which are arranged in that order from the object side toward the image side.

The positive lens component B1 of the second sub-lens group-B G2B forms a vibration-isolating lens group V1 that is movable in a direction perpendicular to the optical axis to enable image to be blurred during the correction of image blurring.

The fourth lens group G4 is moved toward the object, and the sixth lens group G6 is moved toward the image during a change in focus from infinity to a short distance. Such a double-focusing method enables more effective aberration correction during a change in the capturing distance.

Figure 6:
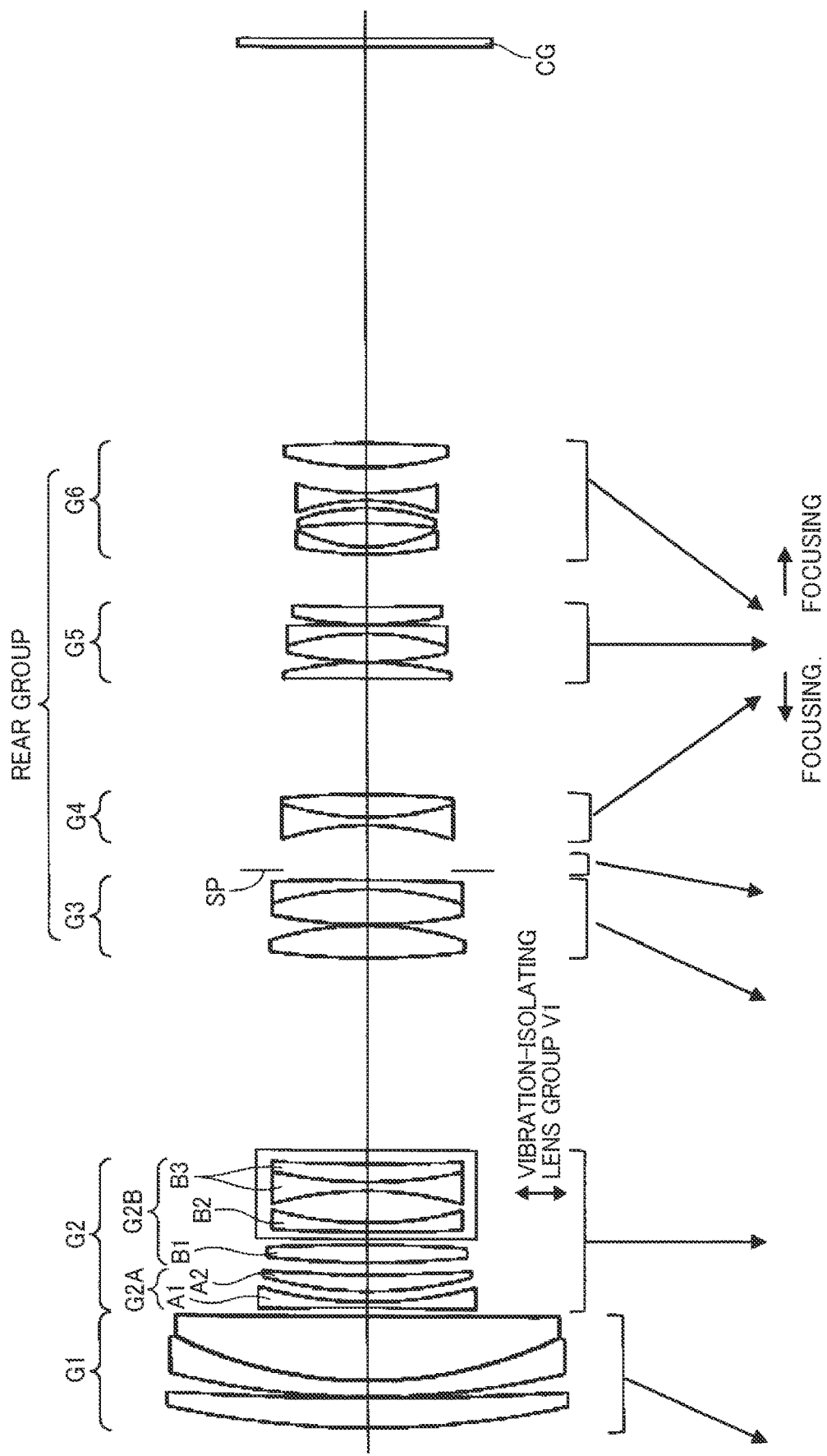
FIG. 6 is an illustration of trajectories and a configuration of a vibration-isolating lens group of a zoom lens according to another embodiment of the present disclosure.

FIG. 6 is an illustration of trajectories and the configuration of a vibration-isolating lens group V1 of a zoom lens according to a sixth numerical example of the present disclosure.

The zoom lens according to the sixth numerical example consists of, sequentially from the object side toward the image side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The third lens group G3, the fourth lens group G4, the fifth lens group G5, and the sixth lens group G6 form a rear group.

Between the third lens group G3 and the fourth lens group G4, a stop SP for adjusting the intensity of light is disposed. The stop SP is movable independently of each lens group. A plane-parallel plate CG is provided between the sixth lens group G6 and the image plane.

During the zooming from the short focal length end to the long focal length end, the first lens group G1, the third lens group G3, and the sixth lens group G6 are moved (extended) toward an object to be observed, relative to the image plane, the fourth lens group G4 is moved toward the image relative to the image plane, and the second lens group G2 and the fifth lens group G5 are stationary relative to the image plane. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side. The second sub-lens group-AR corresponds to the second sub-lens group-A G2A.

The second sub-lens group-B G2B consists of a positive lens component B1, a negative lens component B2, and a negative lens component B3 arranged in that order from the object side toward the image side.

The negative lens component B3 is a cemented lens formed of a negative lens and a positive lens, which are arranged in that order from the object side toward the image side.

The negative lens component B2 and the negative lens component B3 of the second sub-lens group-B G2B form a vibration-isolating lens group V1 that is movable in a direction perpendicular to the optical axis to enable image blurring to be corrected during the correction of image blurring.

The fourth lens group G4 is moved toward the object, and the sixth lens group G6 is moved toward the image during a change in focus from infinity to a short distance. Such a double-focusing method enables more effective aberration correction during a change in the capturing distance.

Figure 7:
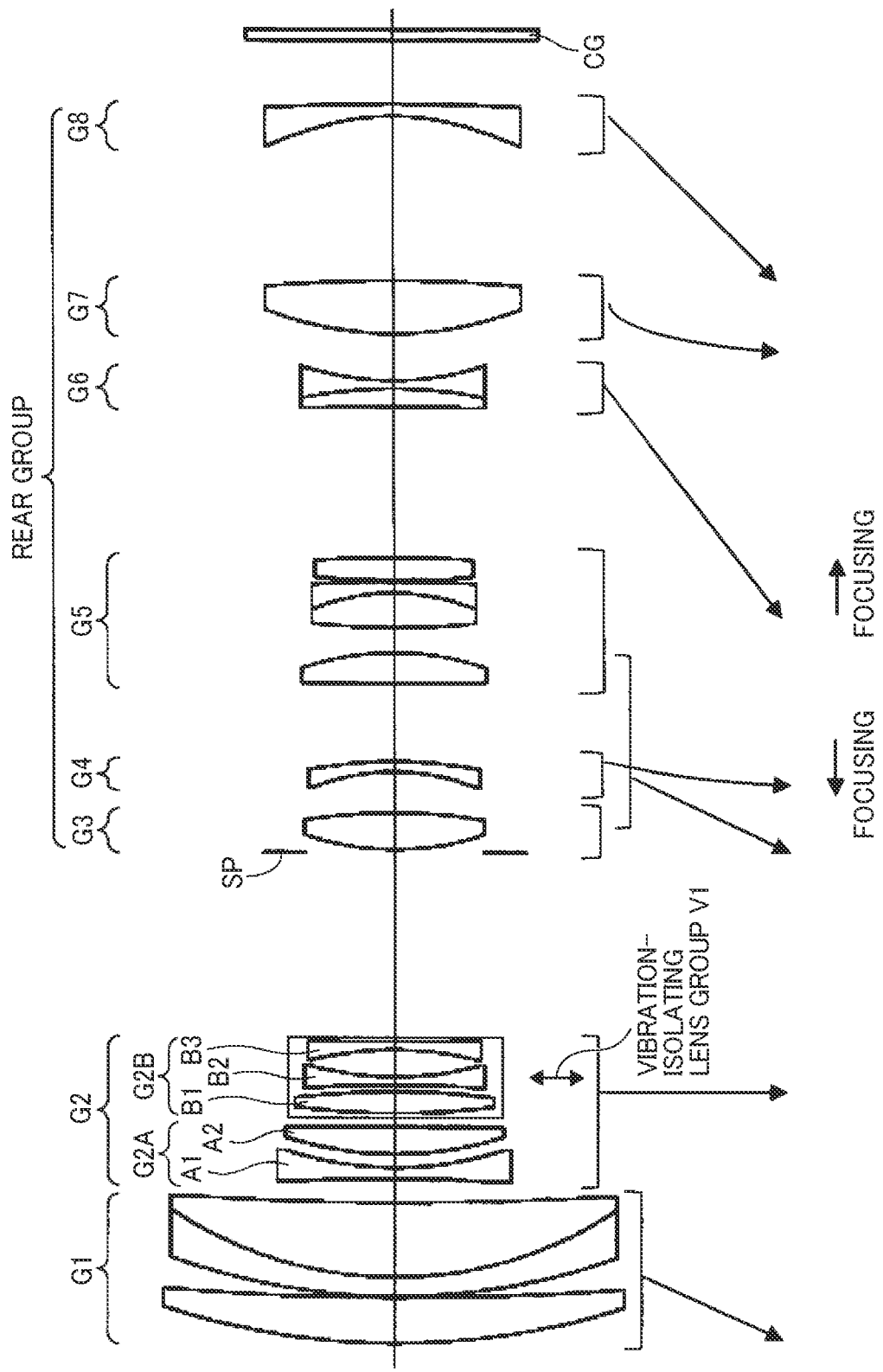
FIG. 7 is an illustration of trajectories and a configuration of a vibration-isolating lens group of a zoom lens according to another embodiment of the present disclosure.

FIG. 7 is an illustration of trajectories and the configuration of a vibration-isolating lens group V1 of a zoom lens according to a seventh numerical example of the present disclosure.

The zoom lens according to the seventh numerical example consists of, sequentially from the object side toward the image side, a first lens group G1 having positive refractive power, a second lens group G2 having negative refractive power, a third lens group G3 having positive refractive power, a fourth lens group G4 having negative refractive power, a fifth lens group G5 having positive refractive power, a sixth lens group G6 having negative refractive power, a seventh lens group G7 having positive refractive power, and an eighth lens group G8 having negative refractive power.

The third lens group G3, the fourth lens group G4, the fifth lens group G5, the sixth lens group G6, the seventh lens group G7, and the eighth lens group G8 constitute a rear lens group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the eighth lens group G8 and the image plane.

During the zooming from the short focal length end to the long focal length end, the first lens group G1, the third lens group G3, the fourth lens group G4, the fifth lens group G5, the sixth lens group G6, the seventh lens group G7, and the eighth lens group G8 are moved (extended) toward the object relative to the image plane, whereas the second lens group G2 is stationary relative to the image plane.

The third lens group G3 and the fifth lens group G5 are moved along the same trajectory, and a mechanical structure is simplified. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side. The second sub-lens group-AR corresponds to the second sub-lens group-A G2A.

The second sub-lens group-B G2B consists of a positive lens component B1, a negative lens component B2, and a negative lens component B3 arranged in that order from the object side toward the image side.

The second sub-lens group-B G2B as a whole forms a vibration-isolating lens group V1 that is movable in a direction perpendicular to the optical axis to enable image blurring to be corrected during the correction of image blurring.

The fourth lens group G4 is moved toward the object, and the sixth lens group G6 is moved toward the image during a change in focus from infinity to a short distance. Such a double-focusing method enables more effective aberration correction during a change in the capturing di stance.

Figure 8:
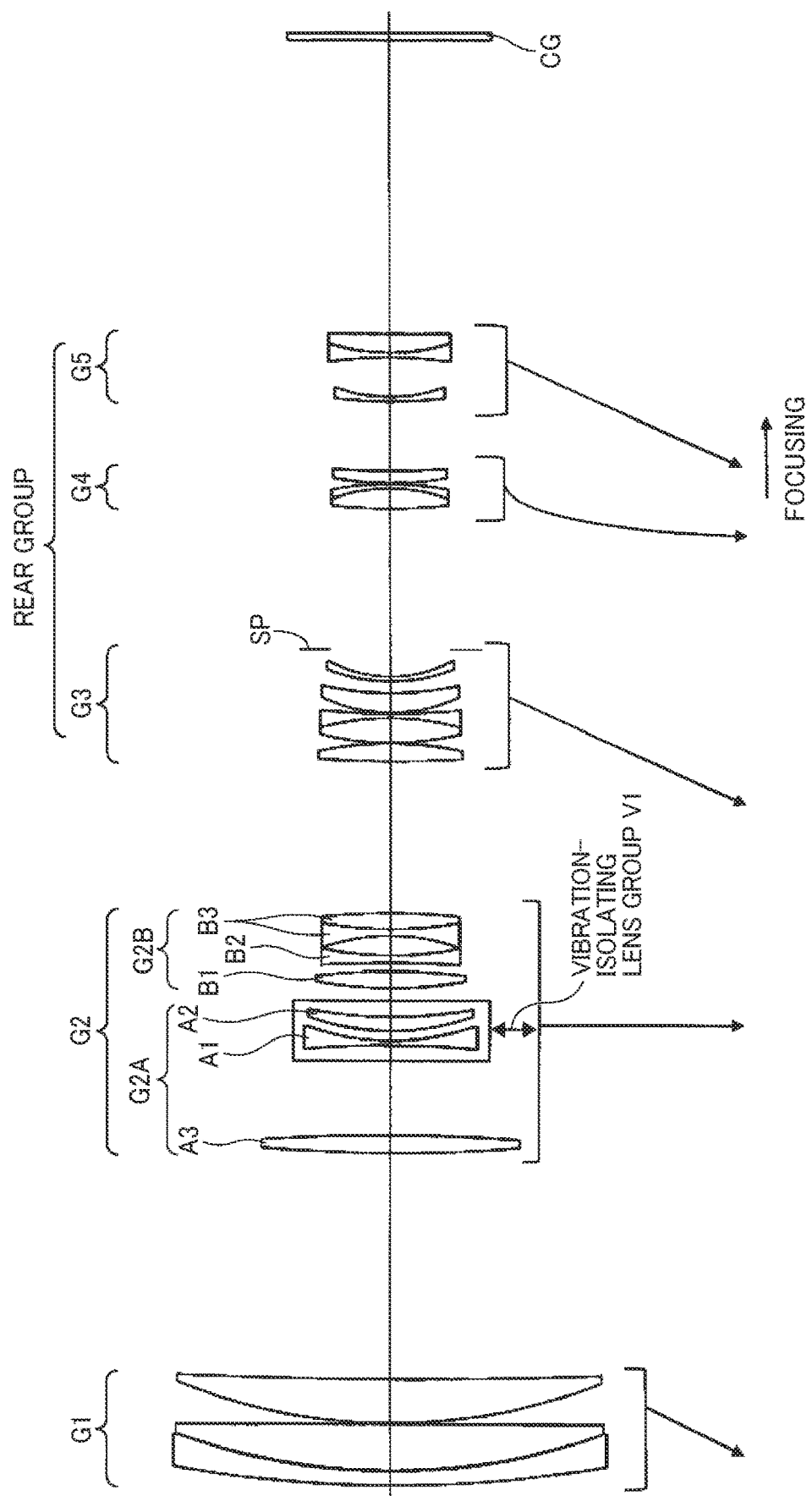
FIG. 8 is an illustration of trajectories and a configuration of a vibration-isolating lens group of a zoom lens according to another embodiment of the present disclosure.

FIG. 8 is an illustration of trajectories and the configuration of a vibration-isolating lens group V1 of a zoom lens according to an eighth numerical example of the present disclosure.

The zoom lens according to the eighth numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3. A plane-parallel plate CG is provided between the fifth lens group G5 and the image plane.

During the zooming from the short focal length end to the long focal length end, the first lens group G1, the third lens group G3, the fourth lens group G4, the fifth lens group G5 are moved (extended) toward an object to be observed, relative to the image plane, whereas the second lens group G2 is stationary relative to the image plane. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a positive lens component A3, a negative lens component A1, and a positive lens component A2 arranged in that order from the object side toward the image side. The second sub-lens group-AR corresponds to the negative lens component A1 and the positive lens component A2 of the second sub-lens group-A G2A.

The second sub-lens group-B G2B consists of a positive lens component B1, a negative lens component B2, and a negative lens component B3 arranged in that order from the object side toward the image side. The negative lens component B3 is a cemented lens formed of a negative lens and a positive lens, which are arranged in that order from the object side toward the image side.

The negative lens component A1 and the positive lens component A2 (the second sub-lens group-AR) of the second sub-lens group-A G2A form a vibration-isolating lens group V1 that is movable in a direction perpendicular to the optical axis to enable image blurring to be corrected during the correction of image blur during the correction of image blurring.

The fifth lens group G5 is a focus lens group that is movable toward an image to be formed, during a change in focus from infinity to a short distance.

Figure 9:
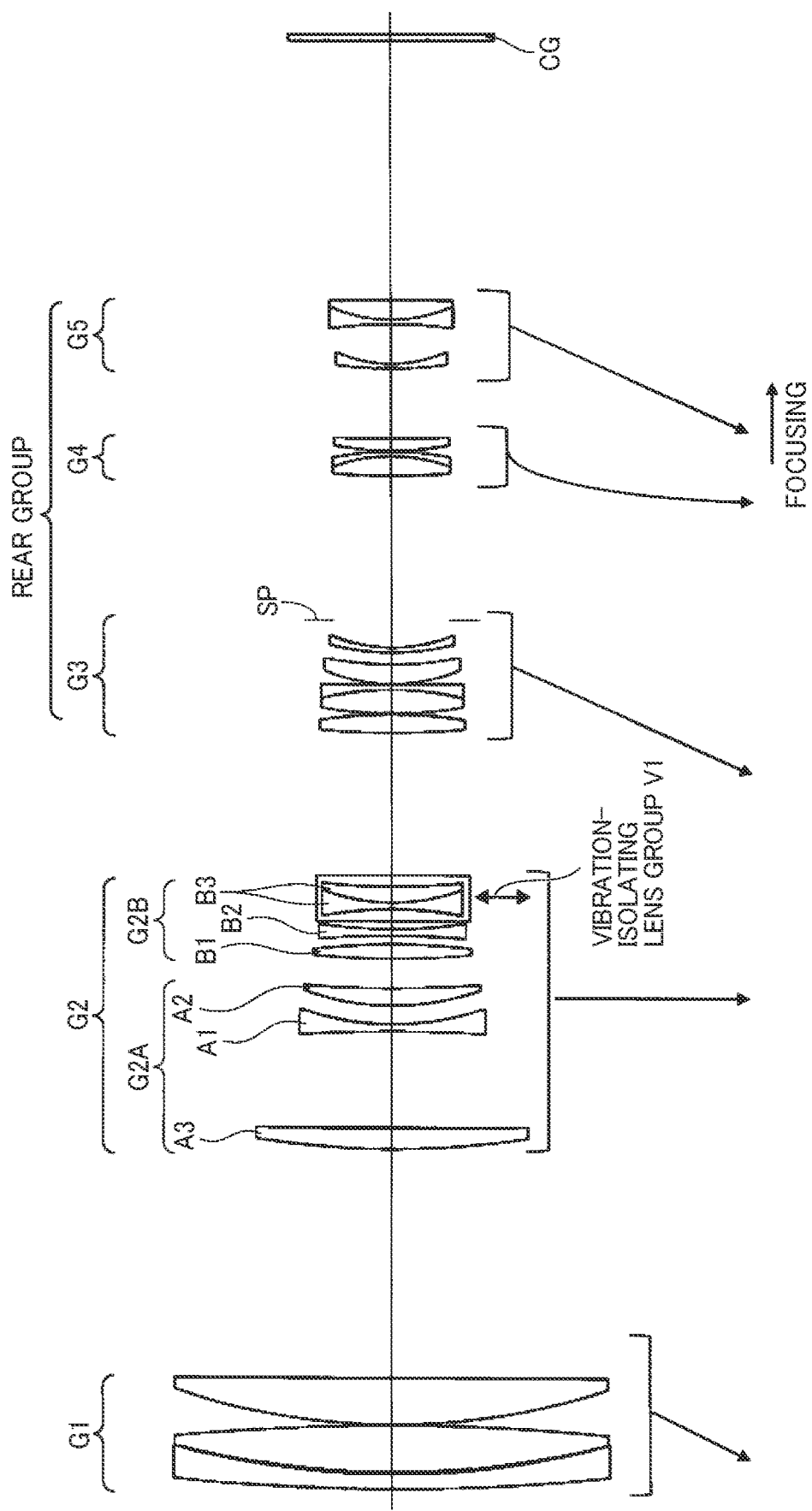
FIG. 9 is an illustration of trajectories and a configuration of a vibration-isolating lens group of a zoom lens according to another embodiment of the present disclosure.

FIG. 9 is an illustration of trajectories and the configuration of a vibration-isolating lens group V1 of a zoom lens according to a ninth numerical example of the present disclosure.

The zoom lens according to the ninth numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3. A plane-parallel plate CG is provided between the fifth lens group G5 and the image plane.

During the zooming from the short focal length end to the long focal length end, the first lens group G1, the third lens group G3, the fourth lens group G4, and the fifth lens group G5 are moved (extended) toward an object to be observed, relative to the image plane, whereas the second lens group G2 is stationary relative to the image plane. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a positive lens component A3, a negative lens component A1, and a positive lens component A2 arranged in that order from the object side toward the image side.

The second sub-lens group-AR corresponds to the negative lens component A1 and the positive lens component A2 of the second sub-lens group-A G2A.

The second sub-lens group-B G2B consists of a positive lens component B1, a negative lens component B2, and a negative lens component B3 arranged in that order from the object side toward the image side. The negative lens component B3 is a cemented lens formed of a negative lens and a positive lens, which are arranged in that order from the object side toward the image side.

The negative lens component B3 of the second sub-lens group-B G2B forms a vibration-isolating lens group V1 that is movable in a direction perpendicular to the optical axis to enable image blurring to be corrected during the correction of image blurring.

The fifth lens group G5 is a focus lens group that is movable toward an image to be formed, during a change in focus from infinity to a short distance.

Figure 10:
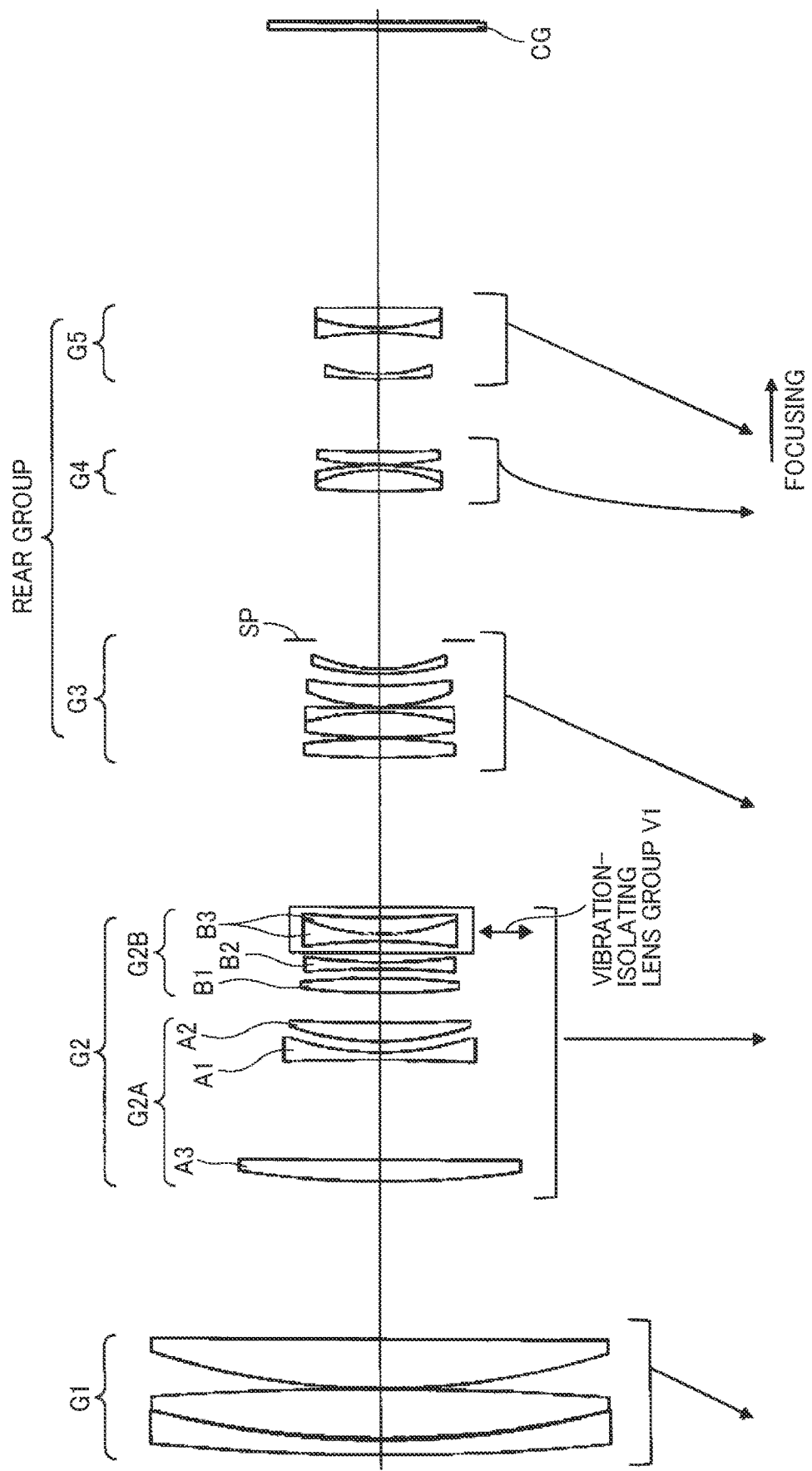
FIG. 10 is an illustration of trajectories and a configuration of a vibration-isolating lens group of a zoom lens according to another embodiment of the present disclosure.

FIG. 10 is an illustration of trajectories and the configuration of a vibration-isolating lens group V1 of a zoom lens according to a tenth numerical example of the present disclosure.

The zoom lens according to the tenth numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3. A plane-parallel plate CG is provided between the fifth lens group G5 and the image plane.

During the zooming from the short focal length end to the long focal length end, the first lens group G1, the third lens group G3, the fourth lens group G4, and the fifth lens group G5 are moved (extended) toward an object to be observed, relative to the image plane, whereas the second lens group G2 is stationary relative to the image plane. Zooming is performed by changing a distance between adjacent lens groups.

The second lens group G2 consists of a positive second sub-lens group-A G2A and a negative second sub-lens group-B G2B arranged in that order from the object side toward the image side.

The second sub-lens group-A G2A consists of a positive lens component A3, a negative lens component A1, and a positive lens component A2 arranged in that order from the object side toward the image side. The second sub-lens group-AR corresponds to the negative lens component A1 and the positive lens component A2 of the second sub-lens group-A G2A.

The second sub-lens group-B G2B consists of a positive lens component B1, a negative lens component B2, and a negative lens component B3 arranged in that order from the object side toward the image side. The negative lens component B3 is a cemented lens formed of a negative lens and a positive lens, which are arranged in that order from the object side toward the image side.

The negative lens component B3 of the second sub-lens group-B G2B forms a vibration-isolating lens group V1 that is movable in a direction perpendicular to the optical axis to enable image blurring to be corrected during the correction of image blurring.

The fifth lens group G5 is a focus lens group that is movable toward an image to be formed, during a change in focus from infinity to a short distance.

Figure 11:
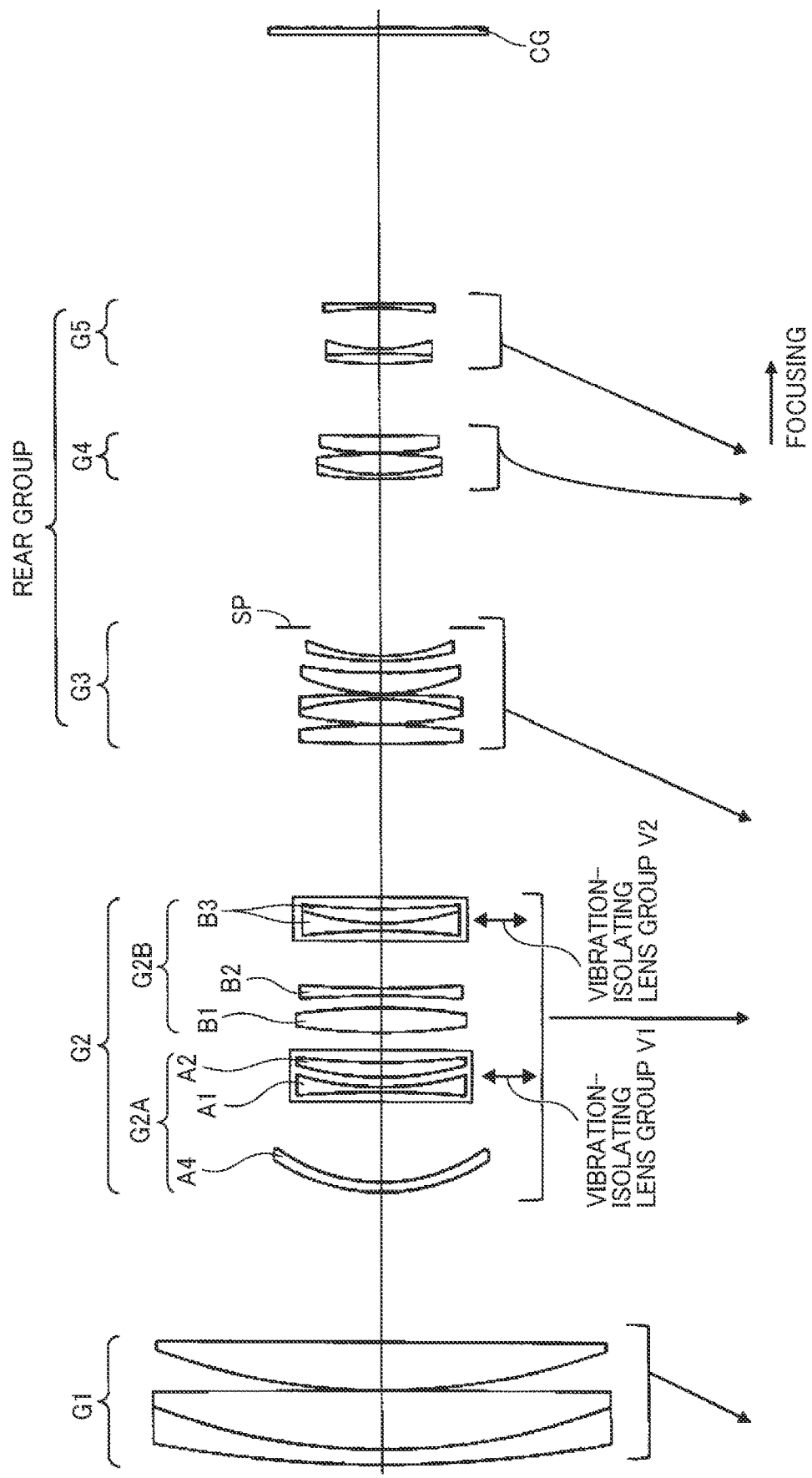
FIG. 11 is an illustration of trajectories and a configuration of a vibration-isolating lens group of a zoom lens according to another embodiment of the present disclosure.

FIG. 11 is an illustration of trajectories and the configuration of a vibration-isolating lens group V1 of a zoom lens according to a eleventh numerical example of the present disclosure.

The zoom lens according to the eleventh numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3. A plane-parallel plate CG is provided between the fifth lens group G5 and the image plane.

During the zooming from the short focal length end to the long focal length end, the first lens group G1, the third lens group G3, the fourth lens group G4, and the fifth lens group G5 are moved (extended) toward an object to be observed, relative to the image plane, whereas the second lens group G2 is stationary relative to the image plane. Zooming is performed by changing a distance between adjacent lens groups.

The second lens group G2 consists of a negative second sub-lens group-A G2A and a negative second sub-lens group-B G2B arranged in that order from the object side toward the image side.

The second sub-lens group-A G2A consists of a negative lens component A4, a negative lens component A1, and a positive lens component A2 arranged in that order from the object side toward the image side. The second sub-lens group-AR corresponds to the negative lens component A1 and the positive lens component A2 of the second sub-lens group-A G2A.

The second sub-lens group-B G2B consists of a positive lens component B1, a negative lens component B2, and a negative lens component B3 arranged in that order from the object side toward the image side. The negative lens component B3 is a cemented lens formed of a negative lens and a positive lens, which are arranged in that order from the object side toward the image side.

The negative lens component A1 and the positive lens component A2 (the second sub-lens group-AR) of the second sub-lens group-B G2B form a vibration-isolating lens group V1 that is movable in a direction perpendicular to the optical axis to enable image blurring to be corrected during the correction of image blurring. The negative lens component B3 of the second sub-lens group-B G2B forms a vibration-isolating lens group V2 that is movable in a direction perpendicular to the optical axis to enable image blurring to be corrected during the correction of image blurring.

The vibration-isolating lens groups V1 and V2 exhibit double vibration isolation effects and advantageously increases the degree of vibration-isolation correction.

The fifth lens group G5 is a focus lens group that is movable toward an image to be formed, during a change in focus from infinity to a short distance.

The zoom lens according to the present embodiment is a compact and high-powered zoom lens with a focal length extended particularly in the telephoto range, and enables correction of blurring of an image and exhibits high performance to prevent a reduction in image quality due to image blurring over the entire zoom range.

In a typical positive-lead lens consisting of, sequentially from the object side, a positive first lens group, a negative second lens group, and a rear group, the second lens group has relatively strong negative refractive power, and a distance between the second lens group and another lens group adjacent to the second lens group (i.e., in front or behind the second lens group) is changed to obtain a large zoom ratio. Such a typical positive-lead lens, however, likely cause more significant aberrations and has a lower optical performance over the entire zoom system.

In the zoom lens with a focal length extended in the telephoto range, the second lens group is relatively compact within the entire lens system, which enables a compact vibration-isolating lens unit including a drive system. For this reason, the entirety or part of the second lens group may be used as a vibration-isolating lens group. However, when the second lens group has a large refractive power, the error sensitivity of the vibration-isolating lens group with respect to decentering increases, and decentered aberration during the correction of image blurring might increase. This cause a reduction in optical performance.

To avoid such a situation, the second lens group is to have an appropriate lens arrangement.

In a comparative example, a negative second lens group consists of, sequentially from the object side, a negative lens component, a negative component, and a negative lens component, and the negative lens component in the middle serves to correct blurring of an image.

In another comparative example, a negative second lens group consists of, sequentially from the object side, a negative lens component and a negative lens component, and the negative lens component at the image side serves to correct blurring of an image.

In the zoom lens according to an embodiment of the present disclosure, by contrast, the second lens group G2 consists of, sequentially from the object side, a positive or negative second sub-lens group-A G2A, and a negative second sub-lens group-B G2B, and the second sub-lens group-B G2B consists of a lens component B1 having positive refractive power, a lens component B2 having negative refractive power, and a lens component B3 having negative refractive power. In other words, the lens component B1 having positive refractive power is disposed in the middle of the second lens group G2.

This arrangement enables the principal point of the second sub-lens group-B G2B to be moved closer to the image, and easily achieves downsizing of the second sub-lens group-B G2B. Further, such an arrangement reduces a diameter of pupil incident on a lens system disposed closer to the image than the second lens group G2, which is advantageous to correct aberrations.

This configuration enables an effective correction of various aberrations such as spherical aberration, coma aberration, and astigmatism while correcting aberrations due to a decentered lens.

In the zoom lens according to an embodiment of the present disclosure, a second sub-lens group-A G2A having relatively weak positive or negative refractive power is disposed closer to the object than a positive lens component B1. This arrangement enables well-balanced correction of various aberration, such as axial aberration and off-axis aberration, and aberration due to decentering of a lens.

Further, two negative lens components (i.e., a negative lens component B2 and a negative lens component B3) are disposed closer to the image than a positive lens component B1, to correct spherical aberration using strong negative refractive power.

In short, the zoom lens according to an embodiment of the present disclosure consists of a first lens group G1 having positive refractive power, a second lens group G2 having negative refractive power, and a rear lens group, which are arranged in that order from the object side toward the image side. During the zooming from the short focal length end to the long focal length end, the distance between the first group G1 and the second lens group G2 increases, and the distance between the second lens group G2 and the rear group decreases.

The second lens group G2 consists of a positive or negative second sub-lens group-A G2A and a negative second sub-lens group-B G2B arranged in that order from the object side toward the image side. The second sub-lens group-B G2B consists of a positive lens component B1, a negative lens component B2, and a negative lens component B3 arranged in that order from the object side toward the image side. To prevent blurring of an image, a part of the second lens group G2 is movable in a direction perpendicular to the optical axis. In other words, a prat of the second lens group G2 serves as a vibration-isolating lens group.

This configuration successfully corrects various aberrations and reduces or eliminates decentered aberration during the operation of vibration isolation.

In the present embodiment, during the zooming from the short focal length end to the long focal length end, the first lens group G1 is moved toward the object (extended) so as to achieve downsizing of the whole lens system. In this configuration, the second lens group G2 is preferably stationary and immovable along the direction of the optical axis during the zooming.

A typical vibration-isolating lens group includes a driving mechanism (e.g., a mechanical member, a magnet, a coil, and a electrical component, which are hereinafter referred to as a vibration-isolating driving mechanism) at the rim of a lens to be driven, to move the lens along the direction substantially perpendicular to the optical axis. When the vibration-isolating lens group is configured to move during zooming, an additional component, such as a zooming mechanism or a lens barrel, is needed at the circumference of the driving mechanism, which leads to an increase in the size of the zooming mechanism or the lens barrel in the direction of the outer diameter of the lens.

In the zoom lens according to an embodiment of the present disclosure, however, the second lens group G2 including a vibration-isolating lens group is stationary during zooming, and an increase in the size of the zooming mechanism or the lens barrel in the radial direction is prevented.

Further, in the zoom lens according to an embodiment of the present disclosure, the positive lens component B1 has a convex surface facing the image and closest to the image within the positive lens component B1. This arrangement enables the principal point of the second sub-lens group-B G2B to be moved closer to the image and achieves a reduction in the size of the second lens group G2 as well as the size of the whole lens system.

In the zoom lens according an embodiment, the second sub-lens group-A G2A includes one or more negative lens components, and among the one or more negative lens components in the second sub-lens group-A G2A, a negative lens component A1 closest to the image within the one or more negative lens components has a concave surface facing the image and closest to the image within the negative lens component A1.

This arrangement achieves a reduction in the size of a lens group closer to the image than the negative lens component A1. Thus, the diameter of a pupil can be reduced, and spherical aberration and coma aberration are properly corrected.

The zoom lens according to an embodiment preferably satisfies conditional expression (1) below, and more preferably conditional expression (1') below.

$$0 < H1\_2B/D2B < 2.3 \tag{1}$$

$$0.1 < H1\_2B/D2B < 2.2 \tag{1'}$$

where
- H1_2B denotes a distance between a refractive surface closest to the object within the second sub-lens group-B G2B and a front principal point of the second sub-lens group-B G2B, and
- D2B denotes a distance along the optical axis between the refractive surface closest to the object within the second sub-lens group-B G2B and a refractive surface closest to the image within the second sub-lens group-B G2B.

Conditional expression (1) is satisfied to enable the front principal point of the second sub-lens group-B G2B to be positioned as desired, to decrease the size of the second lens group G2 as well as the size of the whole lens system. Further, the decentered aberration is properly corrected.

Such advantageous effects are enhanced by satisfying conditional expression (1').

When a value exceeds the upper limit of conditional expressions (1), the front principal point of the second sub-lens group-B G2B is moved too close to the image, and the second lens group G2 (in particular, the second sub-lens group-A G2A) and the lens system as a whole might increase in size. Moreover, the decentered aberration might increase.

When a value falls below the lower limit of conditional expressions (1), the front principal point of the second sub-lens group-B G2B is moved too close to the object, and the second lens group G2 (in particular, the second sub-lens group-A G2A) and the lens system as a whole might increase in size. Moreover, the decentered aberration might increase.

The zoom lens according to an embodiment preferably satisfies conditional expression (2) below, and more preferably conditional expression (2') below.

$$2.5 < fT/fW \quad (2)$$

$$2.7 < fT/fW \quad (2')$$

where
- fT denotes a focal length of the entirety of the zoom lens focused on infinity at the long focal length end, and
- fW denotes a focal length of the entirety of the zoom lens focused on infinity at the short focal length end.

Conditional expression (2) is satisfied to achieve a desired magnification ratio sufficient to obtain intended performance. Such an advantageous effect is enhanced by satisfying conditional expression (2').

When a value falls below the lower limit of conditional expression (2), a desired magnification ratio sufficient to obtain intended performance is not obtained.

In the zoom lens according to an embodiment, the second sub-lens group-A G2A includes one or more negative lens components. Lenses of a negative lens component A1 closest to the image among the one or more negative lens components through a lens closest to the image within the second sub-lens group-A G2A are defined as a second sub-lens group-AR (second sub-third lens group). In this case, conditional expression (3) below is preferably satisfied, and more preferably conditional expression (3') below is satisfied.

$$0.6 < f2AR/f2B < 20 \quad (3)$$

$$0.7 < f2AR/f2B < 10 \quad (3')$$

where
- f2AR denotes a focal length of the second sub-lens group-AR, and
- f2B denotes a focal length of the second sub-lens group-B G2B.

Conditional expression (3) is satisfied to determine a proper refractive power of the second sub-lens group-B G2B, and properly correct spherical aberration and coma aberration. Such advantageous effects are enhanced by satisfying conditional expression (3').

When a value exceeds the upper limit of conditional expression (3), the refractive power of the second sub-lens group-B G2B excessively increases, and spherical aberration and coma aberration increase.

When a value falls below the lower limit of conditional expression (3), the refractive power of the second sub-lens group-B G2B excessively decreases, and spherical aberration and coma aberration increase.

The zoom lens according to an embodiment preferably satisfies conditional expression (4) below, and more preferably conditional expression (4') below.

$$0.5 < B1\_RR/B3\_RF < 20 \quad (4)$$

$$0.6 < B1\_RR/B3\_RF < 10 \quad (4')$$

where
- B1_RR denotes a radius of curvature of a refractive surface closest to the image within the positive lens component B1, and
- B3_RF denotes a radius of curvature of a refractive surface closest to the object within the negative lens component B3.

Conditional expression (4) is satisfied to achieve the optimal balance between the radius of curvature of the refractive surface closest to the image within the positive lens component B1 and the radius of curvature of the refractive surface closest to the object within the negative lens component B3, to properly correct spherical aberration and coma aberration. Such an advantageous effect is enhanced by satisfying conditional expression (4').

When a value exceeds the upper limit of conditional expression (4) or falls below the lower limit of conditional expression (4), the balance between the radius of curvature of the refractive surface closest to the image within the positive lens component B1 and the radius of curvature of the refractive surface closest to the object within the negative lens component B3 becomes poor, and the spherical aberration and coma aberration increase.

The zoom lens according to an embodiment preferably satisfies conditional expression (5) below, and more preferably conditional expression (5') below.

$$0.1 < fB23\_Air/f2B < 1.5 \quad (5)$$

$$0.2 < fB23\_Air/f2B < 1.2 \quad (5')$$

where
- fB23_Air denotes a focal length of an air lens formed by a refractive surface closest to the image within the negative lens component B2 and a refractive surface closest to the object within the negative lens component B3, and
- f2B denotes a focal length of the second sub-lens group-B G2B.

Conditional expression (5) is satisfied to achieve the optimal balance between the focal length of the second sub-lens group-B G2B and the focal length of the air lens formed by the refractive surface closest to the image within the negative lens component B2 and the refractive surface closest to the object within the negative lens component B3, to properly correct spherical aberration and coma aberration. Such an advantageous effect is enhanced by satisfying conditional expression (5').

When a value exceeds the upper limit of conditional expression (5) or falls below the lower limit of conditional expression (5), the balance between the focal length of the second sub-lens group-B G2B and the focal length of the air lens formed by the refractive surface closest to the image within the negative lens component B2 and the refractive surface closest to the object within the negative lens component B3 become poor, and the spherical aberration and coma aberration increase.

The zoom lens according to an embodiment preferably satisfies conditional expression (6) below, and more preferably conditional expression (6') below.

$$-10 < fB1/f2B < -0.4 \quad (6)$$

$$-5 < fB1/f2B < -0.5 \quad (6')$$

where
fB1 denotes a focal length of the positive lens component B1, and
f2B denotes a focal length of the second sub-lens group-B G2B.

Conditional Expression (6) is satisfied to reduce the size of the second lens group G2 as well as the size of the whole lens system, to properly correct spherical aberration. Such an advantageous effect is enhanced by satisfying conditional expression (6').

When a value exceeds the upper limit of conditional expression (6), the power of the positive lens component B1 excessively increases, and spherical aberration increases.

When a value falls below the lower limit of conditional expression (6), the power of the positive lens component B1 excessively decreases, and spherical aberration increases. Moreover, the second lens group G2 as well as the lens system as a whole increase in size.

In the zoom lens according to an embodiment, the second sub-lens group-A G2A includes one or more negative lens components and one or more positive lens components. A negative lens component A1 closest to the image among the one or more negative lens components and a positive lens component A2, which is closer to the image than and adjacent to the negative lens component A1 among the one or more positive lens components, serve as a vibration-isolating lens group V1 movable along the direction perpendicular to the optical axis to correct blurring of an image (refer, for example, to the first numerical example and the eighth numerical example).

In this case, the zoom lens according to an embodiment preferably satisfies at least one of conditional expressions (7), (8), and (9) below, and more preferably at least one of conditional expressions (7'), (8'), and (9') below.

$$-1.0 < fA1/fA2 < -0.01 \quad (7)$$

$$-0.8 < fA1/fA2 < -0.1 \quad (7')$$

$$0.5 < A1\_RR/A2\_RF < 2.0 \quad (8)$$

$$0.7 < A1\_RR/A2\_RF < 1.5 \quad (8')$$

$$0.001 < D2RF/D2FR < 0.6 \quad (9)$$

$$0.01 < D2RF/D2FR < 0.5 \quad (9')$$

where
fA1 denotes a focal length of the negative lens component A1,
fA2 denotes a focal length of the positive lens component A2,
A1_RR denotes a radius of curvature of a refractive surface closest to the image within the negative lens component A1,
A2_RF denotes a radius of curvature of a refractive surface closest to the object within the positive lens component A2,
D2RF denotes a distance along the optical axis between the refractive surface closest to the image within the negative lens component A1 and the refractive surface closest to the object within the positive lens component A2, and
D2FR denotes a distance along the optical axis between a refractive surface closest to the object within the negative lens component A1 and a refractive surface closest to the image within the positive lens component A2.

Conditional Expression (7) is satisfied to properly correct spherical aberration, coma aberration, axial chromatic aberration, and lateral chromatic aberration. Further, a desired amount of vibration-isolation drive of the vibration-isolating lens group is obtained to exhibit a vibration isolation effect sufficient to achieve intended performance. Such an advantageous effect is enhanced by satisfying conditional expression (7').

When a value exceeds the upper limit of conditional expression (7), the power of the negative lens component A1 excessively increases, and spherical aberration and coma aberration increase.

When a value falls below the lower limit of conditional expression (7), the power of the positive lens component A2 excessively increases, and axial chromatic aberration ad lateral chromatic aberration increase. Further, the amount of vibration-isolation drive of the vibration-isolating lens group decreases, and a desired vibration isolation effect is not obtained.

Conditional expression (8) is satisfied to determine a proper power of the air lens formed by the negative lens component A1 and the positive lens component A2, to properly correct spherical aberration and coma aberration. Such an advantageous effect is enhanced by satisfying conditional expression (8').

When a value exceeds the upper limit of the conditional expression (8), the radius of curvature of the refractive surface closest to the image within the negative lens component A1 excessively increases (in other words, the air lens formed by the negative lens component A1 and the positive lens component A2 excessively increases in the positive power), spherical aberration and coma aberration increase.

When a value falls below the lower limit of the conditional expression (8), the radius of curvature of the refractive surface closest to the object within the positive lens component A1 excessively increases (in other words, the air lens formed by the negative lens component A1 and the positive lens component A2 excessively increases in the negative power), spherical aberration and coma aberration increase.

Conditional expression (9) is satisfied to determine optimum spacing between the negative lens component A1 and the positive lens component A2, to have the negative lens component A1 and the positive lens component A2 spaced apart from each other to some extent. This enables a well-balanced correction of the spherical aberration and coma aberration using the difference in height between the light rays incident on the respective lens components.

Further, the size of the second lens group G2 as well as the lens system as a whole is reduced, and the chromatic aberration is properly corrected.

Such an advantageous effect is enhanced by satisfying conditional expression (9').

When a value exceeds the upper limit of conditional expression (9), the spacing between the negative lens component A1 and the positive lens component A2 excessively increases, and the second lens group G2 as well as the lens system as a whole increase in size.

Moreover, the chromatic aberration might increase.

When a value falls below the lower limit of the conditional expression (9), the spacing between the negative lens component A1 and the positive lens component A2 excessively decreases, and the difference in height between light rays becomes absent, thus leading to an increase in spherical aberration and coma aberration.

In the zoom lens according to an embodiment, the second sub-lens group-A G2A includes one or more negative lens components. Among the one or more negative lens components in the second sub-lens group-A G2A, a negative lens component A1 closest to the image is a cemented lens formed of a negative lens and a positive lens. The cemented lens (the negative lens component A1) serves as a vibration-isolating lens group V1 movable in the direction perpendicular to the optical axis to enable the correction of image blurring (refer, for example, to the second numerical example).

In this case, the zoom lens according to an embodiment preferably satisfies conditional expression (10) below, and more preferably conditional expression (10') below.

$$10 < v\_A1N - v\_A1P \quad (10)$$

$$12 < v\_A1N - v\_A1P \quad (10')$$

where v_A1N denotes the Abbe number of the negative lens of the negative lens component A1, and v_A1P denotes the Abbe number of the positive lens of the negative lens component A1.

Conditional expression (10) is satisfied to properly correct lateral chromatic aberration during the vibration isolation of the vibration-isolating lens group. Such an advantageous effect is enhanced by satisfying conditional expression (10').

When a value falls below the lower limit of conditional expression (10), the lateral chromatic aberration that occurs during the vibration isolation of the vibration-isolating lens group might increase.

In the zoom lens according to an embodiment of the present disclosure, the second sub-lens group-B G2B as a whole serves as a vibration-isolating lens group V1 movable along the direction perpendicular to the optical axis to correct image blurring (refer, for example, to the seventh numerical example). In this case, the zoom lens according to an embodiment preferably satisfies conditional expression (11) below, and more preferably conditional expression (11') below.

$$45 < v\_BMAX \quad (11)$$

$$55 < v\_BMAX \quad (11')$$

where v_BMAX denotes the largest Abbe number among the Abbe numbers of the negative lenses in the second sub-lens group-B G2B.

Conditional expression (11) is satisfied to properly correct lateral chromatic aberration generated during the vibration isolation of the vibration-isolating lens group. Such an advantageous effect is enhanced by satisfying conditional expression (11').

When a value falls below the lower limit of conditional expression (11), the lateral chromatic aberration generated during the vibration isolation of the vibration-isolating lens group might increase.

In the zoom lens according to an embodiment of the present disclosure, the negative lens component B2 and the negative lens component B3 of the second sub-lens group-B G2B serve as a vibration-isolating lens group V1 movable along the direction perpendicular to the optical axis to correct image blurring (refer, for example, to the fourth numerical example and the sixth numerical example).

In this case, the zoom lens according to an embodiment preferably satisfies conditional expression (12) below, and more preferably conditional expression (12') below.

$$45 < v\_B23MAX \quad (12)$$

$$55 < v\_B23MAX \quad (12')$$

where v_B23MAX denotes a larger Abbe number between a negative lens of the negative lens component B2 and a negative lens of the negative lens component B3 in the second sub-lens group-B G2B.

Conditional expression (12) is satisfied to properly correct lateral chromatic aberration generated during the vibration isolation of the vibration-isolating lens group. Such an advantageous effect is enhanced by satisfying conditional expression (12').

When a value falls below the lower limit of conditional expression (12), the lateral chromatic aberration generated during the vibration isolation of the vibration-isolating lens group might increase.

In the zoom lens according to an embodiment of the present disclosure, the positive lens component B1 of the second sub-lens group-B G2B is a cemented lens formed of a negative lens and a positive lens. The cemented lens (i.e., the positive lens component B1) serves as a vibration-isolating lens group V1 movable along the direction perpendicular to the optical axis to correct image blurring (refer, for example, to the fifth numerical example).

In this case, the zoom lens according to an embodiment preferably satisfies conditional expressions (13) and (14) below, and more preferably conditional expressions (13') and (14') below.

$$10 < v\_B1P - v\_B1N \quad (13)$$

$$12 < v\_B1P - v\_B1N \quad (13')$$

$$40 < v\_B1P \quad (14)$$

$$55 < v\_B1P \quad (14')$$

where v_B1P denotes the Abbe number of the positive lens of the positive lens component B1, and v_B1P denotes the Abbe number of the negative lens of the positive lens component B1.

Conditional expression (13) is satisfied to properly correct lateral chromatic aberration generated during the vibration isolation of the vibration-isolating lens group. Such an advantageous effect is enhanced by satisfying conditional expression (13').

When a value falls below the lower limit of conditional expression (13), the lateral chromatic aberration generated during the vibration isolation of the vibration-isolating lens group might increase.

Conditional expression (14) is satisfied to properly correct lateral chromatic aberration generated during the vibration isolation of the vibration-isolating lens group. Such an advantageous effect is enhanced by satisfying conditional expression (14').

When a value falls below the lower limit of conditional expression (14), the lateral chromatic aberration generated during the vibration isolation of the vibration-isolating lens group might increase.

In the zoom lens according to an embodiment of the present disclosure, the negative lens component B2 of the second sub-lens group-B G2B is a cemented lens formed of a negative lens and a positive lens. The cemented lens (i.e., the negative lens component B2) serves as a vibration-isolating lens group V1 movable along the direction perpendicular to the optical axis to correct image blurring (refer, for example, to the third numerical example).

In this case, the zoom lens according to an embodiment preferably satisfies conditional expression (15) below, and more preferably conditional expression (15') below.

$$10 < v\_B2N - v\_B2P \qquad (15)$$

$$12 < v\_B2N - v\_B2P \qquad (15')$$

where v_B2N denotes the Abbe number of the negative lens of the negative lens component B2, and v_B2P denotes the Abbe number of the positive lens of the negative lens component B2.

Conditional expression (15) is satisfied to properly correct lateral chromatic aberration generated during the vibration isolation of the vibration-isolating lens group. Such an advantageous effect is enhanced by satisfying conditional expression (15').

When a value falls below the lower limit of conditional expression (15), the lateral chromatic aberration generated during the vibration isolation of the vibration-isolating lens group might increase.

In the zoom lens according to an embodiment of the present disclosure, the negative lens component B3 of the second sub-lens group-B G2B is a cemented lens formed of a negative lens and a positive lens. The cemented lens (i.e., the negative lens component B3) serves as a vibration-isolating lens group V1 movable along the direction perpendicular to the optical axis to correct image blurring (refer, for example, to the ninth numerical example and the tenth numerical example).

In this case, the zoom lens according to an embodiment preferably satisfies conditional expression (16) below, and more preferably conditional expression (16') below.

$$10 < v\_B3N - v\_B3P \qquad (16)$$

$$12 < v\_B3N - v\_B3P \qquad (16')$$

where v_B3N denotes the Abbe number of the negative lens of the negative lens component B3, and v_B3P denotes the Abbe number of the positive lens of the negative lens component B3.

Conditional expression (16) is satisfied to properly correct lateral chromatic aberration generated during the vibration isolation of the vibration-isolating lens group. Such an advantageous effect is enhanced by satisfying conditional expression (16').

When a value falls below the lower limit of conditional expression (16), the lateral chromatic aberration generated during the vibration isolation of the vibration-isolating lens group might increase.

In the zoom lens according to an embodiment of the present disclosure, the second lens group G2 includes vibration-isolating lens groups V1 and V2 movable along the direction perpendicular to the optical axis to correct image blurring (refer, for example, to the eleventh numerical example).

In this case, the zoom lens according to an embodiment preferably satisfies conditional expression (17) below, and more preferably conditional expression (17') below.

$$0.3 < |fV1/fV2| < 2.5 \qquad (17)$$

$$0.4 < |fV1/fV2| < 2 \qquad (17')$$

where fV1 denotes a focal length of the vibration-isolating lens group V1 disposed at the object side, and fV2 denotes a focal length of the vibration-isolating lens group V2 disposed at the image side (i.e., closer to the image than the vibration-isolating lens group V1).

Conditional expression (17) is satisfied to achieve the optimum power balance between the vibration-isolating lens groups V1 and V2 to obtain desired vibration-isolation effects and properly correct decentered aberration. Such an advantageous effect is enhanced by satisfying conditional expression (17').

When a value exceeds the upper limit of conditional expression (17), the power of the vibration-isolating lens group V1 excessively decreases, and vibration isolation effects sufficient to achieve intended performance are not obtained.

Moreover, the aberration due to the decentering of the vibration-isolating lens group V2 might increase.

When a value falls below the lower limit of conditional expression (17), the power of the vibration-isolating lens group V2 excessively decreases, and vibration isolation effects sufficient to achieve intended performance are not obtained. Moreover, the aberration due to the decentering of the vibration-isolating lens group V1 might increase.

The zoom lens according to an embodiment preferably satisfies conditional expression (18) below, and more preferably conditional expression (18') below.

$$1.5 < |(1-MV) \times MVR| < 4.5 \qquad (18)$$

$$1.7 < |(1-MV) \times MVR| < 3.9 \qquad (18')$$

where

MV denotes a lateral magnification of a vibration-isolating lens group of the second lens group G2, and MVR denotes a combined lateral magnification of all the lens groups disposed closer to the image than the vibration-isolating lens group in the second lens group G2.

Conditional expression (18) is satisfied to determine the optimum refractive power of the vibration-isolating lens group in the second lens group G2, to properly correct the decentered aberration and exhibit desired vibration isolation effects. Such an advantageous effect is enhanced by satisfying conditional expression (18').

When a value exceeds the upper limit of conditional expression (18), the refractive power of the vibration-isolating lens group of the second lens group G2 excessively increases, and the decentered aberration increases.

When a value falls below the lower limit of conditional expression (18), the refractive power of the vibration-isolating lens group of the second lens group G2 excessively decreases, and desired vibration isolation effects decreases.

The zoom lens according to an embodiment preferably satisfies conditional expression (19) below, and more preferably conditional expression (19') below.

$$0.1 < D2/D1 < 3.0 \quad (19)$$

$$0.5 < D2/D1 < 2.5 \quad (19')$$

where
- D1 denotes a distance along the optical axis between a refractive surface closest to the object within the first lens group G1 and a refractive surface closest to the image within the first lens group G1, and
- D2 denotes a distance along the optical axis between a refractive surface closest to the object within the second lens group G2 and a refractive surface closest to the image within the second lens group G2.

Conditional Expression (19) is satisfied to reduce the size of the first lens group G1, the second lens group G2, and the whole lens system. Such an advantageous effect is enhanced by satisfying conditional expression (19').

When a value exceeds the upper limit of conditional expression (19), the thickness of the second lens group G2 excessively increases, and the lens system as a whole might increase in size.

When a value falls below the lower limit of conditional expression (19), the thickness of the first lens group G1 excessively increases, and the lens system as a whole might increase in size.

The zoom lens according to an embodiment preferably satisfies conditional expression (20) below, and more preferably conditional expression (20') below.

$$-20 < fB1/fB23 < -0.5 \quad (20)$$

$$-10 < fB1/fB23 < -1 \quad (20')$$

where
- fB1 denotes a focal length of the positive lens component B1, and
- fB23 denotes a combined focal length of the negative lens component B2 and the negative lens component B3.

Conditional expression (20) is satisfied to reduce the size of the second lens group G2 as well as the lens system as a whole, to properly correct spherical aberration. Such an advantageous effect is enhanced by satisfying conditional expression (20').

When a value exceeds the upper limit of conditional expression (20), the power of the positive lens component B1 excessively decreases, and the combined power of the negative lens component B2 and the negative lens component B3 excessively increases (at least one of such changes in power may occur). This increases spherical aberration.

When a value falls below the upper limit of conditional expression (20), the power of the positive lens component B1 excessively increases, and the combined power of the negative lens component B2 and the negative lens component B3 excessively decreases (at least one of such changes in power may occur). This increases spherical aberration. Moreover, the second lens group G2 as well as the lens system as a whole might increase in size.

The zoom lens according to an embodiment preferably satisfies conditional expression (21) below, and more preferably conditional expression (21') below.

$$-20 < B1\_RR/fB1 < -0.2 \quad (21)$$

$$-10 < B1\_RR/fB1 < -0.3 \quad (21')$$

where
- B1_RR denotes a radius of curvature of a refractive surface closest to the image within the positive lens component B1, and
- fB1 denotes a focal length of the positive lens component B1.

Conditional expression (21) is satisfied to reduce the size of the second lens group G2 and the lens system as a whole, to properly correct spherical aberration and coma aberration. Such an advantageous effect is enhanced by satisfying conditional expression (21').

When a value exceeds the upper limit of the conditional expression (21), the curvature of the refractive surface closest to the image within the positive lens component B1 excessively reduces, spherical aberration and coma aberration increase.

When a value falls below the lower limit of the conditional expression (21), the curvature of the refractive surface closest to the image within the positive lens component B1 excessively reduces, spherical aberration and coma aberration increase. Moreover, the second lens group G2 as well as the lens system as a whole might increase in size.

The zoom lens according to an embodiment preferably satisfies conditional expression (22) below, and more preferably conditional expression (22') below.

$$-20 < A1\_RR/fA1 < -0.2 \quad (22)$$

$$-10 < A1\_RR/fA1 < -0.3 \quad (22')$$

where
- A1_RR denotes a radius of curvature of a refractive surface closest to the image within the negative lens component A1, and
- fA1 denotes a focal length of the negative lens component A1.

Conditional expression (22) is satisfied to reduce the size of the second lens group G2 and the lens system as a whole, to properly correct spherical aberration and coma aberration. Such an advantageous effect is enhanced by satisfying conditional expression (22').

When a value exceeds the upper limit of the conditional expression (22), the curvature of the refractive surface closest to the image within the negative lens component A1 excessively reduces, spherical aberration and coma aberration increase.

Moreover, the second lens group G2 as well as the lens system as a whole might increase in size.

When a value falls below the lower limit of the conditional expression (22), the curvature of the refractive surface closest to the image within the negative lens component A1 excessively increases, spherical aberration and coma aberration increase.

The zoom lens according to an embodiment preferably satisfies conditional expression (23) below, and more preferably conditional expression (23') below.

$$-1.4 < D2/f2 < -0.2 \quad (23)$$

$$-1.3 < D2/f2 < -0.3 \quad (23')$$

where
- D2 denotes a distance along the optical axis between a refractive surface closest to the object within the second lens group G2 and a refractive surface closest to the image within the second lens group G2, and
- f2 denotes a focal length of the second lens group G2.

Conditional expression (23) is satisfied to reduce the size of the second lens group G2 as well as the lens system as a whole, to properly correct the changes in aberrations during zooming.

Such an advantageous effect is enhanced by satisfying conditional expression (23').

When a value exceeds the upper limit of conditional expression (23), the thickness of the second lens group G2 excessively increases, and the size of the lens system as a whole increases.

When a value falls below the lower limit defined by conditional expression (23), the refractive power of the second lens group G2 becomes too strong, and aberrations vary significantly during zooming.

The zoom lens according to an embodiment preferably satisfies conditional expression (24) below, and more preferably conditional expression (24') below.

$$-7 < f1/f2 < -2 \tag{24}$$

$$-6 < f1/f2 < -3 \tag{24'}$$

where f1 denotes a focal length of the first lens group G1, and
f2 denotes a focal length of the second lens group G2.

Conditional expression (24) is satisfied to reduce the size of the whole lens system, to properly correct spherical aberration and coma aberration. Such an advantageous effect is enhanced by satisfying conditional expression (24').

When a value exceeds the upper limit defined by conditional expression (24), the focal length of the first lens group G1 excessively decreases, and the size of the lens system as a whole increases.

When a value falls below the lower limit defined by conditional expression (24), the focal length of the first lens group G1 excessively increases, and the focal length of the second lens group excessively decreases (at least one of such changes in focal length may occur). This leads to an increase in spherical aberration and coma aberration.

The zoom lens according to an embodiment preferably satisfies conditional expression (25) below, and more preferably conditional expression (25') below.

$$0.1 < f1/fT < 0.9 \tag{25}$$

$$0.2 < f1/fT < 0.7 \tag{25'}$$

where f1 denotes a focal length of the first lens group G1, and
fT denotes a focal length of the entirety of the zoom lens focused on infinity at the long focal length end.

Conditional expression (25) is satisfied to reduce the size of the whole lens system, to properly correct spherical aberration and coma aberration and achieve a desired focal length at the long focal length end. Such an advantageous effect is enhanced by satisfying conditional expression (25').

When the value exceeds the upper limit of conditional expressions (25), the refractive power of the first lens group G1 excessively decreases. This might lead to an increase in the size of the lens system as a whole or a decrease in the focal length of the lens system as a whole at the long focal length end.

When the value falls below the lower limit of conditional expression (25), the refractive power of the first lens group G1 excessively increases, and spherical aberration and coma aberration increase.

The zoom lens according to an embodiment preferably satisfies conditional expression (26) below, and more preferably conditional expression (26') below.

$$0.1 < (D12T - D12W)/f1 < 1.5 \tag{26}$$

$$0.2 < (D12T - D12W)/f1 < 1 \tag{26'}$$

where f1 denotes a focal length of the first lens group G1, and
D12T denotes a distance along the optical axis between a refractive surface closest to the image within the first lens group G1 and a refractive surface closest to the object within the second lens group in the zoom lens focused on infinity at the long focal length end, and
D12W denotes a distance along the optical axis between a refractive surface closest to the image within the first lens group G1 and a refractive surface closest to the object within the second lens group G2 in the zoom lens focused on infinity at the short focal length end.

Conditional Expression (26) is satisfied to enable the spacing between the first lens group G1 and the second lens group G2 to be varied by a desired amount during zooming, and achieve a reduction in the size of the lens system as a whole, thus achieving a magnification ratio sufficient to obtain intended performance.

Such an advantageous effect is enhanced by satisfying conditional expression (26').

When a value exceeds the upper limit of conditional expression (26), the amount by which the spacing between the first lens group G1 and the second lens group G2 is varied during zooming excessively increases, and the lens system as a whole increases in size.

When a value falls below the lower limit of conditional expression (26), the amount by which the spacing between the first lens group G1 and the second lens group G2 is varied during zooming excessively decreases, and the magnification ratio decreases, failing to achieve a magnification ratio sufficient to intended performance.

The zoom lens according to an embodiment preferably satisfies conditional expression (27) below, and more preferably conditional expression (27') below.

$$-1.5 < (D23W - D23T)/f2 < -0.1 \tag{27}$$

$$-1 < (D23W - D23T)/f2 < -0.2 \tag{27'}$$

where f2 denotes a focal length of the second lens group G2,
D23T denotes a distance along the optical axis between a refractive surface closest to the image within the second lens group G2 and a refractive surface closest to the object within the third lens group G3 in the zoom lens focused on infinity at the long focal length end, and
D23W denotes a distance along the optical axis between a refractive surface closest to the image within the second lens group G2 and a refractive surface closest to the object within the third lens group G3 in the zoom lens focused on infinity at the short focal length end.

Conditional expression (27) is satisfied to enable the spacing between the second lens group G2 and the third lens group G3 to be varied by a desired amount during zooming, and achieve a reduction in the size of the lens system as a whole, thus achieving a magnification ratio sufficient to obtain intended performance. Such an advantageous effect is enhanced by satisfying conditional expression (27').

When a value exceeds the upper limit of conditional expression (27), the amount by which the spacing between the second lens group G2 and the third lens group G3 is varied during zooming excessively increases, and the lens system as a whole increases in size.

When a value falls below the lower limit of conditional expression (27), the amount by which the spacing between the second lens group G2 and the third lens group G3 is varied during zooming excessively decreases, and the magnification ratio decreases, failing to achieve a magnification ratio sufficient to intended performance.

The zoom lens according to an embodiment preferably satisfies conditional expression (28) below, and more preferably conditional expression (28') below.

$$0.4 < TLT/fT < 0.95 \tag{28}$$

$$0.4 < TLT/fT < 0.94 \tag{28'}$$

where
TLT denotes a distance between a refractive surface closest to the object within the first lens group G1 and the image plane in the zoom lens focused on infinity at the long focal length end, and
fT denotes a focal length of the entirety of the zoom lens focused on infinity at the long focal length end.

Conditional expression (28) is satisfied to reduce the size of the entirety of the lens system, to properly correct spherical aberration and coma aberration and achieve a desired focal length at the long focal length end.

Such an advantageous effect is enhanced by satisfying conditional expression (28').

When a value exceeds the upper limit of conditional expressions (28), the lens system as a whole increases in size or the focal length of the lens system as a whole at the long focal length end decreases.

When a value falls below the lower limit of conditional expressions (28) and (28'), spherical aberration and coma aberration increase.

The zoom lens according to an embodiment includes at least one negative lens group in the rear group. In the zoom lens according to an embodiment, a negative lens group having the strongest negative refractive power within the rear group may be a focus lens group that is movable toward the image during a change in focus from infinity to the short distance. In this case, the zoom lens according to an embodiment preferably satisfies conditional expression (29) below, and more preferably conditional expression (29') below.

$$0.4 < f2/fFF < 2.6 \tag{29}$$

$$0.5 < f2/fFF < 2.5 \tag{29'}$$

where
f2 denotes a focal length of the second lens group G2, and
fFF denotes a focal length of the focus lens group.

Conditional expression (29) is satisfied to reduce the size of the lens system as a whole and also reduce the changes in aberrations with the capturing distance and the changes in aberrations during zooming. Such an advantageous effect is enhanced by satisfying conditional expression (29').

When a value exceeds the upper limit of conditional expression (29), the power of the second lens group G2 excessively decreases, and the power of the focus lens group excessively increases (at least one of such changes in power may occur). This leads to an increase in the size of the lens system as a whole and an increase in changes in aberrations according to the capturing distance.

When a value falls below the lower limit of conditional expression (29), the power of the second lens group G2 excessively increases, and the power of the focus lens group excessively decreases (at least one of such changes in power may occur). This leads to an increase in the size of the lens system as a whole and an increase in changes in aberrations during zooming.

The zoom lens according to an embodiment includes at least one negative lens group in the rear group. In the zoom lens according to an embodiment, a negative lens group having the strongest negative refractive power within the rear group may be a focus lens group that is movable toward the image during a change in focus from infinity to the short distance. In this case, the zoom lens according to an embodiment preferably satisfies conditional expression (30) below, and more preferably conditional expression (30') below.

$$(1-M\_FF^2) \times MR\_FF^2 < -3.0 \tag{30}$$

$$(1-M\_FF^2) \times MR\_FF^2 < -5.0 \tag{30'}$$

where
M_FF denotes lateral magnification of the focus lens group in the zoom lens focused on infinity at the long focal length end, and
MR_FF denotes a combined lateral magnification of all the lens groups disposed closer to the image than the focus lens group in the zoom lens focused on infinity at the long focal length end (MR_FF is 1 when the focus lens group is closest to the image).

Conditional expression (30) is satisfied to reduce the amount of movement of the focus lens group to enable high-speed autofocus (AF) and achieve a reduction in the size of the lens system as a whole.

When a value falls below the lower limit of conditional expression (30), the amount of movement of the focus lens group excessively increases and the high-speed AF becomes difficult. Moreover, the lens system as a whole might increase in size.

Specific numerical examples (Examples 1 to 11) are described below.

In the longitudinal aberration diagrams, lateral aberration diagrams, and Tables, the d-line, the g-line, and the C-line denote aberrations with respect to the wavelengths, respectively. Further, S denotes aberration with respect to the sagittal plane, and M denotes aberration with respect to the Meridional plane.

FNO. denotes an F-number, and f denotes a focal length.
W denotes a half angle of view, and Y denotes an image height.
BF denotes a back focus, and L denotes a lens total length.
R denotes the radius of curvature, and D denotes a lens thickness or a distance between lenses.
N(d) denotes a refractive index with respect to the d-line, and v(d) denotes the Abbe number for the de-line.

The back focus refers to the distance from the surface closest to the image within the entire lens system to a designed image plane.

The total lens length and the back focus each refers to an air-converted length that does not include the length of, for example, a cover glass, between the surface closest to the image within the entire lens system to the designed image plane.

In the following data, the F-number, focal length, magnification power, half angle of view, image height, back focus, lens total length, and distance D between lenses that is variable during zooming or with a change in focus are indicated sequentially from the short focal length end, the intermediate focal length, and the long focal length end. The unit of length is millimeter (mm).

A rotationally symmetric aspherical surface is defined by the following equation:

$$x=cy^2/[1+[1-(1+K)c^2y^2]^{1/2}]+A4y^4+A6y^6+A8y^8+A10y^{10}+A12y^{12}\ldots$$

(where c is a curvature (1/r), y is a height from the optical axis, K is a conical constant, and A4, A6, A8, . . . are aspherical coefficients of the respective orders).

First Numerical Example

FIGS. 12 to 18 and Tables 1 to 4 pertain to a zoom lens according to the first numerical example.

Figure 12:
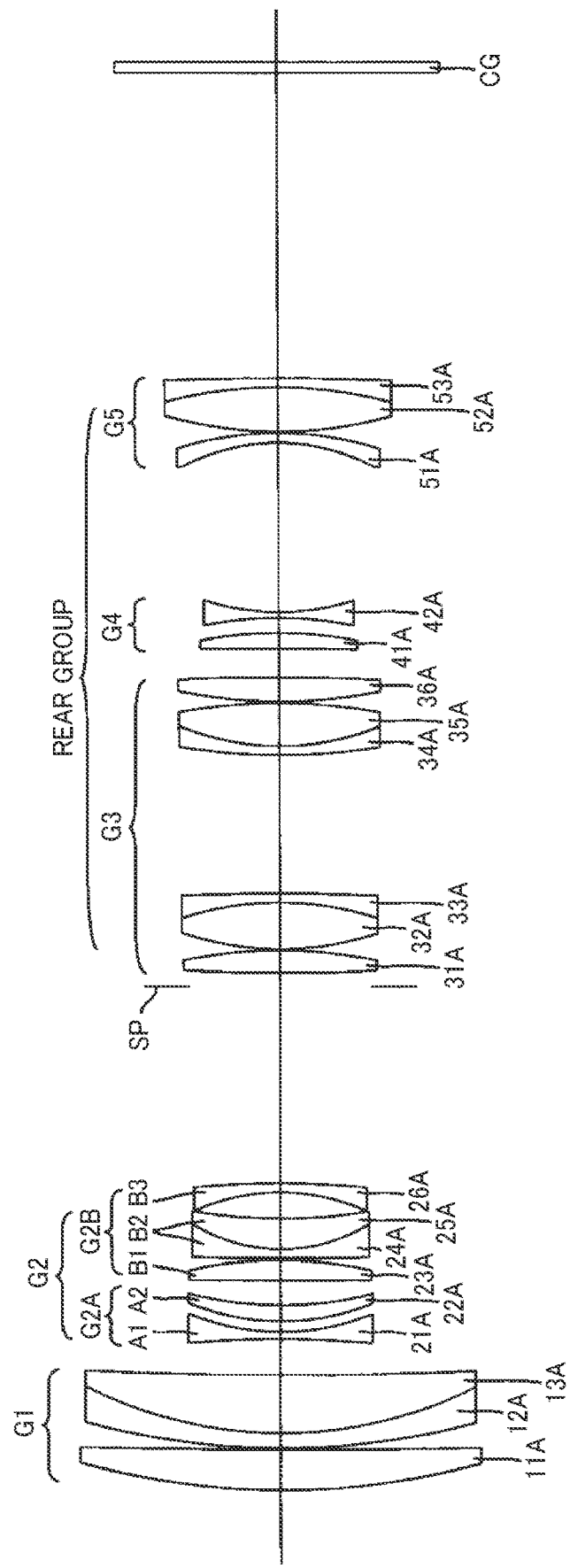
FIG. 12 is an illustration of a lens configuration of the zooming lens in FIG. 1 focused on infinity at a short focal length end.

FIG. 12 is an illustration of the configuration of the zoom lens focused on infinity at the short focal length end.

Figure 13:
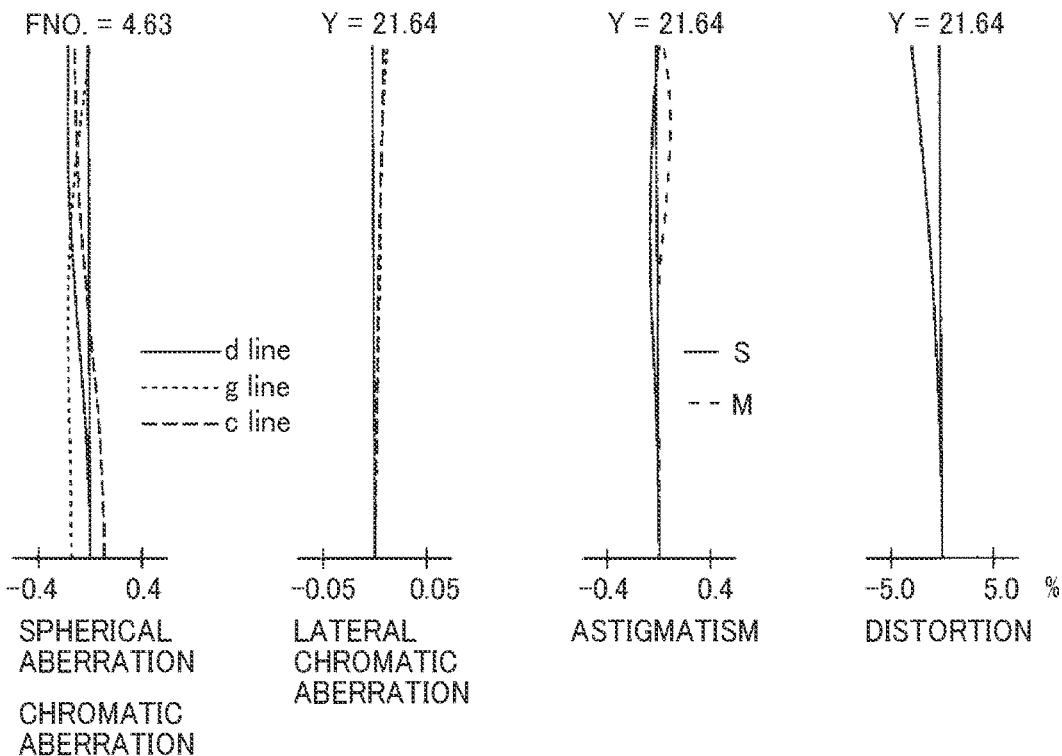
FIG. 13 is a collection of longitudinal aberration diagrams of the zoom lens in FIG. 1 focused on infinity at a short focal length end.
Figure 14:
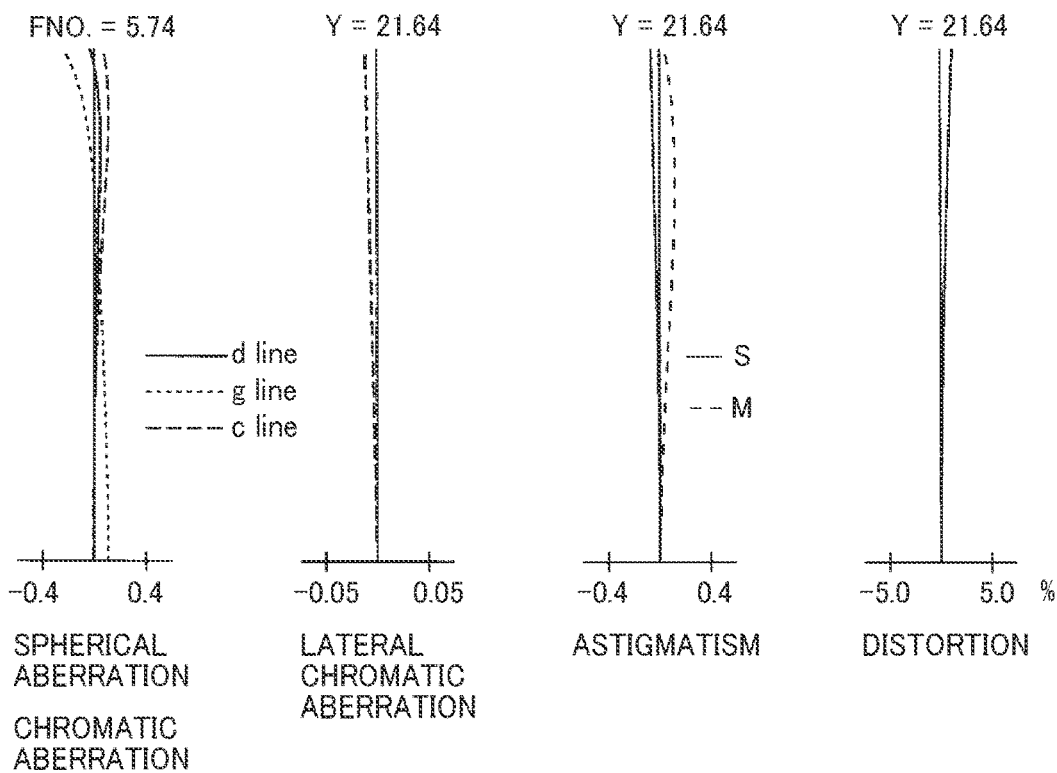
FIG. 14 is a collection of longitudinal aberration diagrams of the zoom lens in FIG. 1 focused on infinity at a long focal length end.

FIG. 13 is a collection of longitudinal aberration diagrams of the zoom lens focused on infinity at the short focal length end, and FIG. 14 is a collection of longitudinal aberration diagrams of the zoom lens focused on infinity at the long focal length end.

Figure 16:
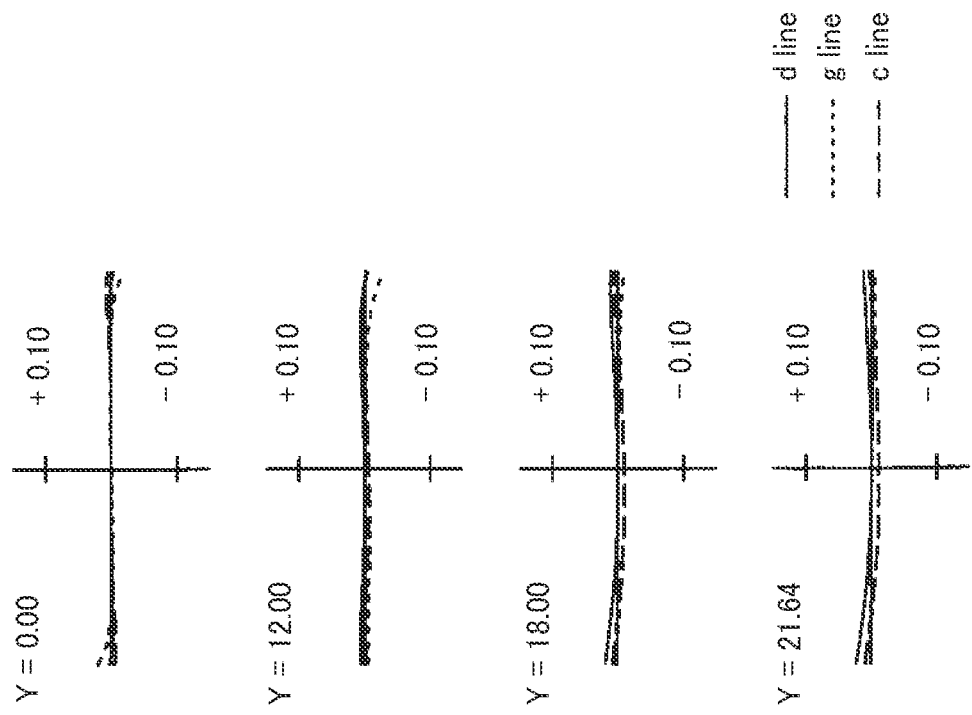
FIG. 16 is a collection of lateral aberration diagrams of the zoom lens in FIG. 1 focused on infinity at the long focal length end.
Figure 15:
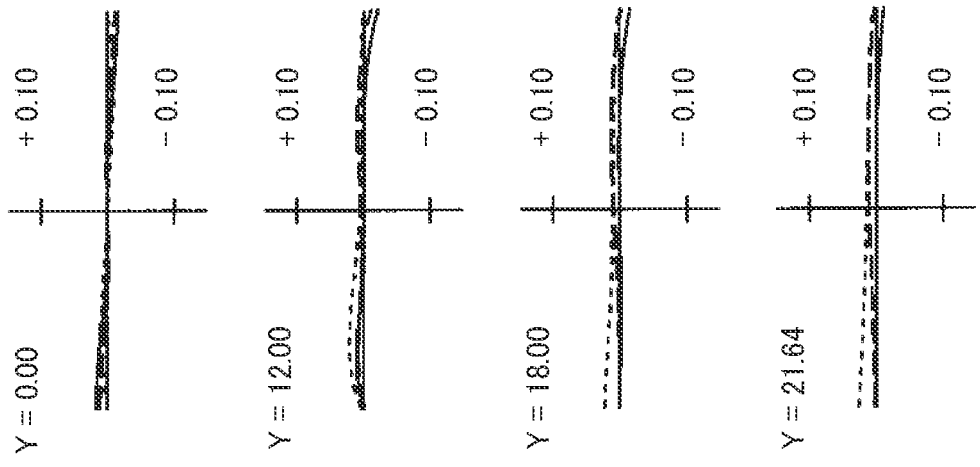
FIG. 15 is a collection of lateral aberration diagrams of the zoom lens in FIG. 1 focused on infinity at the short focal length end.

FIG. 15 is a collection of lateral aberration diagrams of the zoom lens focused on infinity at the short focal length end, and FIG. 16 is a collection of lateral aberration diagrams of the zoom lens focused on infinity at the long focal length end.

Figure 18:
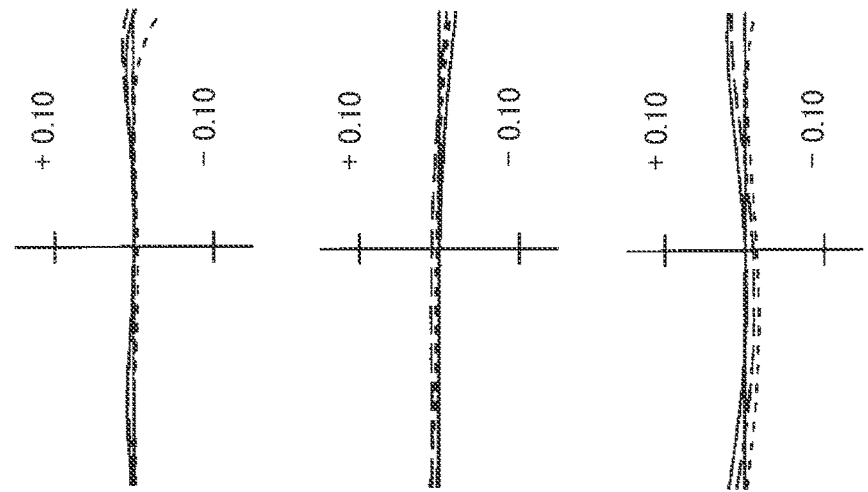
FIG. 18 is a collection of lateral aberration diagrams of the zoom lens in FIG. 1 focused on infinity at the long focal length end during the operation of vibration isolation.
Figure 17:
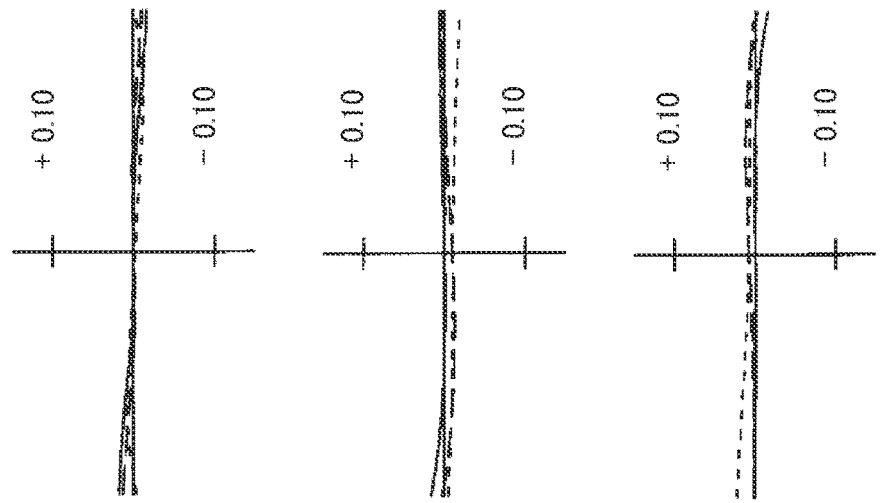
FIG. 17 is a collection of lateral aberration diagrams of the zoom lens in FIG. 1 focused on infinity at the short focal length end during the operation of vibration isolation.

FIG. 17 is a collection of lateral aberration diagrams of the zoom lens focused on infinity at the short focal length end (in FIG. 15) during the operation of vibration isolation. FIG. 18 is a collection of lateral aberration diagrams of the zoom lens focused on infinity at the long focal length end (in FIG. 16) during the operation of vibration isolation.

Table 1 presents surface data, and Table 2 presents various types of data. In Table 2, MP denotes magnification power. denotes a distance Table 3 presents data regarding the zoom-lens groups, and Table 4 presents data regarding principal-point locations.

In the data regarding principal-point location in Table 4, H1 denotes a distance along the optical axis (front principal point location) between the surface closest to the object within each lens group or each sub-lens group and the front principal point. H2 denotes a distance along the optical axis (the rear principal point location) between the surface closest to the image and the rear principal point. HH denotes a distance along the optical axis (principal-point interval) between the front principal point and the rear principal point.

The zoom lens according to the first numerical example consists of, sequentially from the object side toward the image side, a first lens group G1 having positive refractive power, a second lens group G2 having negative refractive power, a third lens group G3 having positive refractive power, a fourth lens group G4 having negative refractive power, and a fifth lens group G5 having positive refractive power.

The third lens group G3, the fourth lens group G4, and the fifth lens group G5 form a rear group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the fifth lens group G5 and the image plane.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens G1 substantially consists of a positive meniscus lens 11A with a convex surface facing the object, a negative meniscus lens 12A with a convex surface facing the object, and a positive meniscus lens 13A with a convex surface facing the object arranged in that order from the object side. The negative meniscus lens 12A and the positive meniscus lens 13A are cemented to each other.

The second lens group G2 has the configuration as described below.

The negative lens component A1 is a negative biconcave lens 21A. The positive lens component A2 is a positive meniscus lens 22A with a convex surface facing the object.

The positive lens component B1 is a positive biconvex lens 23A.

The negative lens component B2 is a cemented lens formed of a negative meniscus lens 24A with a convex surface facing the object and a positive meniscus lens 25A with a convex surface facing the object. The negative lens component B3 is a negative meniscus lens 26A with a convex surface facing the image.

The third lens group G3 consists of a positive biconvex lens 31A, a positive biconvex lens 32A, a negative meniscus lens 33A with a convex surface facing the image, a negative meniscus lens 34A with a convex surface facing the object, a positive biconvex lens 35A, and a positive biconvex lens 36A arranged in that order from the object side.

The positive biconvex lens 32A and the negative meniscus lens 33A are cemented to each other. The negative meniscus lens 34A and the positive biconvex lens 35A are cemented to each other.

The fourth lens group G4 consists of a positive meniscus lens 41A with a convex surface facing the image and a negative biconcave lens 42A, which are arranged in that order from the object side toward the image side.

The fifth lens group G5 consists of a negative meniscus lens 51A with a convex surface facing the image, a positive biconvex lens 52A, and a negative meniscus lens 53A with a convex surface facing the image, which are arranged in that order from the object side toward the image side. The positive biconvex lens 52A and the negative meniscus lens 53A are cemented to each other.

TABLE 1

Surface Data
Zoom ratio: 4.04

| Surface No. | R | D | N(d) | ν(d) |
|---|---|---|---|---|
| 1 | 99.253 | 5.400 | 1.48749 | 70.2 |
| 2 | 1397.368 | 0.200 | | |
| 3 | 100.745 | 1.950 | 1.83400 | 37.2 |
| 4 | 56.982 | 7.700 | 1.49700 | 81.6 |
| 5 | 585.095 | D5 | | |
| 6 | −141.620 | 0.960 | 1.65160 | 58.5 |
| 7 | 32.543 | 1.400 | | |
| 8 | 32.259 | 2.150 | 1.84666 | 23.8 |
| 9 | 50.420 | 3.244 | | |
| 10 | 1510.480 | 2.700 | 1.91082 | 35.2 |
| 11 | −54.493 | 0.200 | | |
| 12 | 417.468 | 1.200 | 1.83400 | 37.2 |

TABLE 1-continued

Surface Data
Zoom ratio: 4.04

| Surface No. | R | D | N(d) | v(d) |
|---|---|---|---|---|
| 13 | 22.174 | 4.090 | 1.76182 | 26.5 |
| 14 | 70.614 | 3.490 | | |
| 15 | −28.047 | 1.200 | 1.83400 | 37.2 |
| 16 | 122.178 | D16 | | |
| 17(Stop) | INFINITY | 1.800 | | |
| 18 | 238.169 | 3.000 | 1.80400 | 46.5 |
| 19 | −63.599 | 0.200 | | |
| 20 | 41.342 | 6.200 | 1.49700 | 81.6 |
| 21 | −41.342 | 1.200 | 2.00100 | 29.1 |
| 22 | −303.653 | 18.383 | | |
| 23 | 84.166 | 1.200 | 2.00100 | 29.1 |
| 24 | 35.196 | 5.700 | 1.48749 | 70.2 |
| 25 | −75.219 | 0.200 | | |
| 26 | 65.603 | 3.200 | 1.91082 | 35.2 |
| 27 | −332.779 | D27 | | |
| 28 | −875.660 | 2.130 | 1.84666 | 23.8 |
| 29 | −54.081 | 1.980 | | |
| 30 | −51.289 | 0.800 | 1.77250 | 49.6 |
| 31 | 32.834 | D31 | | |
| 32 | −27.290 | 1.300 | 1.48749 | 70.2 |
| 33 | −45.252 | 0.200 | | |
| 34 | 56.317 | 5.900 | 1.57501 | 41.5 |
| 35 | −58.451 | 1.200 | 1.90366 | 31.3 |
| 36 | −368.732 | D36 | | |
| 37 | INFINITY | 1.500 | 1.51633 | 64.1 |
| 38 | INFINITY | — | | |

TABLE 2

Various Data

| | Infinity | | | Short-distance | | |
|---|---|---|---|---|---|---|
| | Wide-angle | Inter-mediate | Telephoto | Wide-angle | Inter-mediate | Telephoto |
| FNO. | 4.6 | 5.2 | 5.7 | 4.6 | 5.2 | 5.7 |
| f | 72.08 | 135.00 | 291.32 | 67.32 | 110.85 | 157.13 |
| MP | 0.000 | 0.000 | 0.000 | −0.094 | −0.169 | −0.320 |
| W | 17.2 | 9.1 | 4.2 | 17.3 | 9.1 | 4.4 |
| Y | 21.64 | 21.64 | 21.64 | 21.64 | 21.64 | 21.64 |
| BF | 42.56 | 55.31 | 66.55 | 42.56 | 55.31 | 66.55 |
| L | 190.18 | 223.07 | 259.23 | 190.18 | 223.07 | 259.23 |
| D5 | 4.770 | 37.655 | 73.817 | 4.770 | 37.655 | 73.817 |
| D16 | 26.036 | 13.284 | 2.046 | 26.036 | 13.284 | 2.046 |
| D27 | 3.798 | 7.090 | 6.039 | 5.034 | 10.603 | 18.550 |
| D31 | 22.540 | 19.248 | 20.299 | 21.304 | 15.735 | 7.788 |
| D36 | 40.573 | 53.325 | 64.563 | 40.573 | 53.325 | 64.563 |

TABLE 3

Zoom-Lens Groups Data

| Group | Initial surface | Focal length |
|---|---|---|
| 1 | 1 | 161.89 |
| 2 | 6 | −29.08 |
| 3 | 18 | 35.49 |
| 4 | 28 | −43.86 |
| 5 | 32 | 3569.92 |

TABLE 4

Principal-Point Location

| | Focal length | H1 | HH | H2 |
|---|---|---|---|---|
| 1st lens group | 161.892 | −1.101 | 5.329 | 11.022 |
| 2nd lens group | −29.080 | 9.324 | 6.970 | 4.339 |
| 3rd lens group | 35.488 | 23.336 | −4.994 | 22.742 |
| 4th lens group | −43.856 | 4.929 | 1.210 | −1.229 |
| 5th lens group | 3569.921 | 24.542 | 3.357 | −19.298 |
| 2nd sub-lens-A | −67.466 | 0.776 | 1.422 | 2.311 |
| 2nd sub-lens-B | −65.751 | 13.772 | 3.099 | −3.991 |

Second Numerical Example

FIGS. 19 to 25 and Tables 5 to 8 pertain to a zoom lens according to the second numerical example.

Figure 19:
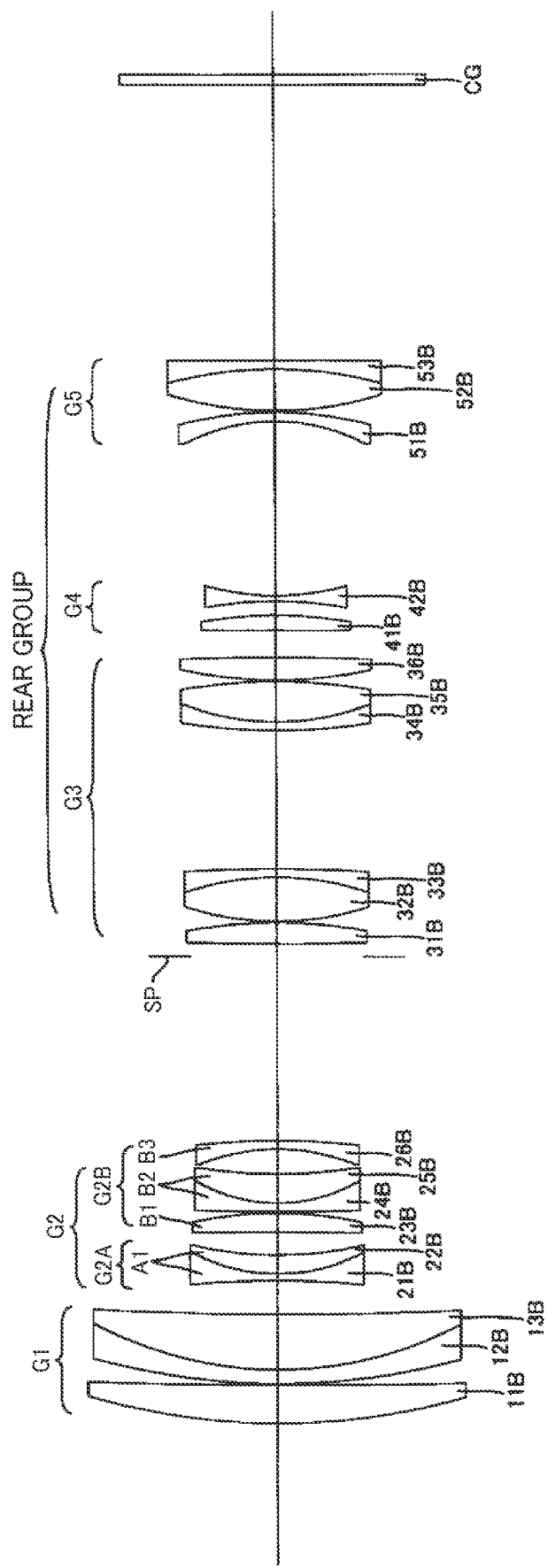
FIG. 19 is an illustration of a lens configuration of the zooming lens in FIG. 2 focused on infinity at a short focal length end.

FIG. 19 is an illustration of the configuration of the zoom lens focused on infinity at the short focal length end.

Figure 20:
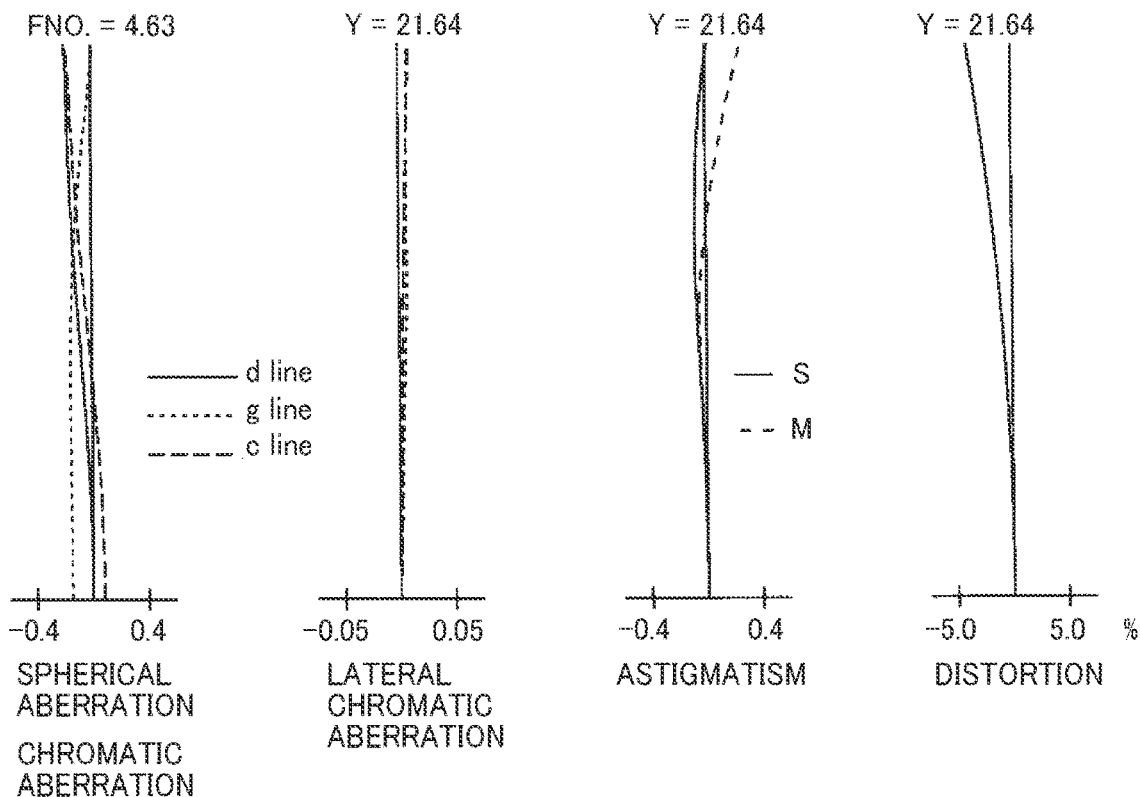
FIG. 20 is a collection of longitudinal aberration diagrams of the zoom lens in FIG. 2 focused on infinity at a short focal length end.
Figure 21:
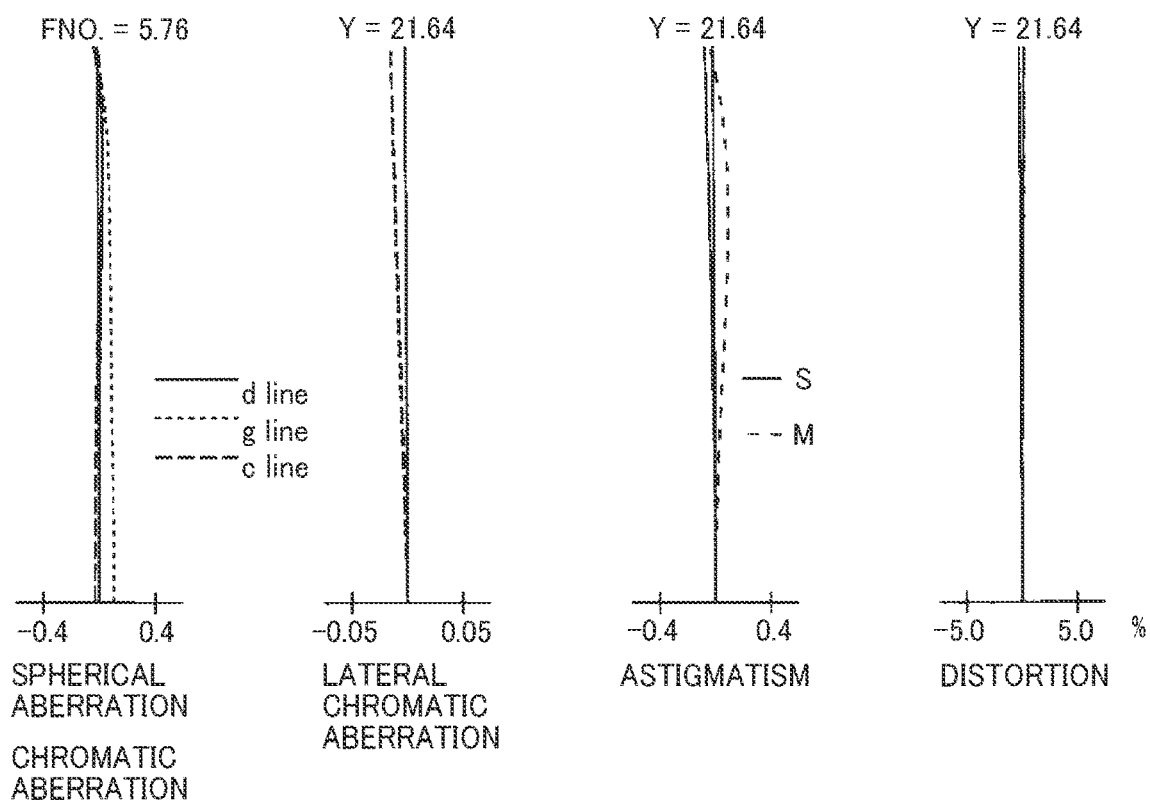
FIG. 21 is a collection of longitudinal aberration diagrams of the zoom lens in FIG. 2 focused on infinity at a long focal length end.

FIG. 20 is a collection of longitudinal aberration diagrams of the zoom lens focused on infinity at the short focal length end, and FIG. 21 is a collection of longitudinal aberration diagrams of the zoom lens focused on infinity at the long focal length end.

Figure 22:
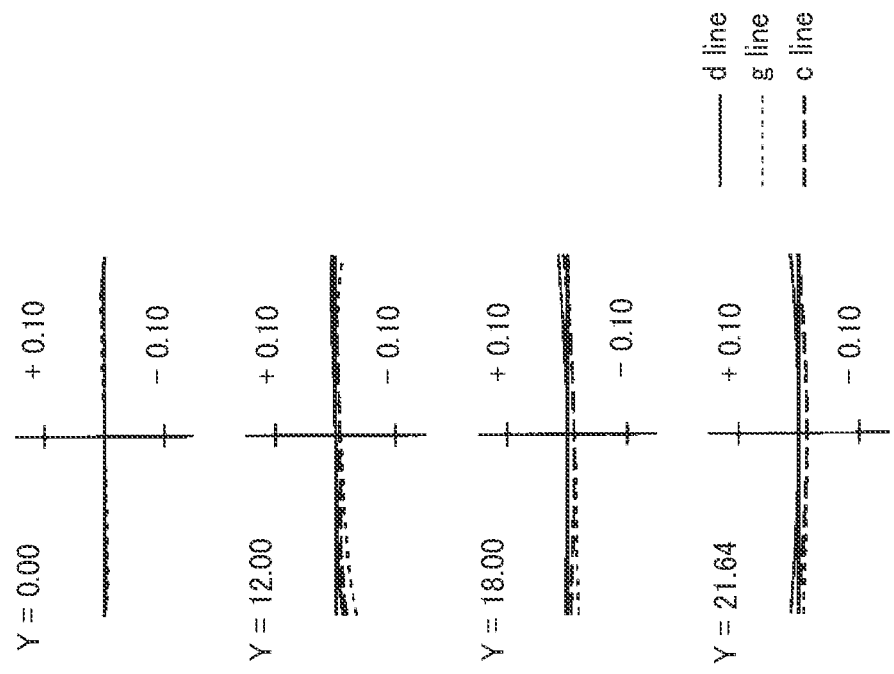
FIG. 22 is a collection of lateral aberration diagrams of the zoom lens in FIG. 2 focused on infinity at the short focal length end.
Figure 23:
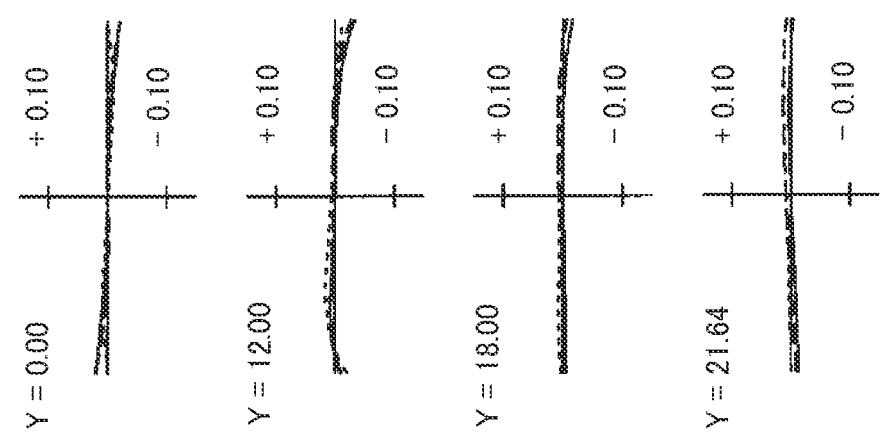
FIG. 23 is a collection of lateral aberration diagrams of the zoom lens in FIG. 2 focused on infinity at the long focal length end.

FIG. 22 is a collection of lateral aberration diagrams of the zoom lens focused on infinity at the short focal length end, and FIG. 23 is a collection of lateral aberration diagrams of the zoom lens focused on infinity at the long focal length end.

Figure 25:
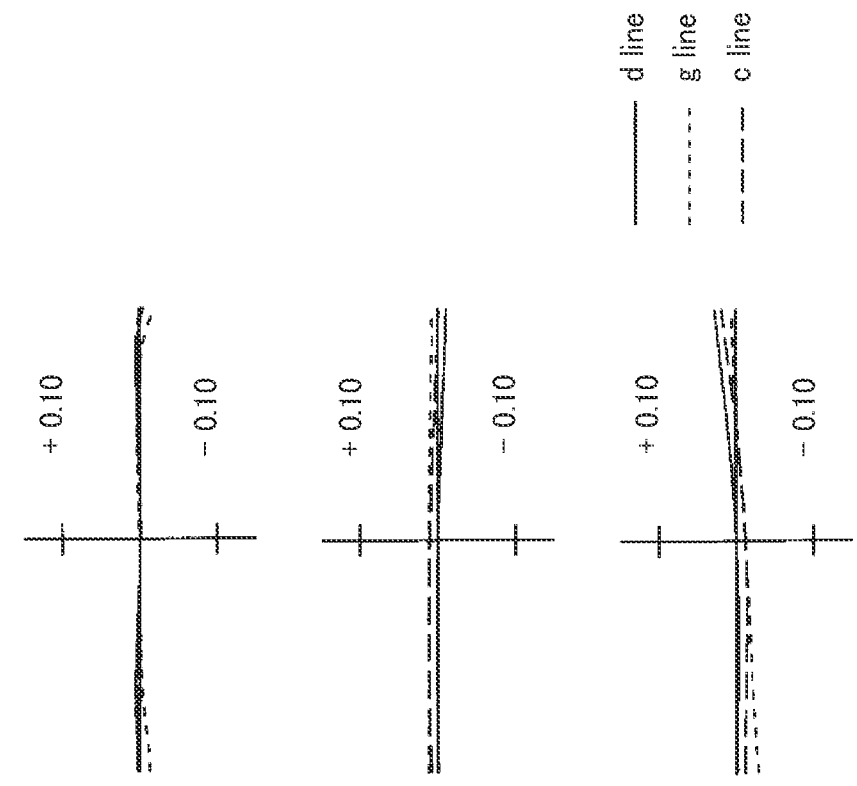
FIG. 25 is a collection of lateral aberration diagrams of the zoom lens in FIG. 2 focused on infinity at the long focal length end during the operation of vibration isolation.
Figure 24:
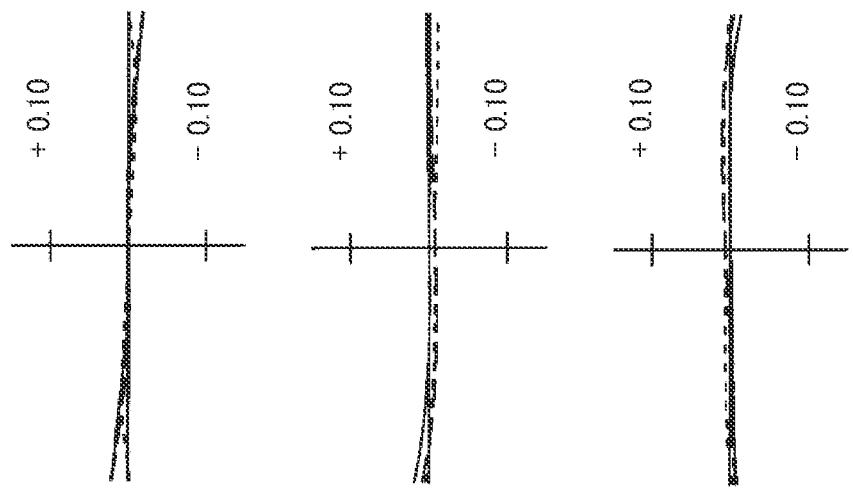
FIG. 24 is a collection of lateral aberration diagrams of the zoom lens in FIG. 2 focused on infinity at the short focal length end during the operation of vibration isolation.

FIG. 24 is a collection of lateral aberration diagrams of the zoom lens focused on infinity at the short focal length end (in FIG. 22) during the operation of vibration isolation. FIG. 25 is a collection of lateral aberration diagrams of the zoom lens focused on infinity at the long focal length end (in FIG. 23) during the operation of vibration isolation.

Table 5 presents surface data, and Table 6 presents various types of data. In Table 6, MP denotes magnification power.

Table 7 presents data regarding the zoom-lens groups, and Table 8 presents data regarding principal-point locations.

The zoom lens according to the second numerical example consists of, sequentially from the object side toward the image side, a first lens group G1 having positive refractive power, a second lens group G2 having negative refractive power, a third lens group G3 having positive refractive power, a fourth lens group G4 having negative refractive power, and a fifth lens group G5 having negative refractive power.

The third lens group G3, the fourth lens group G4, and the fifth lens group G5 form a rear group.

Between the second lens group G2 and the third lens group G3 (immediately in front of the third lens group G3), a stop SP for adjusting the intensity of light is disposed. The stop SP is movable together with the third lens group G3.

A plane-parallel plate CG is provided between the fifth lens group G5 and the image plane.

The second lens group G2 consists of a negative second sub-lens group-A G2A and a negative second sub-lens group-B G2B arranged in that order from the object side toward the image side.

The second sub-lens group-A G2A is a negative lens component A1.

The second sub-lens group-B G2B consists of a positive lens component B1, a negative lens component B2, and a negative lens component B3 arranged in that order from the object side toward the image side.

The first lens G1 consists of a positive meniscus lens 11B with a convex surface facing the object, a negative meniscus lens 12B with a convex surface facing the object, and a positive meniscus lens 13B with a convex surface facing the object arranged in that order from the object side toward the image side. The negative meniscus lens 12B and the positive meniscus lens 13B are cemented to each other.

The second lens group G2 has the configuration as described below. The negative lens component A1 is a cemented lens formed of a negative biconcave lens 21B and a positive meniscus lens 22B with a convex surface facing the object.

The positive lens component B1 is a positive meniscus lens 23B with a convex surface facing the image.

The negative lens component B2 is a cemented lens formed of a negative meniscus lens 24B with a convex surface facing the object and a positive meniscus lens 25B with a convex surface facing the object.

The negative lens component B3 is a negative meniscus lens 26B with a convex surface facing the image.

The third lens group G3 consists of a positive biconvex lens 31B, a positive biconvex lens 32B, a negative meniscus lens 33B with a convex surface facing the image, a negative meniscus lens 34B with a convex surface facing the object, a positive biconvex lens 35B, and a positive biconvex lens 36B arranged in that order from the object side.

The positive biconvex lens 32B and the negative meniscus lens 33B are cemented to each other.

The negative meniscus lens 34B and the positive biconvex lens 35B are cemented to each other.

The fourth lens group G4 consists of a positive meniscus lens 41B with a convex surface facing the image and a negative biconcave lens 42B, which are arranged in that order from the object side toward the image side.

The fifth lens group G5 consists of a negative meniscus lens 51B with a convex surface facing the image, a positive biconvex lens 52B, and a negative meniscus lens 53B with a convex surface facing the image, which are arranged in that order from the object side toward the image side.

The positive biconvex lens 52B and the negative meniscus lens 53B are cemented to each other.

TABLE 5

Surface Data
Zoom ratio: 4.04

| Surface No. | R | D | N(d) | ν(d) |
|---|---|---|---|---|
| 1 | 95.196 | 5.400 | 1.48749 | 70.2 |
| 2 | 1048.248 | 0.200 | | |
| 3 | 98.354 | 1.950 | 1.83400 | 37.2 |
| 4 | 55.577 | 7.700 | 1.49700 | 81.6 |
| 5 | 535.330 | D5 | | |
| 6 | −132.192 | 0.960 | 1.67790 | 55.3 |
| 7 | 26.384 | 2.550 | 1.85025 | 30.0 |
| 8 | 51.942 | 3.200 | | |
| 9 | −628.205 | 2.700 | 1.88300 | 40.8 |
| 10 | −56.093 | 0.200 | | |
| 11 | 337.136 | 1.200 | 1.83481 | 42.7 |
| 12 | 23.007 | 4.090 | 1.74077 | 27.8 |
| 13 | 73.050 | 3.490 | | |
| 14 | −28.923 | 1.200 | 1.83481 | 42.7 |
| 15 | −98.641 | D15 | | |
| 16(Stop) | INFINITY | 1.800 | | |
| 17 | 392.109 | 3.000 | 1.80400 | 46.5 |
| 18 | −67.683 | 0.200 | | |
| 19 | 43.172 | 6.200 | 1.49700 | 81.6 |
| 20 | −39.747 | 1.200 | 2.00100 | 29.1 |
| 21 | −182.641 | 19.472 | | |
| 22 | 87.196 | 1.200 | 2.00100 | 29.1 |
| 23 | 36.585 | 5.700 | 1.49700 | 81.6 |
| 24 | −77.089 | 0.200 | | |
| 25 | 62.514 | 3.200 | 1.91082 | 35.2 |

TABLE 5-continued

Surface Data
Zoom ratio: 4.04

| Surface No. | R | D | N(d) | ν(d) |
|---|---|---|---|---|
| 26 | −362.076 | D26 | | |
| 27 | −2384.919 | 2.130 | 1.84666 | 23.8 |
| 28 | −59.225 | 1.980 | | |
| 29 | −56.838 | 0.800 | 1.77250 | 49.6 |
| 30 | 35.387 | D30 | | |
| 31 | −26.929 | 1.300 | 1.49700 | 81.6 |
| 32 | −51.275 | 0.200 | | |
| 33 | 50.776 | 5.900 | 1.57501 | 41.5 |
| 34 | −58.271 | 1.200 | 1.90366 | 31.3 |
| 35 | −3275.839 | D35 | | |
| 36 | INFINITY | 1.500 | 1.51633 | 64.1 |
| 37 | INFINITY | — | | |

TABLE 6

Various Data

| | Infinity | | | Short-distance | | |
|---|---|---|---|---|---|---|
| | Wide-angle | Inter-mediate | Telephoto | Wide-angle | Inter-mediate | Telephoto |
| FNO. | 4.6 | 5.2 | 5.8 | 4.6 | 5.1 | 5.7 |
| f | 72.08 | 135.00 | 291.36 | 67.02 | 109.91 | 155.38 |
| MP | 0.000 | 0.000 | 0.000 | −0.094 | −0.167 | −0.316 |
| W | 17.4 | 9.2 | 4.2 | 17.5 | 9.2 | 4.5 |
| Y | 21.64 | 21.64 | 21.64 | 21.64 | 21.64 | 21.64 |
| BF | 40.87 | 52.54 | 64.51 | 40.87 | 52.54 | 64.51 |
| L | 190.17 | 224.75 | 258.32 | 190.17 | 224.75 | 258.32 |
| D5 | 4.727 | 39.306 | 72.871 | 4.727 | 39.306 | 72.871 |
| D15 | 25.708 | 14.038 | 2.069 | 25.708 | 14.038 | 2.069 |
| D26 | 3.798 | 6.440 | 6.039 | 5.058 | 9.978 | 18.500 |
| D30 | 24.550 | 21.908 | 22.308 | 23.290 | 18.370 | 9.848 |
| D35 | 38.879 | 50.549 | 62.518 | 38.879 | 50.549 | 62.518 |

TABLE 7

Zoom-Lens Groups Data

| Group | Initial surface | Focal length |
|---|---|---|
| 1 | 1 | 159.91 |
| 2 | 6 | 28.84 |
| 3 | 17 | 35.92 |
| 4 | 27 | −48.77 |
| 5 | 31 | 402.82 |

TABLE 8

Principal-Point Location

| | Focal length | H1 | HH | H2 |
|---|---|---|---|---|
| 1st lens group | 159.910 | −1.274 | 5.341 | 11.182 |
| 2nd lens group | −28.841 | 8.835 | 6.581 | 4.174 |
| 3rd lens group | 35.920 | 25.365 | −5.444 | 22.251 |
| 4th lens group | −48.770 | 5.045 | 1.207 | −1.343 |
| 5th lens group | −402.818 | 1.906 | 3.246 | 3.448 |
| 2nd sub-lens-A | −66.838 | 1.878 | 1.567 | 0.065 |
| 2nd sub-lens-B | −62.102 | 11.715 | 3.455 | −2.290 |

Third Numerical Example

FIGS. 26 to 32 and Tables 9 to 12 pertain to a zoom lens according to the third numerical example.

Figure 26:
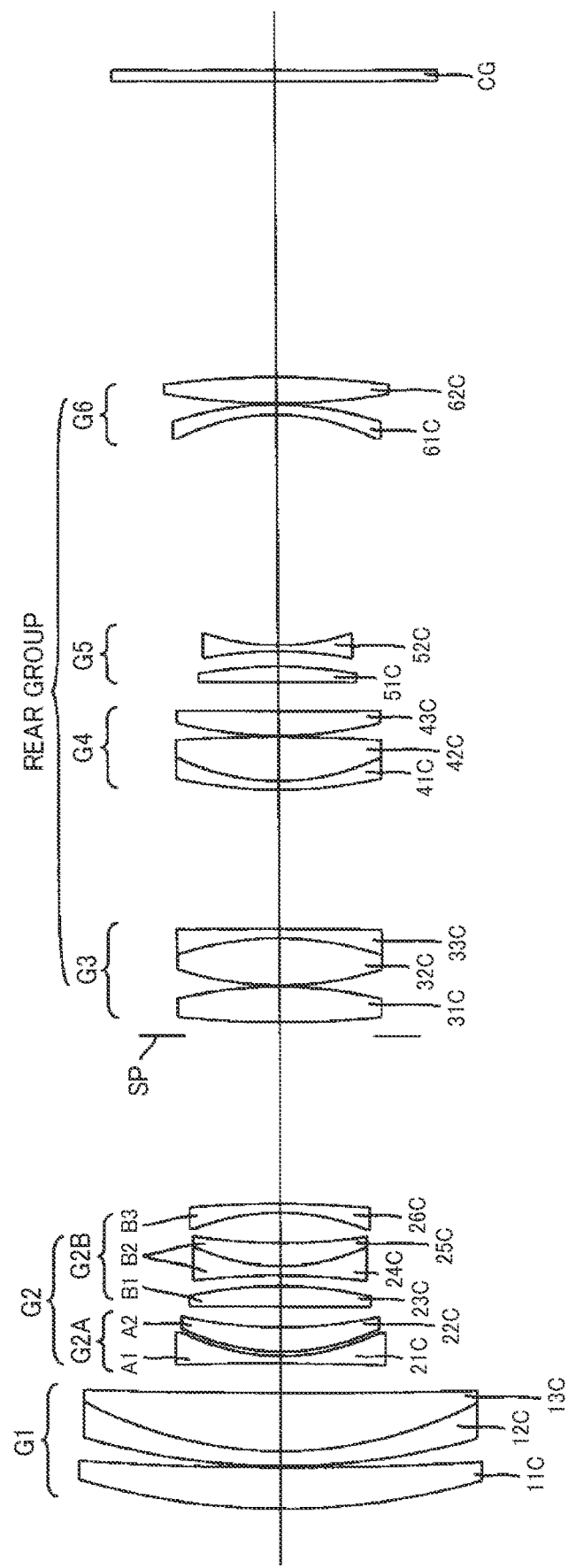
FIG. 26 is an illustration of a lens configuration of the zooming lens in FIG. 3 focused on infinity at a short focal length end.

FIG. 26 is an illustration of the configuration of the zoom lens focused on infinity at the short focal length end.

Figure 27:
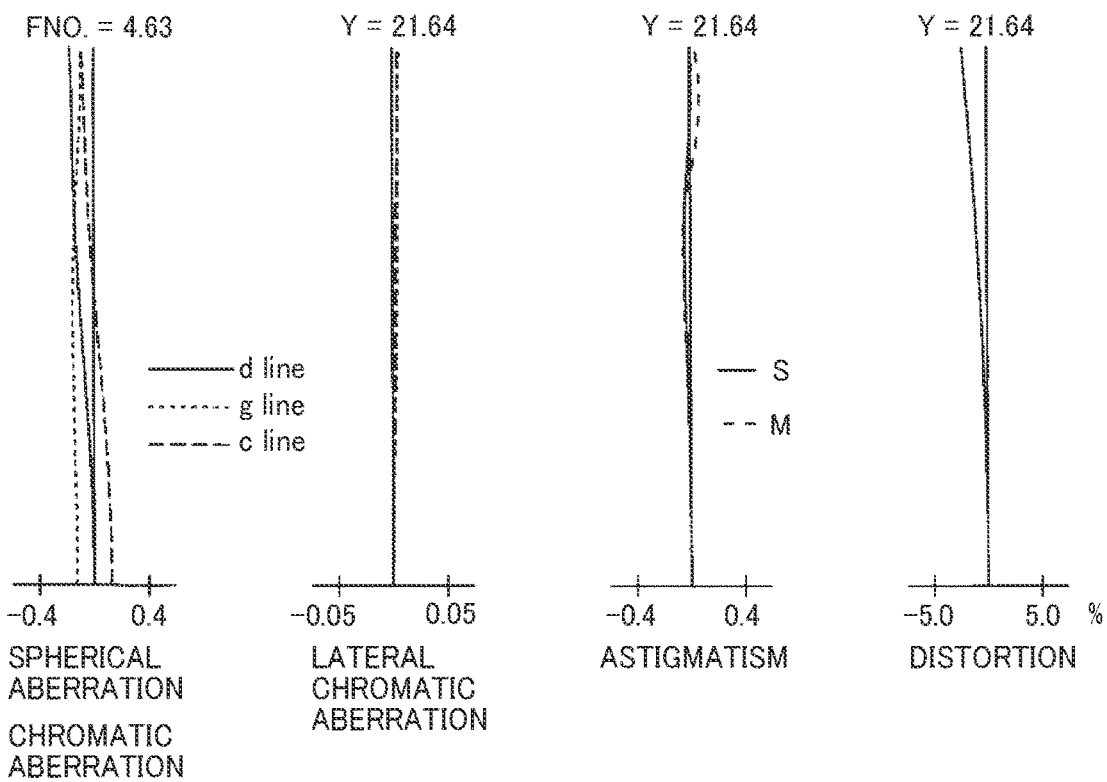
FIG. 27 is a collection of longitudinal aberration diagrams of the zoom lens in FIG. 3 focused on infinity at the short focal length end.
Figure 28:
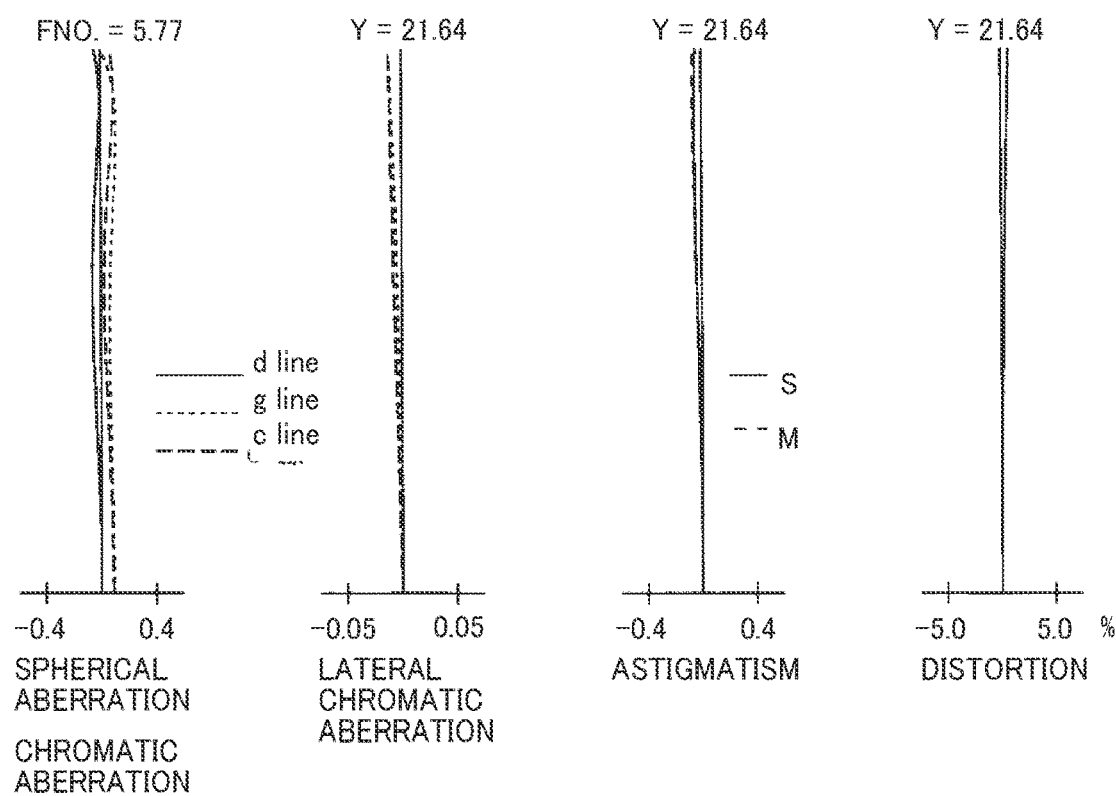
FIG. 28 is a collection of longitudinal aberration diagrams of the zoom lens in FIG. 3 focused on infinity at a long focal length end.

FIG. 27 is a collection of longitudinal aberration diagrams of the zoom lens focused on infinity at the short focal length end, and FIG. 28 is a collection of longitudinal aberration diagrams of the zoom lens focused on infinity at the long focal length end.

FIG. 29 is a collection of lateral aberration diagrams of the zoom lens focused on infinity at the short focal length end, and FIG. 30 is a collection of lateral aberration diagrams of the zoom lens focused on infinity at the long focal length end.

Figure 31:
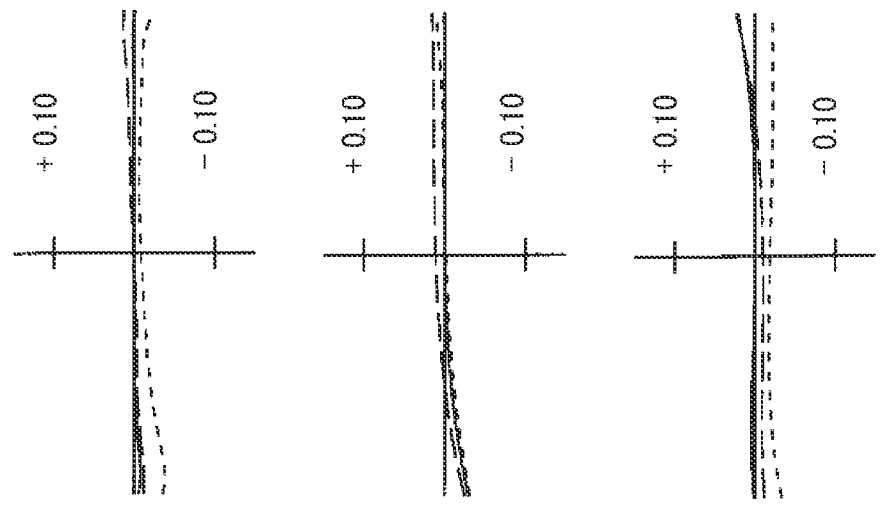
FIG. 31 is a collection of lateral aberration diagrams of the zoom lens in FIG. 3 focused on infinity at the short focal length end during the operation of vibration isolation.
Figure 32:
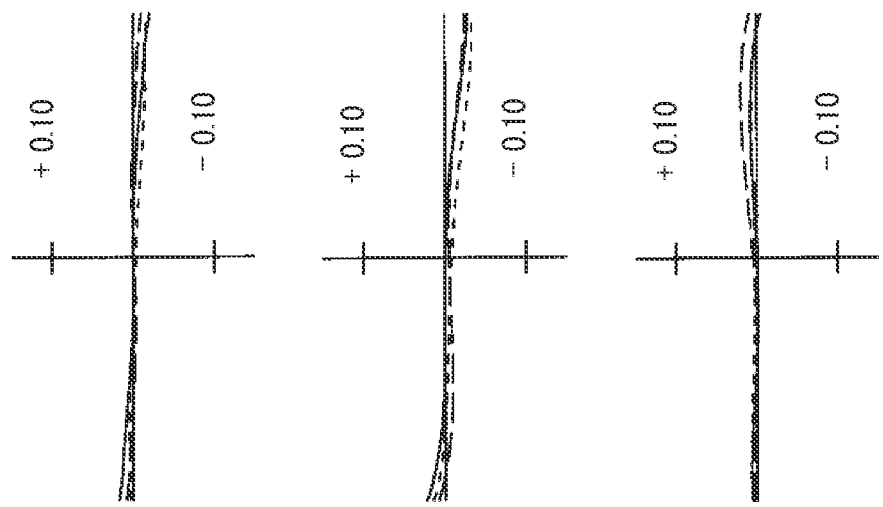
FIG. 32 is a collection of lateral aberration diagrams of the zoom lens in FIG. 3 focused on infinity at the long focal length end during the operation of vibration isolation.

FIG. 31 is a collection of lateral aberration diagrams of the zoom lens focused on infinity at the short focal length end (in FIG. 29) during the operation of vibration isolation. FIG. 32 is a collection of lateral aberration diagrams of the zoom lens focused on infinity at the long focal length end (in FIG. 30) during the operation of vibration isolation.

Table 9 presents surface data, and Table 10 presents various types of data. In Table 10, MP denotes magnification power.

Table 11 presents data regarding the zoom-lens groups, and Table 12 presents data regarding principal-point locations.

The zoom lens according to the third numerical example consists of, sequentially from the object side toward the image side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power.

The third lens group G3, the fourth lens group G4, the fifth lens group G5, and the sixth lens group G6 form a rear group. Between the second lens group G2 and the third lens group G3 (immediately in front of the third lens group G3), a stop SP for adjusting the intensity of light is disposed. The stop SP is movable together with the third lens group G3. A plane-parallel plate CG is provided between the sixth lens group G6 and the image plane.

The second lens group G2 consists of a negative second sub-lens group-A G2A and a negative second sub-lens group-B G2B arranged in that order from the object side toward the image side. The second sub-lens group-A G2A consists of a negative lens component A1 and a positive lens component A2 arranged in that order from the object side toward the image side. The second sub-lens group-B G2B consists of a positive lens component B1, a negative lens component B2, and a negative lens component B3 arranged in that order from the object side toward the image side.

The first lens group G1 consists of a positive meniscus lens 11C with a convex surface facing the object, a negative meniscus lens 12C with a convex surface facing the object, and a positive meniscus lens 13C with a convex surface facing the object arranged in that order from the object side toward the image side. The negative meniscus lens 12C and the positive meniscus lens 13C are cemented to each other.

The second lens group G2 has the configuration as described below. The negative lens component A1 is a negative biconcave lens 21C. The positive lens component A2 is a positive meniscus lens 22C with a convex surface facing the object. The positive lens component B1 is a positive planoconvex lens 23C with a convex surface facing the image.

The negative lens component B2 is a cemented lens formed of a negative biconcave lens 24C and a positive meniscus lens 25C with a convex surface facing the object.

The negative lens component B3 is a negative meniscus lens 26C with a convex surface facing the image.

The third lens group G3 consists of a positive biconvex lens 31C, a positive biconvex lens 32C, and a negative meniscus lens 33C having a convex surface facing the image, which are arranged in that order from the object side.

The positive biconvex lens 32C and the negative meniscus lens 33C are cemented to each other.

The fourth lens group G4 consists of a negative meniscus lens 41C with a convex surface facing the object, a positive biconvex lens 42C, and a positive meniscus lens 43C with a convex surface facing the object, which are arranged in that order from the object side toward the image side.

The negative meniscus lens 41C and the positive biconvex lens 42C are cemented to each other.

The fifth lens group G5 consists of a positive meniscus lens 51C with a convex surface facing the image and a negative biconcave lens 52C, which are arranged in that order from the object side toward the image side.

The sixth lens group G6 consists of a negative meniscus lens 61C with a convex surface facing the image and a positive biconvex lens 62C, which are arranged in that order from the object side toward the image side.

TABLE 9

Surface Data
Zoom ratio: 4.04

| Surface No. | R | D | N(d) | v(d) |
|---|---|---|---|---|
| 1 | 95.587 | 5.400 | 1.48749 | 70.2 |
| 2 | 452.199 | 0.200 | | |
| 3 | 93.385 | 1.950 | 1.83400 | 37.2 |
| 4 | 55.168 | 7.700 | 1.49700 | 81.6 |
| 5 | 874.413 | D5 | | |
| 6 | −358.557 | 0.960 | 1.76385 | 48.5 |
| 7 | 29.403 | 0.569 | | |
| 8 | 29.784 | 3.200 | 1.72047 | 34.7 |
| 9 | 62.507 | 2.704 | | |
| 10 | INFINITY | 2.700 | 1.59270 | 35.3 |
| 11 | −54.422 | 1.390 | | |
| 12 | −93.700 | 1.200 | 1.69680 | 55.5 |
| 13 | 27.580 | 3.000 | 1.74000 | 28.3 |
| 14 | 79.006 | 3.990 | | |
| 15 | −30.492 | 1.200 | 1.59282 | 68.6 |
| 16 | −124.524 | D16 | | |
| 17(Stop) | INFINITY | 1.800 | | |
| 18 | 137.036 | 4.634 | 1.80400 | 46.5 |
| 19 | −57.504 | 0.200 | | |
| 20 | 45.053 | 6.200 | 1.49700 | 81.6 |
| 21 | −42.997 | 1.200 | 2.00100 | 29.1 |
| 22 | −1140.563 | D22 | | |
| 23 | 61.508 | 1.200 | 2.00100 | 29.1 |
| 24 | 31.921 | 5.700 | 1.53775 | 74.7 |
| 25 | −211.767 | 0.200 | | |
| 26 | 55.543 | 3.200 | 1.88100 | 40.1 |
| 27 | 1762.466 | D27 | | |
| 28 | −7660.580 | 2.130 | 1.84666 | 23.8 |
| 29 | −56.886 | 1.980 | | |
| 30 | −55.474 | 0.800 | 1.77250 | 49.6 |
| 31 | 30.574 | D31 | | |
| 32 | −28.295 | 1.300 | 1.61272 | 58.7 |
| 33 | −43.300 | 0.200 | | |
| 34 | 93.405 | 3.400 | 1.48749 | 70.2 |
| 35 | −111.183 | D35 | | |
| 36 | INFINITY | 1.500 | 1.51633 | 64.1 |
| 37 | INFINITY | — | | |

TABLE 10

Various Data

|  | Infinity | | | Short-distance | | |
| --- | --- | --- | --- | --- | --- | --- |
|  | Wide-angle | Inter-mediate | Telephoto | Wide-angle | Inter-mediate | Telephoto |
| FNO. | 4.6 | 5.2 | 5.8 | 4.6 | 5.2 | 6.1 |
| f | 72.08 | 135.00 | 291.36 | 67.98 | 113.67 | 166.07 |
| MP | 0.000 | 0.000 | 0.000 | −0.095 | −0.171 | −0.342 |
| W | 17.1 | 9.1 | 4.2 | 16.9 | 8.9 | 4.2 |
| Y | 21.64 | 21.64 | 21.64 | 21.64 | 21.64 | 21.64 |
| BF | 41.18 | 56.80 | 73.07 | 41.18 | 56.80 | 73.07 |
| L | 190.19 | 223.36 | 259.26 | 190.19 | 223.36 | 259.26 |
| D5 | 3.949 | 37.117 | 73.015 | 3.949 | 37.117 | 73.015 |
| D16 | 22.031 | 10.806 | 1.523 | 22.031 | 10.806 | 1.523 |
| D22 | 18.383 | 13.996 | 7.001 | 18.383 | 13.996 | 7.001 |
| D27 | 3.798 | 7.525 | 6.039 | 5.027 | 11.016 | 18.376 |
| D31 | 30.538 | 26.812 | 28.297 | 29.309 | 23.321 | 15.960 |
| D35 | 39.195 | 54.807 | 71.085 | 39.195 | 54.807 | 71.085 |

TABLE 11

Zoom-Lens Groups Data

| Group | Initial surface | Focal length |
| --- | --- | --- |
| 1 | 1 | 157.16 |
| 2 | 6 | −26.41 |
| 3 | 18 | 47.22 |
| 4 | 23 | 51.26 |
| 5 | 28 | −42.99 |
| 6 | 32 | 392.52 |

TABLE 12

Principal-Point Location

|  | Focal length | H1 | HH | H2 |
| --- | --- | --- | --- | --- |
| 1st lens group | 157.156 | −0.799 | 5.302 | 10.747 |
| 2nd lens group | −26.406 | 8.400 | 6.296 | 6.218 |
| 3rd lens group | 47.217 | 1.566 | 5.036 | 7.432 |
| 4th lens group | 51.263 | 3.652 | 3.998 | 2.650 |
| 5th lens group | −42.990 | 4.987 | 1.199 | −1.277 |
| 6th lens group | 392.523 | 12.130 | 1.932 | −9.161 |
| 2nd sub-lens-A | −65.214 | 1.376 | 1.805 | 1.548 |
| 2nd sub-lens-B | −54.180 | 10.159 | 2.939 | 0.382 |

Fourth Numerical Example

FIGS. 33 to 39 and Tables 13 to 16 pertain to a zoom lens according to the fourth numerical example.

Figure 33:
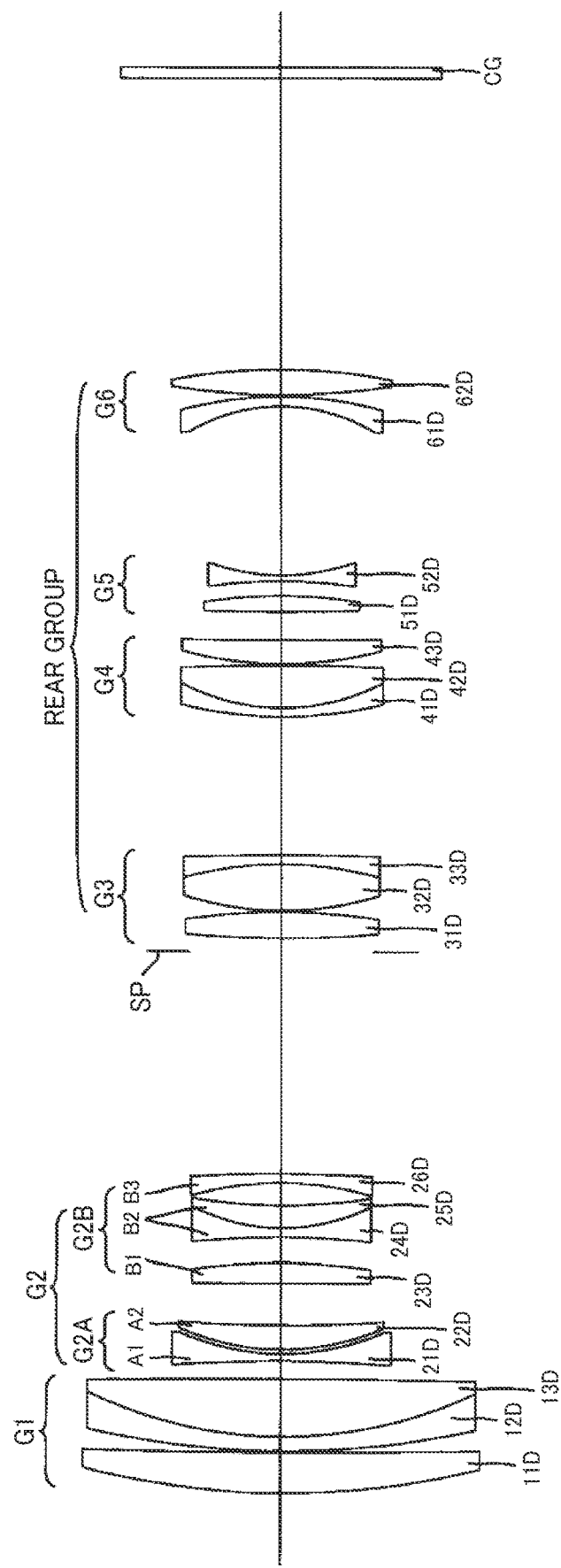
FIG. 33 is an illustration of a lens configuration of the zooming lens in FIG. 4 focused on infinity at a short focal length end.

FIG. 33 is an illustration of the configuration of the zoom lens focused on infinity at the short focal length end.

Figure 34:
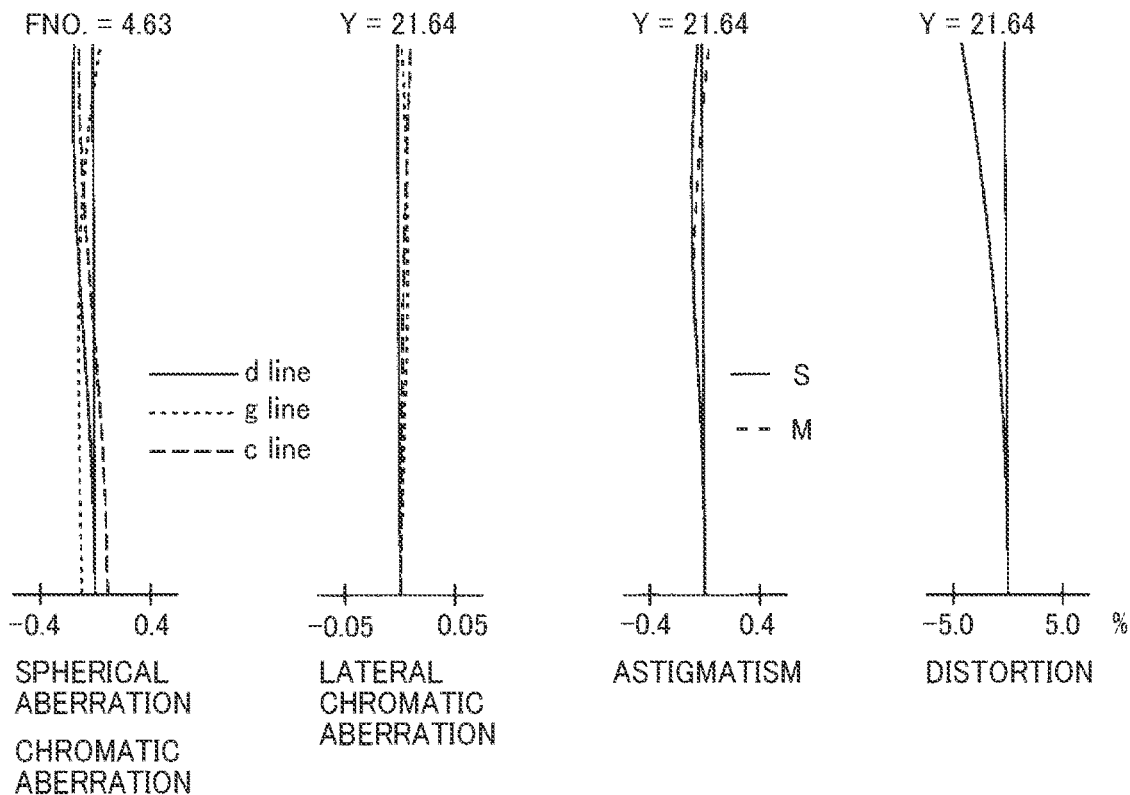
FIG. 34 is a collection of longitudinal aberration diagrams of the zoom lens in FIG. 4 focused on infinity at the short focal length end.
Figure 35:
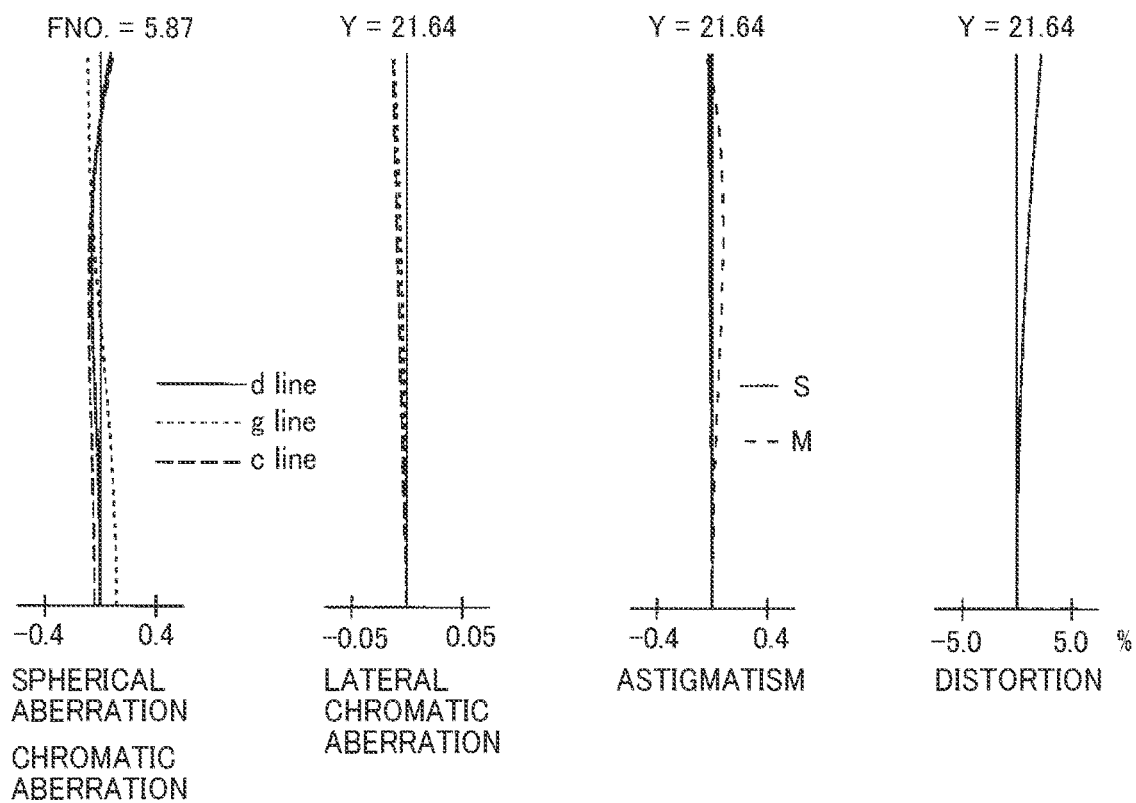
FIG. 35 is a collection of longitudinal aberration diagrams of the zoom lens in FIG. 4 focused on infinity at a long focal length end.

FIG. 34 is a collection of longitudinal aberration diagrams of the zoom lens focused on infinity at the short focal length end, and FIG. 35 is a collection of longitudinal aberration diagrams of the zoom lens focused on infinity at the long focal length end.

Figure 36:
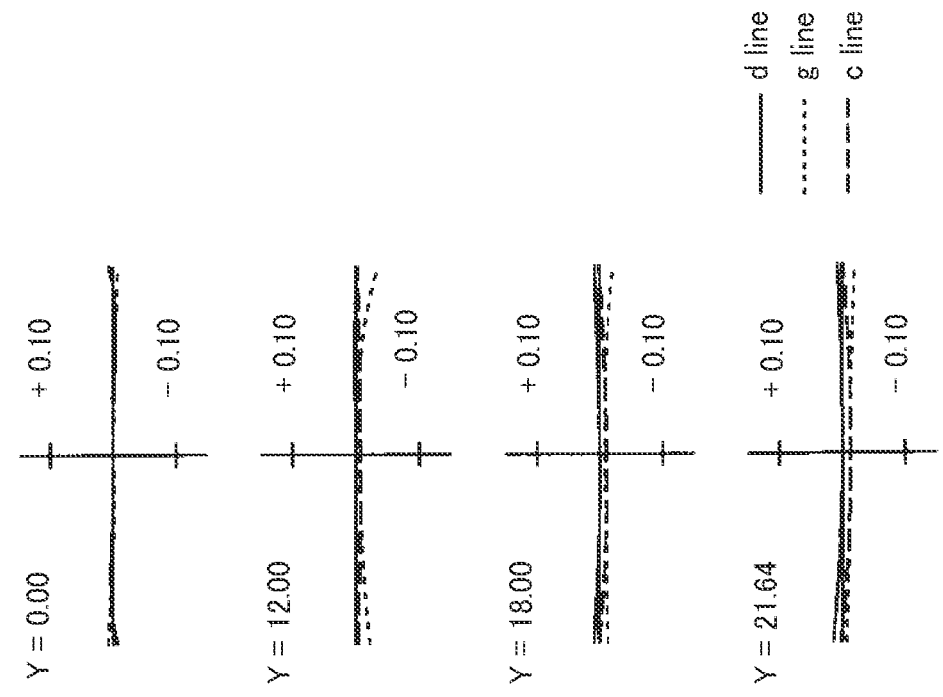
FIG. 36 is a collection of lateral aberration diagrams of the zoom lens in FIG. 4 focused on infinity at the short focal length end.
Figure 37:
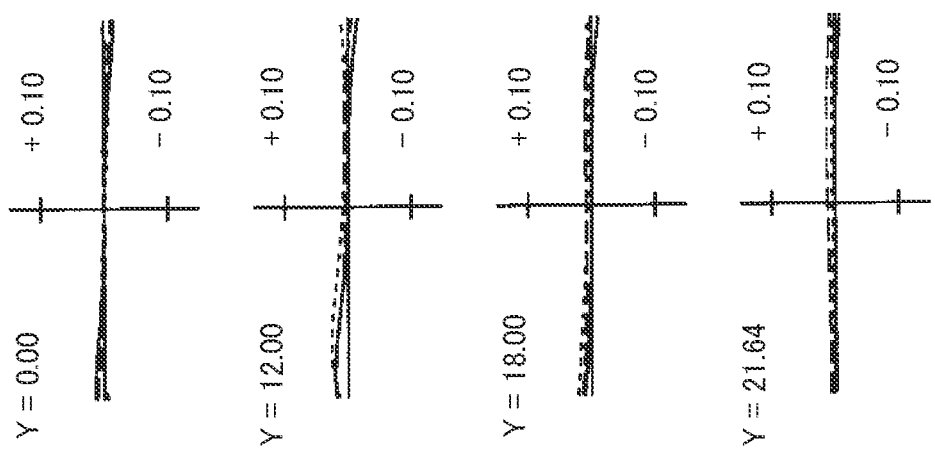
FIG. 37 is a collection of lateral aberration diagrams of the zoom lens in FIG. 4 focused on infinity at the long focal length end.

FIG. 36 is a collection of lateral aberration diagrams of the zoom lens focused on infinity at the short focal length end, and FIG. 37 is a collection of lateral aberration diagrams of the zoom lens focused on infinity at the long focal length end.

Figure 39:
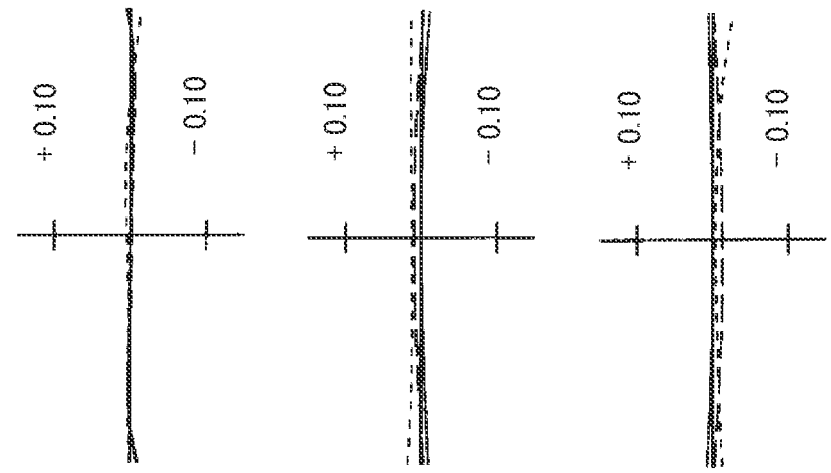
FIG. 39 is a collection of lateral aberration diagrams of the zoom lens in FIG. 4 focused on infinity at the long focal length end during the operation of vibration isolation.
Figure 38:
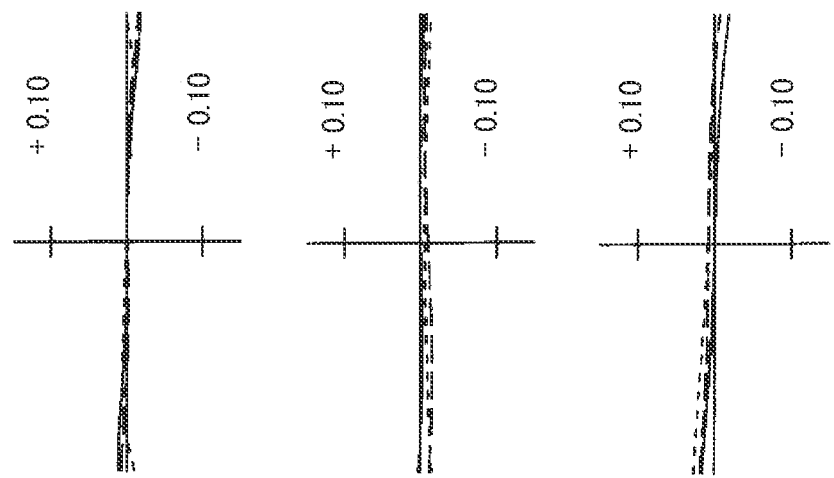
FIG. 38 is a collection of lateral aberration diagrams of the zoom lens in FIG. 4 focused on infinity at the short focal length end during the operation of vibration isolation.

FIG. 38 is a collection of lateral aberration diagrams of the zoom lens focused on infinity at the short focal length end (in FIG. 36) during the operation of vibration isolation. FIG. 39 is a collection of lateral aberration diagrams of the zoom lens focused on infinity at the long focal length end (in FIG. 37) during the operation of vibration isolation.

Table 13 presents surface data, and Table 14 presents various types of data. In Table 14, NIP denotes magnification power.

Table 15 presents data regarding the zoom-lens groups, and Table 16 presents data regarding principal-point locations.

The zoom lens according to the fourth numerical example consists of, sequentially from the object side toward the image side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power.

The third lens group G3, the fourth lens group G4, the fifth lens group G5, and the sixth lens group G6 form a rear group.

Between the second lens group G2 and the third lens group G3 (immediately in front of the third lens group G3), a stop SP for adjusting the intensity of light is disposed. The stop SP is movable together with the third lens group G3. A plane-parallel plate CG is provided between the sixth lens group G6 and the image plane.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens group G1 consists of a positive meniscus lens 11D with a convex surface facing the object, a negative meniscus lens 12D with a convex surface facing the object, and a positive biconvex lens 13D, which are arranged in that order from the object side toward the image side.

The negative meniscus lens 12D and the positive biconvex lens 13D are cemented to each other.

The second lens group G2 has the configuration as described below. The negative lens component A1 is a negative biconcave lens 21D.

The positive lens component A2 is a positive meniscus lens 22D with a convex surface facing the object. The positive lens component B1 is a positive planoconvex lens 23D with a convex surface facing the image.

The negative lens component B2 is a cemented lens formed of a negative biconcave lens 24D and a positive meniscus lens 25D with a convex surface facing the object.

The negative lens component B3 is a negative meniscus lens 26D with a convex surface facing the image.

The third lens group G3 consists of a positive biconvex lens 31D, a positive biconvex lens 32D, and a negative meniscus lens 33D having a convex surface facing the image, which are arranged in that order from the object side toward the image side.

The positive biconvex lens 32D and the negative meniscus lens 33D are cemented to each other.

The fourth lens group G4 consists of a negative meniscus lens 41D with a convex surface facing the object, a positive biconvex lens 42D, and a positive meniscus lens 43D with a convex surface facing the object, which are arranged in that order from the object side.

The negative meniscus lens 41D and the positive biconvex lens 42D are cemented to each other.

The fifth lens group G5 consists of a positive biconvex lens 51D and a negative biconcave lens 52D, which are arranged in that order from the object side toward the image side.

The sixth lens group G6 consists of a negative meniscus lens 61D with a convex surface facing the image and a positive biconvex lens 62D, which are arranged in that order from the object side toward the image side.

TABLE 13

Surface Data
Zoom ratio: 4.26

| Surface No. | R | D | N(d) | v(d) |
|---|---|---|---|---|
| 1 | 108.594 | 5.400 | 1.48749 | 70.2 |
| 2 | 1153.187 | 0.200 | | |
| 3 | 116.480 | 1.950 | 1.80440 | 39.6 |
| 4 | 60.171 | 7.700 | 1.49700 | 81.6 |
| 5 | −1472.922 | D5 | | |
| 6 | −198.519 | 0.960 | 1.78800 | 47.4 |
| 7 | 34.444 | 0.569 | | |
| 8 | 34.438 | 3.200 | 1.70154 | 41.2 |
| 9 | 188.940 | 5.583 | | |
| 10 | INFINITY | 2.700 | 1.57501 | 41.5 |
| 11 | −81.923 | 3.405 | | |
| 12 | −112.903 | 1.200 | 1.75500 | 52.3 |
| 13 | 26.842 | 3.000 | 1.80518 | 25.4 |
| 14 | 74.697 | 2.990 | | |
| 15 | −44.619 | 1.200 | 1.61800 | 63.4 |
| 16 | −210.295 | D16 | | |
| 17(Stop) | INFINITY | 1.800 | | |
| 18 | 147.630 | 3.500 | 1.80400 | 46.5 |
| 19 | −88.237 | 0.200 | | |
| 20 | 43.827 | 6.200 | 1.49700 | 81.6 |
| 21 | −49.668 | 1.200 | 2.00100 | 29.1 |
| 22 | −434.943 | D22 | | |
| 23 | 56.044 | 1.200 | 2.00100 | 29.1 |
| 24 | 29.260 | 5.700 | 1.53775 | 74.7 |
| 25 | −289.914 | 0.200 | | |
| 26 | 52.059 | 3.200 | 1.88100 | 40.1 |
| 27 | 960.950 | D27 | | |
| 28 | 467.960 | 2.130 | 1.84666 | 23.8 |
| 29 | −68.780 | 1.980 | | |
| 30 | −70.216 | 0.800 | 1.77250 | 49.6 |
| 31 | 29.200 | D31 | | |
| 32 | −24.565 | 1.300 | 1.61272 | 58.7 |
| 33 | −51.646 | 0.200 | | |
| 34 | 95.920 | 3.400 | 1.48749 | 70.2 |
| 35 | −78.071 | D35 | | |
| 36 | INFINITY | 1.500 | 1.51633 | 64.1 |
| 37 | INFINITY | — | | |

TABLE 14

Various Data

| | Infinity | | | Short-distance | | |
|---|---|---|---|---|---|---|
| | Wide-angle | Inter-mediate | Tele-photo | Wide-angle | Inter-medium | Tele-photo |
| FNO. | 4.6 | 5.3 | 5.9 | 4.6 | 5.3 | 5.6 |
| f | 68.47 | 135.00 | 291.36 | 64.15 | 110.32 | 155.16 |
| MP | 0.000 | 0.000 | 0.000 | −0.090 | −0.167 | −0.310 |
| W | 18.2 | 9.0 | 4.2 | 18.3 | 9.1 | 4.5 |
| Y | 21.64 | 21.64 | 21.64 | 21.64 | 21.64 | 21.64 |
| BF | 41.05 | 54.92 | 64.24 | 41.05 | 54.92 | 64.24 |
| L | 190.74 | 225.31 | 260.13 | 190.74 | 225.31 | 260.13 |
| D5 | 2.367 | 36.943 | 71.763 | 2.367 | 36.943 | 71.763 |
| D16 | 29.573 | 14.613 | 1.500 | 29.573 | 14.613 | 1.500 |
| D22 | 18.383 | 19.474 | 23.263 | 18.383 | 19.474 | 23.263 |

TABLE 14-continued

Various Data

| | Infinity | | | Short-distance | | |
|---|---|---|---|---|---|---|
| | Wide-angle | Inter-mediate | Tele-photo | Wide-angle | Inter-medium | Tele-photo |
| FNO. | 4.6 | 5.3 | 5.9 | 4.6 | 5.3 | 5.6 |
| D27 | 3.798 | 6.767 | 6.039 | 4.969 | 10.324 | 19.039 |
| D31 | 22.500 | 19.532 | 20.259 | 21.329 | 15.974 | 7.259 |
| D35 | 39.060 | 52.929 | 62.253 | 39.060 | 52.929 | 62.253 |

TABLE 15

Zoom-Lens Groups Data

| Group | Initial surface | Focal length |
|---|---|---|
| 1 | 1 | 160.85 |
| 2 | 6 | −30.64 |
| 3 | 18 | 53.42 |
| 4 | 23 | 50.65 |
| 5 | 28 | −45.05 |
| 6 | 32 | −870.95 |

TABLE 16

Principal-Point Location

| | Focal length | H1 | HH | H2 |
|---|---|---|---|---|
| 1st lens group | 160.850 | 0.539 | 5.190 | 9.521 |
| 2nd lens group | −30.636 | 11.308 | 6.919 | 6.580 |
| 3rd lens group | 53.421 | 1.555 | 4.415 | 6.929 |
| 4th lens group | 50.653 | 3.536 | 3.992 | 2.772 |
| 5th lens group | −45.046 | 5.149 | 1.182 | −1.421 |
| 6th lens group | −870.953 | −30.484 | 0.420 | 34.964 |
| 2nd sub-lens-A | −100.092 | 0.066 | 1.757 | 2.906 |
| 2nd sub-lens-B | −52.674 | 10.840 | 2.991 | 0.664 |

Fifth Numerical Example

FIGS. 40 to 46 and Tables 17 to 20 pertain to a zoom lens according to the fifth numerical example.

Figure 40:
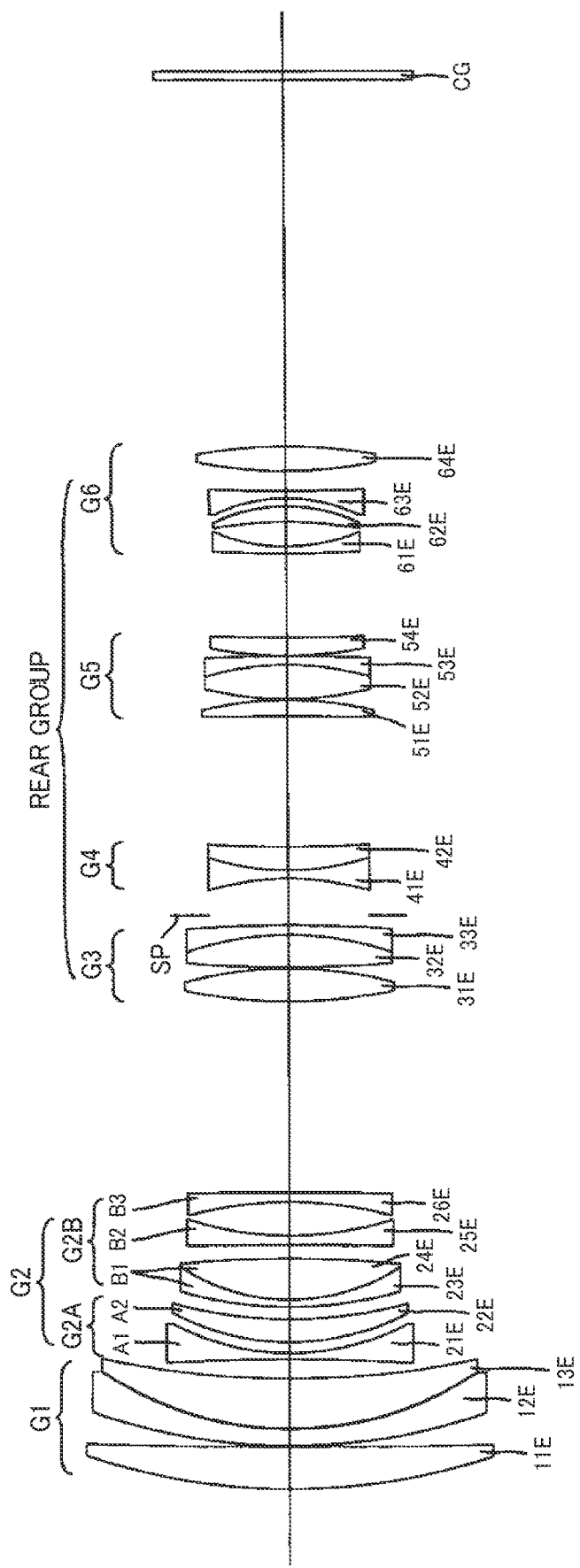
FIG. 40 is an illustration of a lens configuration of the zooming lens in FIG. 5 focused on infinity at a short focal length end.

FIG. 40 is an illustration of the configuration of the zoom lens focused on infinity at the short focal length end.

Figure 41:
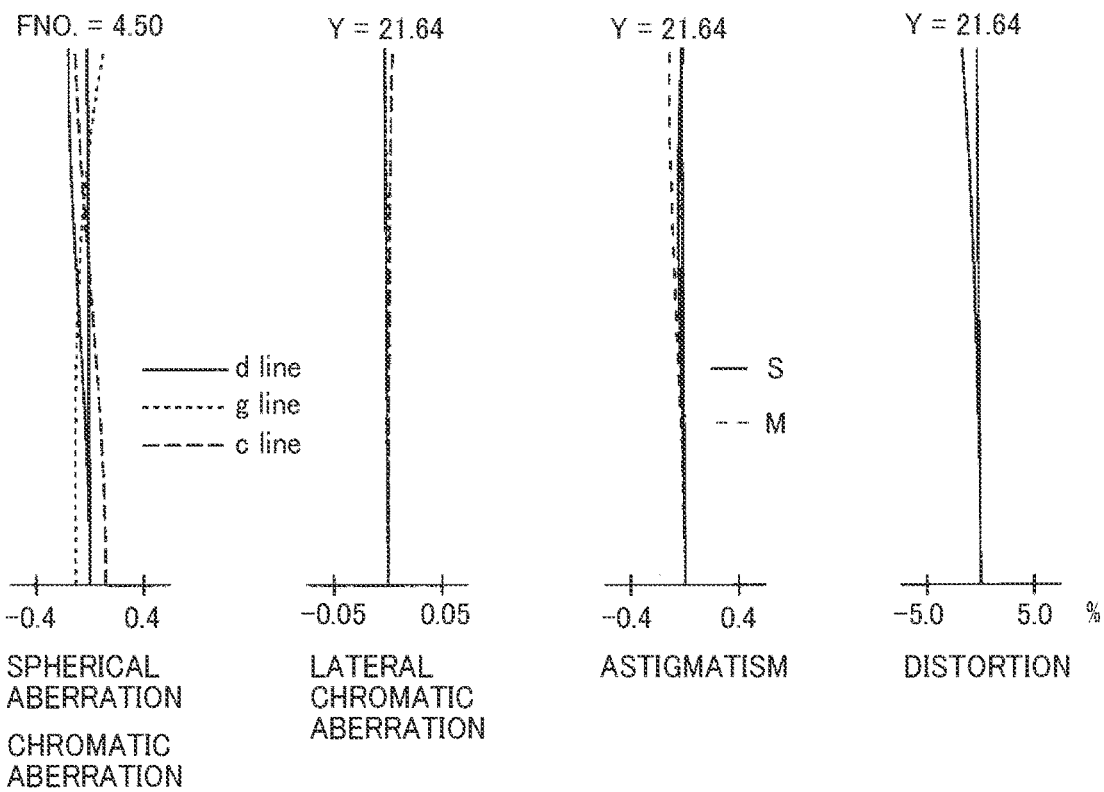
FIG. 41 is a collection of longitudinal aberration diagrams of the zoom lens in FIG. 5 focused on infinity at the short focal length end.
Figure 42:
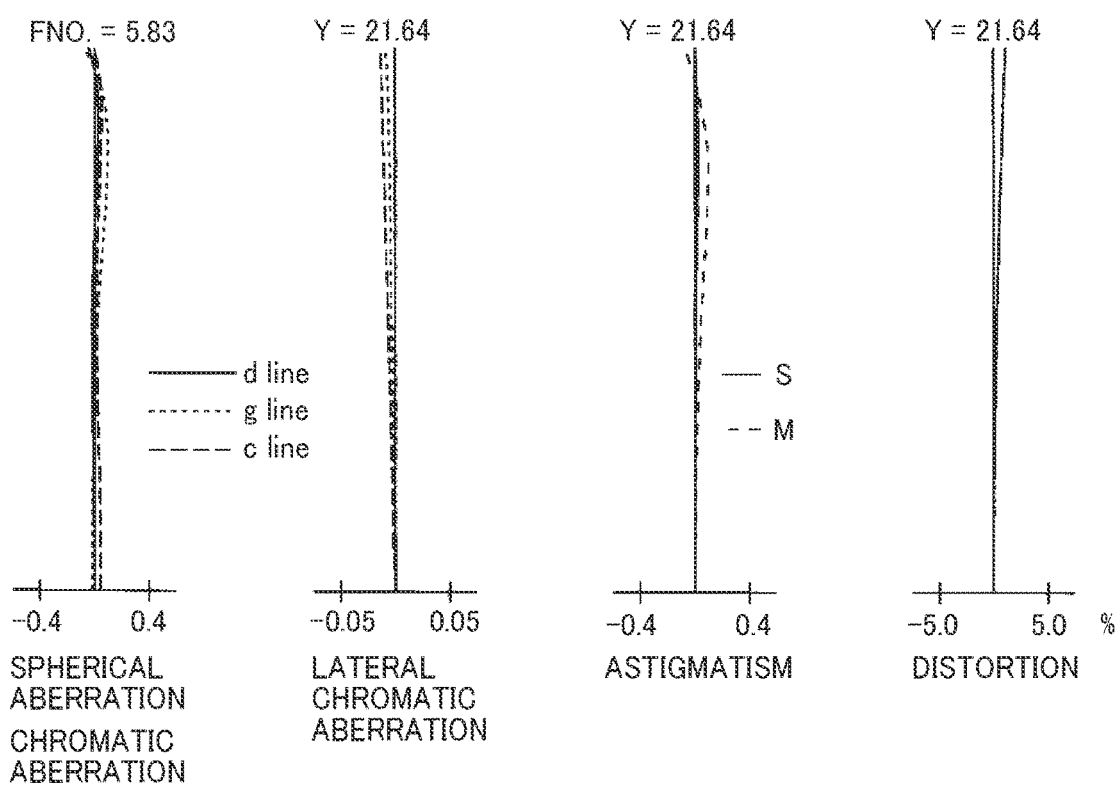
FIG. 42 is a collection of longitudinal aberration diagrams of the zoom lens in FIG. 5 focused on infinity at a long focal length end.

FIG. 41 is a collection of longitudinal aberration diagrams of the zoom lens focused on infinity at the short focal length end, and FIG. 42 is a collection of longitudinal aberration diagrams of the zoom lens focused on infinity at the long focal length end.

FIG. 43 is a collection of lateral aberration diagrams of the zoom lens focused on infinity at the short focal length end, and FIG. 44 is a collection of lateral aberration diagrams of the zoom lens focused on infinity at the long focal length end.

Figure 45:
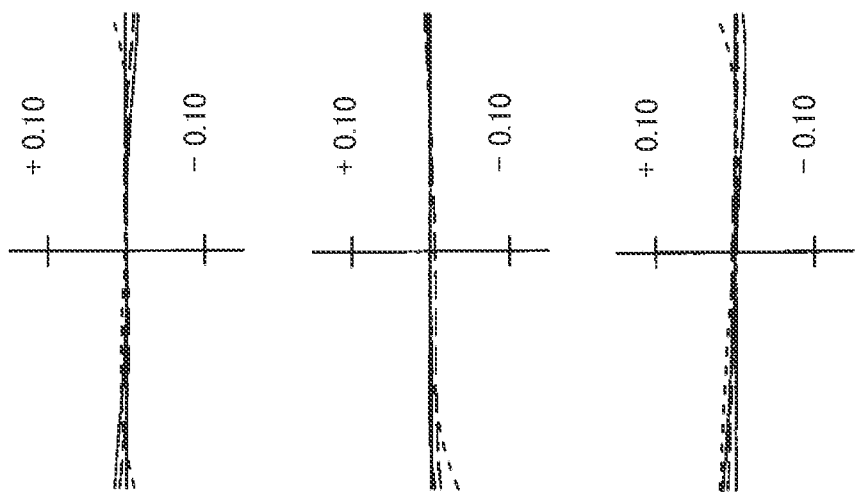
FIG. 45 is a collection of lateral aberration diagrams of the zoom lens in FIG. 5 focused on infinity at the short focal length end during the operation of vibration isolation.

FIG. 45 is a collection of lateral aberration diagrams of the zoom lens focused on infinity at the short focal length end (in FIG. 43) during the operation of vibration isolation.

Figure 46:
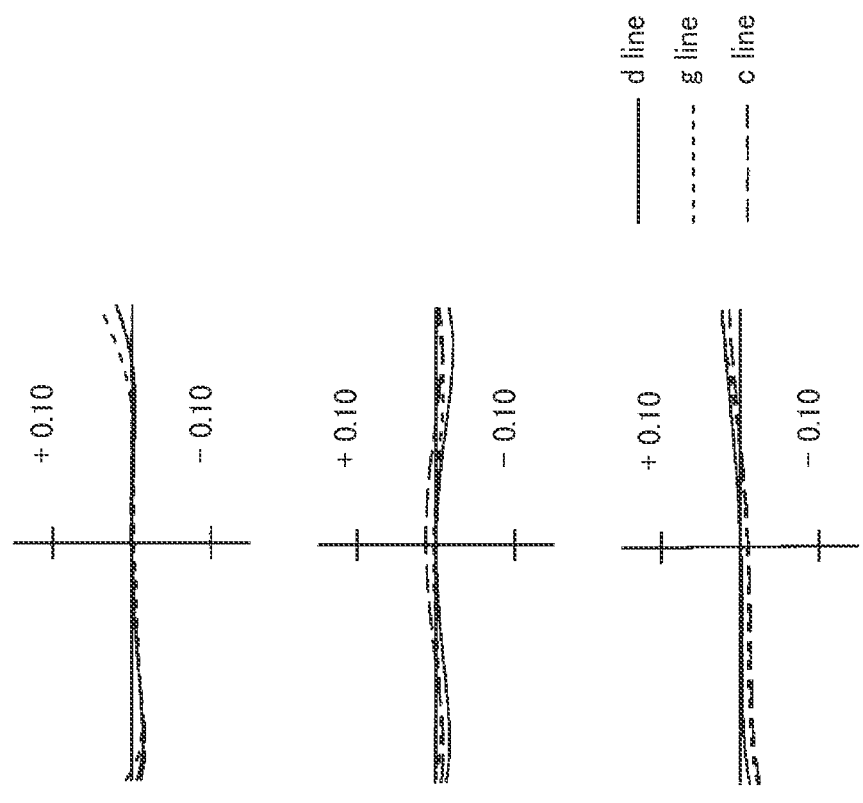
FIG. 46 is a collection of lateral aberration diagrams of the zoom lens in FIG. 5 focused on infinity at the long focal length end during the operation of vibration isolation.

FIG. 46 is a collection of lateral aberration diagrams of the zoom lens focused on infinity at the long focal length end (in FIG. 44) during the operation of vibration isolation.

Table 17 presents surface data, and Table 18 presents various types of data. In Table 18, MP denotes magnification power.

Table 19 presents data regarding the zoom-lens groups, and Table 20 presents data regarding principal-point locations.

The zoom lens according to the fifth numerical example consists of, sequentially from the object side toward the image side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The third lens group G3, the fourth lens group G4, the fifth lens group G5, and the sixth lens group G6 form a rear group.

Between the third lens group G3 and the fourth lens group G4, a stop SP for adjusting the intensity of light is disposed. The stop SP is movable independently of each lens group. A plane-parallel plate CG is provided between the sixth lens group G6 and the image plane.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side.

The second sub-lens group-B G2B includes a positive lens component B1, a negative lens component B2, and a negative lens component B3 arranged in that order from the object side toward the image side.

The first lens group G1 consists of a positive meniscus lens 11E with a convex surface facing the object, a negative meniscus lens 12E with a convex surface facing the object, and a positive meniscus lens 13E with a convex surface facing the object arranged in that order from the object side toward the image side.

The second lens group G2 has the configuration as described below. The negative lens component A1 is a negative biconcave lens 21E.

The positive lens component A2 is a positive meniscus lens 22E with a convex surface facing the object. The positive lens component B1 is a cemented lens formed of a negative meniscus lens 23E with a convex surface facing the object and a positive biconvex lens 24E.

The negative lens component B2 is a negative biconcave lens 25E. The negative lens component B3 is a negative meniscus lens 26E with a convex surface facing the image.

The third lens group G3 consists of a positive biconvex lens 31E, a positive biconvex lens 32E, and a negative meniscus lens 33E having a convex surface facing the image, which are arranged in that order from the object side. The positive biconvex lens 32E and the negative meniscus lens 33E are cemented to each other.

The fourth lens group G4 is a cemented lens formed of a negative biconcave lens 41E and a positive meniscus lens 42E with a convex surface facing the object.

The fifth lens group G5 consists of a positive meniscus lens 51E with a convex surface facing the image, a positive biconvex lens 52E, a negative meniscus lens 53E with a convex surface facing the image, and a positive meniscus lens 54E with a convex surface facing the object arranged in that order from the object side toward the image side. The positive biconvex lens 52E and the negative meniscus lens 53E are cemented to each other.

The sixth lens group G6 consists of, sequentially from the object side toward the image side, a negative meniscus lens 61E with a convex surface facing the object, a positive meniscus lens 62E with a convex surface facing the image, a negative biconcave lens 63E, and a positive biconvex lens 64E.

TABLE 17

Surface Data
Zoom ratio: 3.77

| Surface No. | R | D | N(d) | v(d) |
|---|---|---|---|---|
| 1 | 106.849 | 6.940 | 1.48749 | 70.2 |
| 2 | 1528.318 | 0.150 | | |
| 3 | 99.366 | 2.700 | 1.67300 | 38.3 |
| 4 | 55.827 | 0.110 | | |
| 5 | 56.015 | 8.230 | 1.43875 | 95.0 |
| 6 | 149.104 | D6 | | |
| 7 | −376.503 | 1.000 | 1.59522 | 67.7 |
| 8 | 41.156 | 1.800 | | |
| 9 | 41.474 | 3.800 | 1.80810 | 22.8 |
| 10 | 73.026 | 2.000 | | |
| 11 | 64.341 | 1.200 | 1.74950 | 35.3 |
| 12 | 32.882 | 6.700 | 1.59349 | 67.0 |
| 13 | −206.741 | 2.220 | | |
| 14 | −1120.071 | 1.550 | 1.53775 | 74.7 |
| 15 | 54.720 | 5.540 | | |
| 16 | −64.450 | 1.550 | 1.49700 | 81.6 |
| 17 | −850.523 | D17 | | |
| 18 | 86.255 | 5.440 | 1.43875 | 95.0 |
| 19 | −65.826 | 0.180 | | |
| 20 | 205.209 | 5.370 | 1.72825 | 28.5 |
| 21 | −52.143 | 1.600 | 2.00069 | 25.5 |
| 22 | −235.987 | D22 | | |
| 23(Stop) | INFINITY | D23 | | |
| 24 | −46.740 | 1.400 | 1.59270 | 35.3 |
| 25 | 42.457 | 3.870 | 1.80518 | 25.4 |
| 26 | 208.383 | D26 | | |
| 27 | −2257.297 | 2.720 | 1.83400 | 37.2 |
| 28 | −59.947 | 0.160 | | |
| 29 | 58.598 | 5.640 | 1.49700 | 81.6 |
| 30 | −48.611 | 1.400 | 1.84666 | 23.8 |
| 31 | −364.741 | 0.150 | | |
| 32 | 70.167 | 2.930 | 1.77250 | 49.6 |
| 33 | 315.507 | D33 | | |
| 34 | 221.215 | 1.200 | 1.95375 | 32.3 |
| 35 | 31.294 | 4.080 | | |
| 36 | −68.833 | 2.530 | 1.80518 | 25.4 |
| 37 | −28.560 | 1.330 | | |
| 38 | −27.726 | 1.200 | 1.83481 | 42.7 |
| 39 | 289.579 | 3.300 | | |
| 40 | 73.351 | 4.110 | 1.69895 | 30.1 |
| 41 | −83.066 | D41 | | |
| 42 | INFINITY | 1.500 | 1.51633 | 64.1 |
| 43 | INFINITY | — | | |

TABLE 18

Various Data

| | Infinity | | | Short-distance | | |
|---|---|---|---|---|---|---|
| FNO. | Wide-angle 4.5 | Inter-mediate 5.1 | Telephoto 5.8 | Wide-angle 4.6 | Inter-medium 4.7 | Telephoto 4.9 |
| f | 103.00 | 200.00 | 388.00 | 87.49 | 136.91 | 173.50 |
| MP | 0.000 | 0.000 | 0.000 | −0.130 | −0.209 | −0.315 |
| W | 12.0 | 6.1 | 3.2 | 12.7 | 7.0 | 4.0 |
| Y | 21.64 | 21.64 | 21.64 | 21.64 | 21.64 | 21.64 |
| BF | 62.63 | 66.66 | 75.26 | 60.22 | 59.33 | 54.54 |
| L | 234.60 | 294.85 | 322.81 | 234.60 | 294.85 | 322.81 |
| D6 | 3.188 | 63.440 | 91.400 | 3.188 | 63.440 | 91.400 |
| D17 | 31.431 | 19.872 | 1.400 | 31.431 | 19.872 | 1.400 |
| D22 | 1.610 | 7.900 | 26.146 | 1.610 | 7.900 | 26.146 |
| D23 | 6.101 | 18.116 | 28.661 | 1.271 | 10.781 | 18.302 |
| D26 | 21.565 | 14.818 | 4.500 | 26.395 | 22.154 | 14.859 |
| D33 | 13.974 | 9.941 | 1.350 | 16.389 | 17.276 | 22.067 |
| D41 | 60.642 | 64.676 | 73.266 | 58.227 | 57.340 | 52.549 |

TABLE 19

Zoom-Lens Groups Data

| Group | Initial surface | Focal length |
|---|---|---|
| 1 | 1 | 243.45 |
| 2 | 7 | −65.28 |
| 3 | 18 | 70.70 |
| 4 | 24 | −86.28 |
| 5 | 27 | 39.44 |
| 6 | 34 | −49.56 |

TABLE 20

Principal-Point Location

| | Focal length | H1 | HH | H2 |
|---|---|---|---|---|
| 1st lens group | 243.445 | −7.489 | 6.532 | 19.088 |
| 2nd lens group | −65.277 | 14.796 | 7.085 | 5.479 |
| 3rd lens group | 70.697 | 2.530 | 4.658 | 5.402 |
| 4th lens group | −86.278 | 0.625 | 2.274 | 2.371 |
| 5th lens group | 39.437 | 2.360 | 4.950 | 5.690 |
| 6th lens group | −49.564 | −4.457 | 1.395 | 20.812 |
| 2nd sub-lens-A | −137.093 | 1.489 | 2.168 | 2.943 |
| 2nd sub-lens-B | −152.954 | 26.239 | 1.890 | −9.369 |

Sixth Numerical Example

FIGS. 47 to 53 and Tables 21 to 24 pertain to a zoom lens according to the sixth numerical example.

Figure 47:
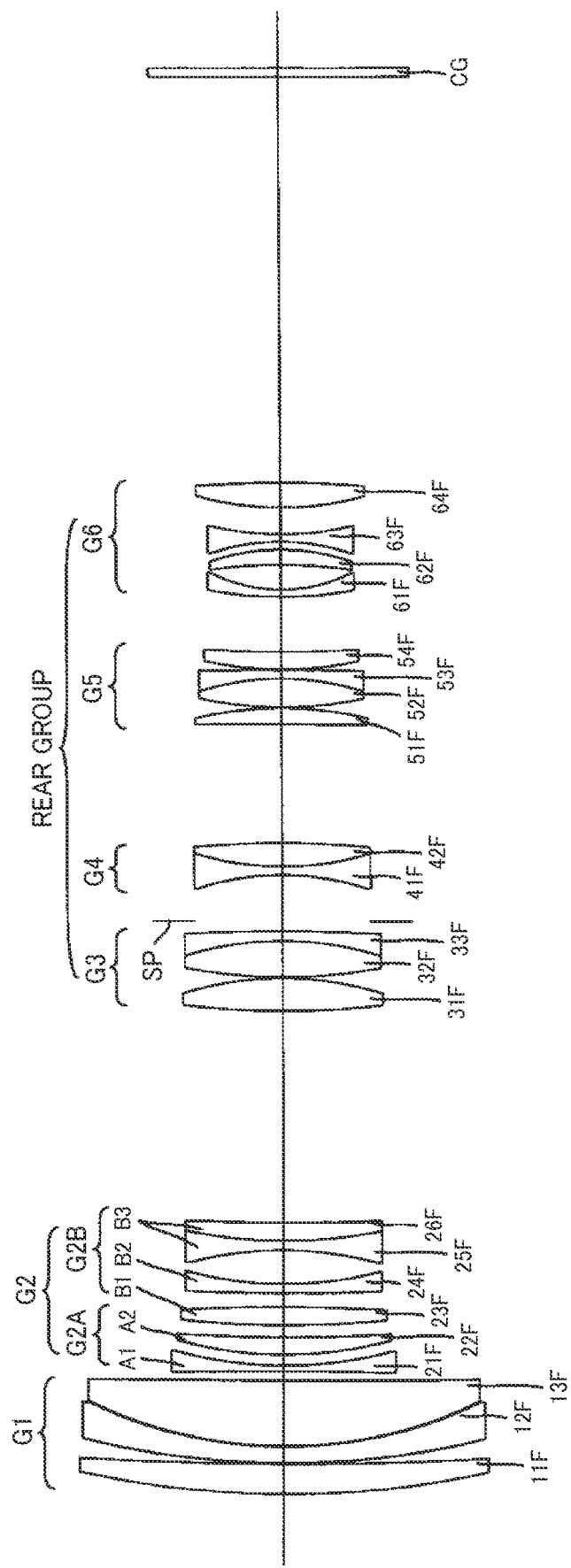
FIG. 47 is an illustration of a lens configuration of the zooming lens in FIG. 6 focused on infinity at a short focal length end.

FIG. 47 is an illustration of the configuration of the zoom lens focused on infinity at the short focal length end.

Figure 48:
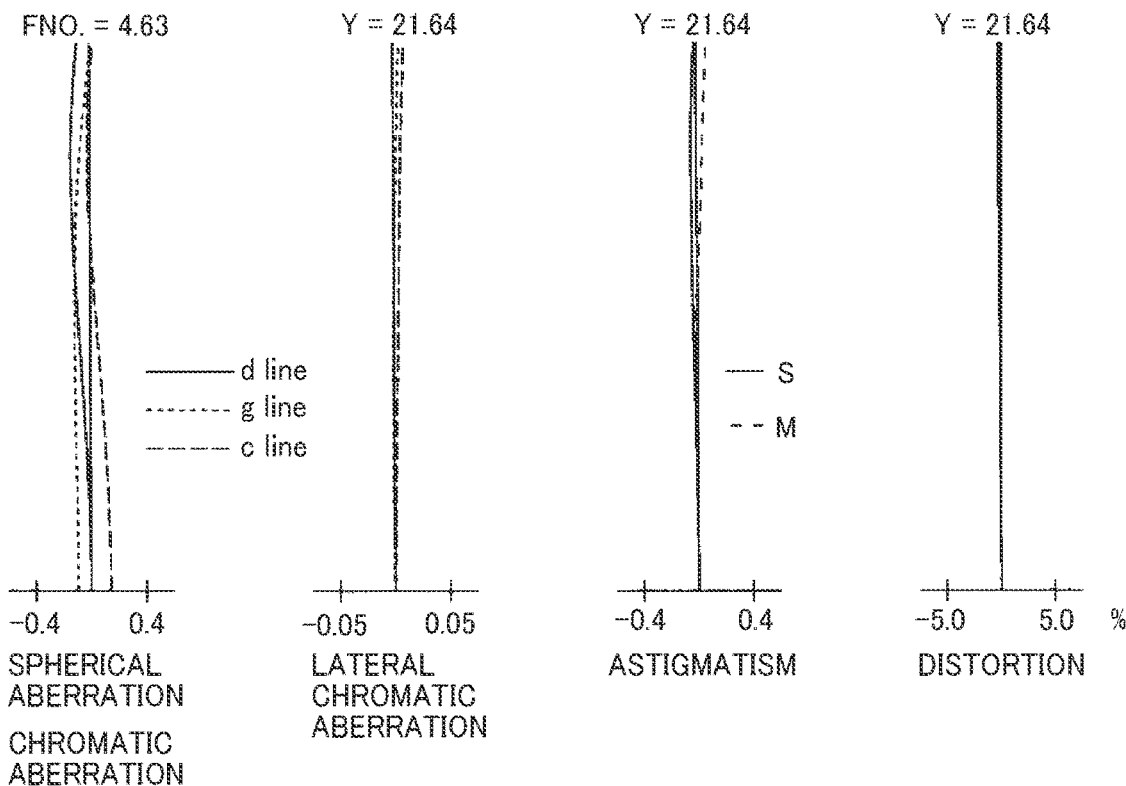
FIG. 48 is a collection of longitudinal aberration diagrams of the zoom lens in FIG. 6 focused on infinity at the short focal length end.
Figure 49:
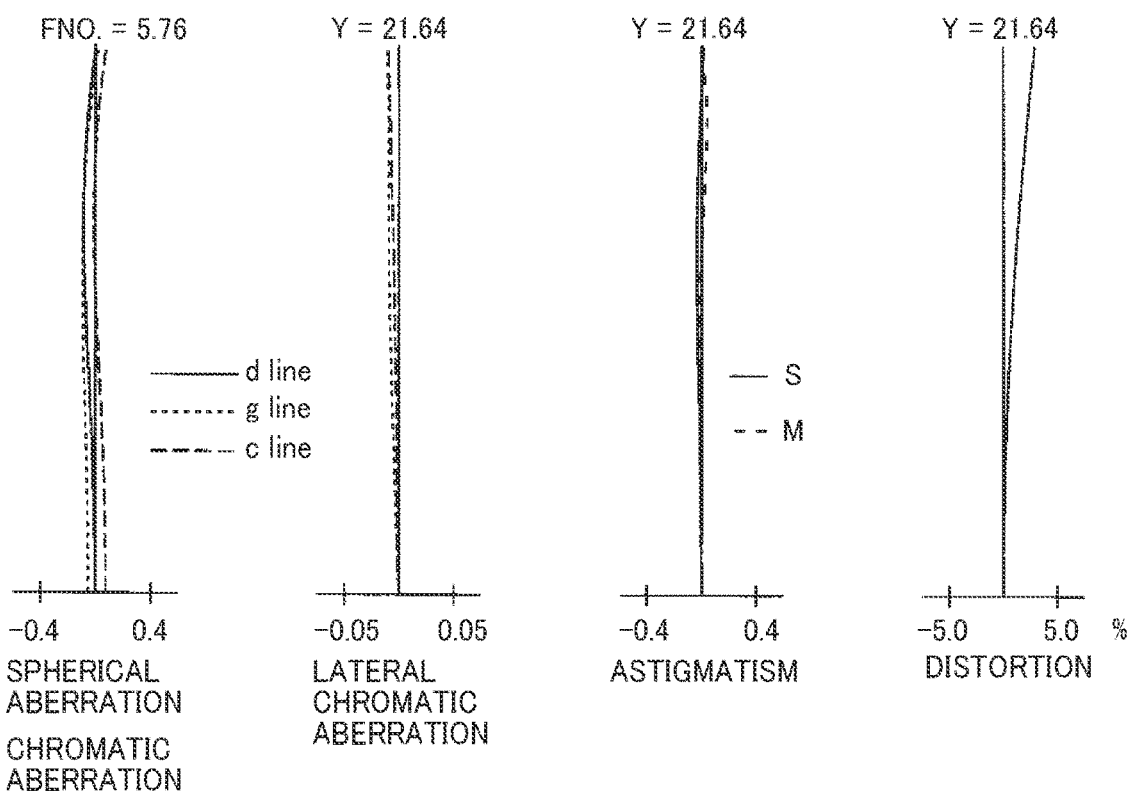
FIG. 49 is a collection of longitudinal aberration diagrams of the zoom lens in FIG. 6 focused on infinity at a long focal length end.

FIG. 48 is a collection of longitudinal aberration diagrams of the zoom lens focused on infinity at the short focal length end, and FIG. 49 is a collection of longitudinal aberration diagrams of the zoom lens focused on infinity at the long focal length end.

Figure 51:
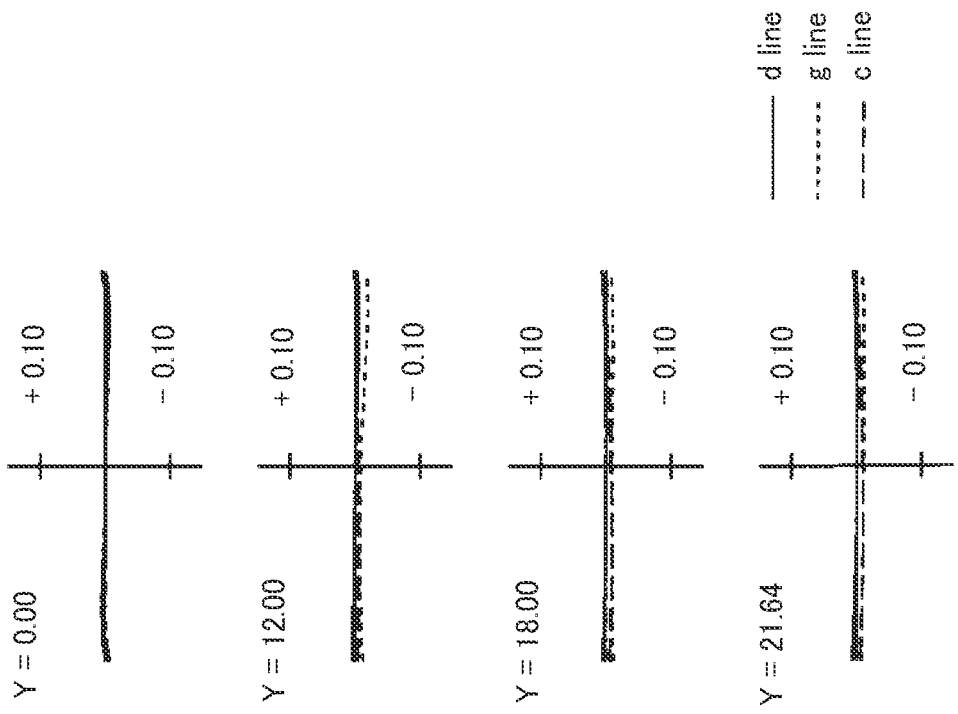
FIG. 51 is a collection of lateral aberration diagrams of the zoom lens in FIG. 6 focused on infinity at the long focal length end.
Figure 50:
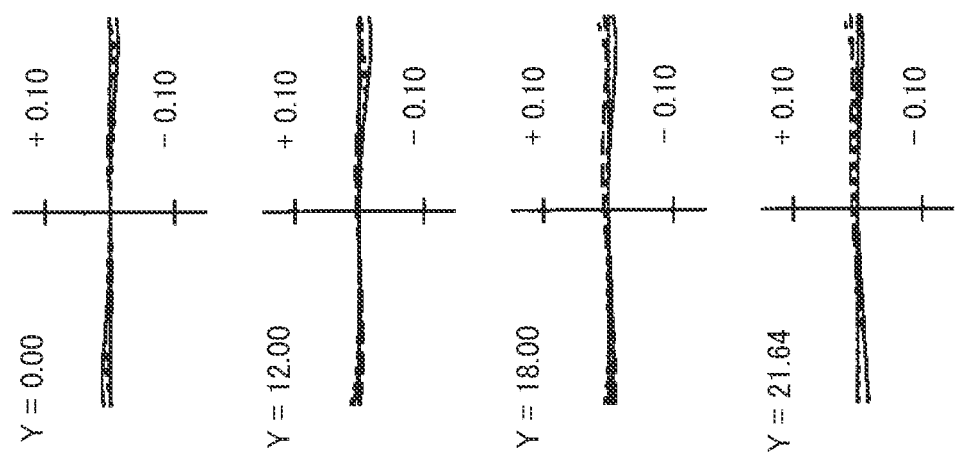
FIG. 50 is a collection of lateral aberration diagrams of the zoom lens in FIG. 6 focused on infinity at the short focal length end.

FIG. 50 is a collection of lateral aberration diagrams of the zoom lens focused on infinity at the short focal length end, and FIG. 51 is a collection of lateral aberration diagrams of the zoom lens focused on infinity at the long focal length end.

Figure 52:
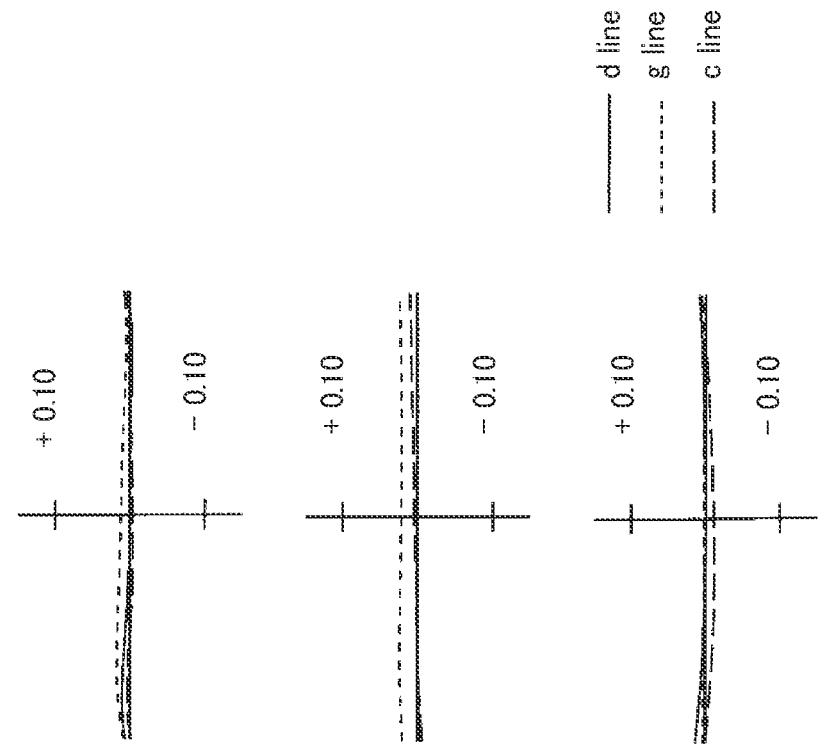
FIG. 52 is a collection of lateral aberration diagrams of the zoom lens in FIG. 6 focused on infinity at the short focal length end during the operation of vibration isolation.
Figure 53:
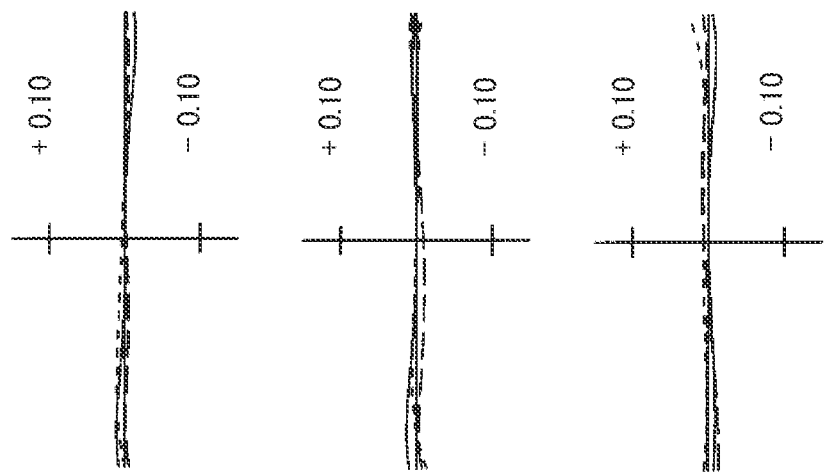
FIG. 53 is a collection of lateral aberration diagrams of the zoom lens in FIG. 6 focused on infinity at the long focal length end during the operation of vibration isolation.

FIG. 52 is a collection of lateral aberration diagrams of the zoom lens focused on infinity at the short focal length end (in FIG. 50) during the operation of vibration isolation. FIG. 53 is a collection of lateral aberration diagrams of the zoom lens focused on infinity at the long focal length end (in FIG. 51) during the operation of vibration isolation.

Table 21 presents surface data, and Table 22 presents various types of data. In Table 22, MP denotes magnification power.

Table 23 presents data regarding the zoom-lens groups, and Table 24 presents data regarding principal-point locations.

The zoom lens according to the sixth numerical example consists of, sequentially from the object side toward the image side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The third lens group G3, the fourth lens group G4, the fifth lens group G5, and the sixth lens group G6 form a rear group.

Between the third lens group G3 and the fourth lens group G4, a stop SP for adjusting the intensity of light is disposed. The stop SP is movable independently of each lens group. A plane-parallel plate CG is provided between the sixth lens group G6 and the image plane.

The second lens group G2 consists of a negative second sub-lens group-A G2A and a negative second sub-lens group-B G2B arranged in that order from the object side toward the image side.

The second sub-lens group-A G2A consists of a negative lens component A1 and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens group G1 consists of a positive meniscus lens 11F with a convex surface facing the object, a negative meniscus lens 12F with a convex surface facing the object, and a positive meniscus lens 13F with a convex surface facing the object arranged in that order from the object side toward the image side.

The second lens group G2 has the configuration as described below. The negative lens component A1 is a negative biconcave lens 21F.

The positive lens component A2 is a positive meniscus lens 22F with a convex surface facing the object.

The positive lens component B1 is a positive biconvex lens 23F.

The negative lens component B2 is a negative meniscus lens 24F with a convex surface facing the object.

The negative lens component B3 is a cemented lens formed of a negative biconcave lens 25F and a positive meniscus lens 26F with a convex surface facing the object.

The third lens group G3 consists of a positive biconvex lens 31F, a positive biconvex lens 32F, and a negative meniscus lens 33F having a convex surface facing the image, which are arranged in that order from the object side. The positive biconvex lens 32F and the negative meniscus lens 33F are cemented to each other.

The fourth lens group G4 is a cemented lens formed of a negative biconcave lens 41F and a positive biconvex lens 42F.

The fifth lens group G5 consists of a positive meniscus lens 51F with a convex surface facing the image, a positive biconvex lens 52F, a negative meniscus lens 53F with a convex surface facing the image, and a positive meniscus lens 54F with a convex surface facing the object arranged in that order from the object side toward the image side.

The positive biconvex lens 52F and the negative meniscus lens 53F are cemented to each other.

The sixth lens group G6 consists of, sequentially from the object side toward the image side, a negative meniscus lens 61F with a convex surface facing the object, a positive meniscus lens 62F with a convex surface facing the image, a negative biconcave lens 63F, and a positive biconvex lens 64F.

TABLE 21

Surface Data
Zoom ratio: 3.78

| Surface No. | R | D | N(d) | v(d) |
|---|---|---|---|---|
| 1 | 159.104 | 5.000 | 1.62299 | 58.2 |
| 2 | 621.728 | 0.150 | | |

TABLE 21-continued

Surface Data
Zoom ratio: 3.78

| Surface No. | R | D | N(d) | v(d) |
|---|---|---|---|---|
| 3 | 139.567 | 2.700 | 1.65412 | 39.7 |
| 4 | 74.943 | 0.110 | | |
| 5 | 74.411 | 10.780 | 1.43875 | 95.0 |
| 6 | 4055.450 | D6 | | |
| 7 | −1043.500 | 1.000 | 1.72916 | 54.1 |
| 8 | 69.066 | 1.800 | | |
| 9 | 68.043 | 2.800 | 1.56873 | 63.1 |
| 10 | 269.674 | 2.000 | | |
| 11 | 163.927 | 3.000 | 1.74950 | 35.3 |
| 12 | −278.677 | 2.220 | | |
| 13 | 374.110 | 1.550 | 1.77250 | 49.6 |
| 14 | 62.928 | 5.400 | | |
| 15 | −60.060 | 1.550 | 1.61800 | 63.4 |
| 16 | 79.762 | 3.000 | 1.85478 | 24.8 |
| 17 | 440.496 | D17 | | |
| 18 | 137.356 | 5.440 | 1.43387 | 95.2 |
| 19 | −54.236 | 0.180 | | |
| 20 | 86.333 | 5.970 | 1.51742 | 52.4 |
| 21 | −53.578 | 1.600 | 1.90366 | 31.3 |
| 22 | −310.697 | D22 | | |
| 23(Stop) | INFINITY | D23 | | |
| 24 | −44.849 | 1.400 | 1.59270 | 35.3 |
| 25 | 49.039 | 3.870 | 1.78472 | 25.7 |
| 26 | −156.373 | D26 | | |
| 27 | −3454.538 | 2.720 | 1.76200 | 40.1 |
| 28 | −60.107 | 0.160 | | |
| 29 | 62.624 | 4.740 | 1.48749 | 70.2 |
| 30 | −44.665 | 1.400 | 1.84666 | 23.8 |
| 31 | −907.368 | 0.150 | | |
| 32 | 57.486 | 2.930 | 1.72916 | 54.7 |
| 33 | 249.753 | D33 | | |
| 34 | 65.638 | 1.200 | 1.88300 | 40.8 |
| 35 | 25.330 | 4.080 | | |
| 36 | −88.678 | 2.530 | 1.80518 | 25.4 |
| 37 | −35.576 | 1.330 | | |
| 38 | −35.215 | 1.200 | 1.72916 | 54.7 |
| 39 | 50.093 | 4.300 | | |
| 40 | 50.364 | 4.110 | 1.65412 | 39.7 |
| 41 | −180.902 | D41 | | |
| 42 | INFINITY | 1.500 | 1.51633 | 64.1 |
| 43 | INFINITY | — | | |

TABLE 22

Various Data

| | Infinity | | | Short-distance | | |
|---|---|---|---|---|---|---|
| | Wide-angle | Inter-mediate | Telephoto | Wide-angle | Inter-medium | Telephoto |
| FNO. | 4.6 | 5.1 | 5.8 | 4.7 | 4.8 | 5.1 |
| f | 102.81 | 200.40 | 388.73 | 90.17 | 140.65 | 175.49 |
| MP | 0.000 | 0.000 | 0.000 | −0.137 | −0.225 | −0.329 |
| W | 11.9 | 6.0 | 3.1 | 12.0 | 6.3 | 3.7 |
| Y | 21.64 | 21.64 | 21.64 | 21.64 | 21.64 | 21.64 |
| BF | 69.06 | 71.57 | 76.76 | 67.09 | 65.59 | 60.13 |
| L | 235.43 | 295.97 | 325.31 | 235.43 | 295.97 | 325.31 |
| D6 | 1.500 | 62.048 | 91.383 | 1.500 | 62.048 | 91.383 |
| D17 | 34.707 | 21.732 | 1.400 | 34.707 | 21.732 | 1.400 |
| D22 | 1.610 | 3.147 | 15.000 | 1.610 | 3.147 | 15.000 |
| D23 | 7.600 | 24.525 | 42.546 | 3.659 | 18.544 | 34.233 |
| D26 | 19.530 | 14.043 | 4.500 | 23.471 | 20.024 | 12.813 |
| D33 | 9.051 | 6.543 | 1.350 | 11.022 | 12.524 | 17.976 |
| D41 | 67.068 | 69.577 | 74.771 | 65.098 | 63.596 | 58.145 |

TABLE 23

Zoom-Lens Groups Data

| Group | Initial surface | Focal length |
|---|---|---|
| 1 | 1 | 213.16 |
| 2 | 7 | −56.31 |
| 3 | 18 | 76.96 |
| 4 | 24 | −245.28 |
| 5 | 27 | 44.02 |
| 6 | 34 | −43.43 |

TABLE 24

Principal-Point Location

| | Focal length | H1 | HH | H2 |
|---|---|---|---|---|
| 1st lens group | 213.161 | −0.499 | 6.313 | 12.926 |
| 2nd lens group | −56.312 | 11.900 | 6.158 | 6.262 |
| 3rd lens group | 76.961 | 1.810 | 4.497 | 6.884 |
| 4th lens group | −245.275 | −4.586 | 2.085 | 7.771 |
| 5th lens group | 44.023 | 2.225 | 4.564 | 5.311 |
| 6th lens group | −43.431 | −1.418 | 2.178 | 17.990 |
| 2nd sub-lens-A | −204.409 | −1.045 | 1.424 | 5.222 |
| 2nd sub-lens-B | −85.168 | 12.358 | 3.494 | 0.868 |

Seventh Numerical Example

FIGS. 54 to 60 and Tables 25 to 29 pertain to a zoom lens according to the seventh numerical example.

Figure 54:
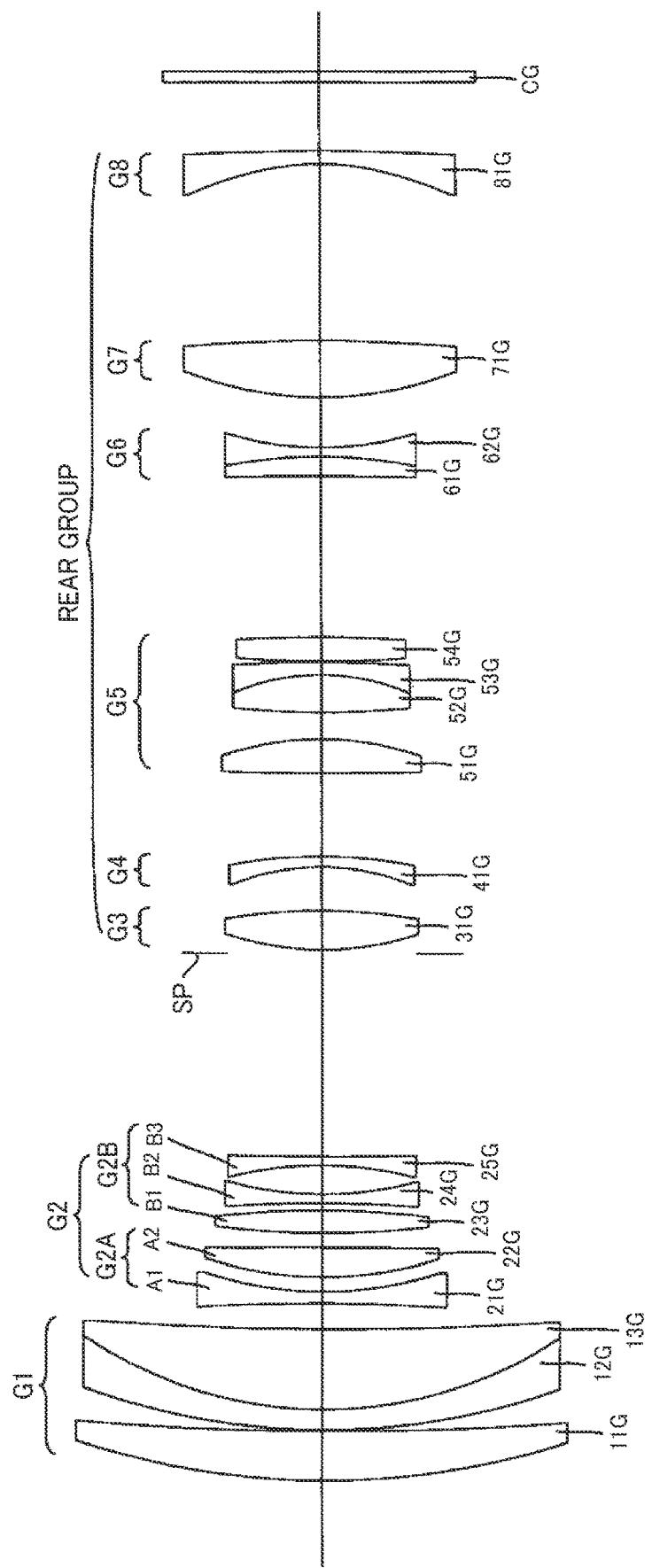
FIG. 54 is an illustration of a lens configuration of the zooming lens in FIG. 7 focused on infinity at a short focal length end.

FIG. 54 is an illustration of the configuration of the zoom lens focused on infinity at the short focal length end.

Figure 55:
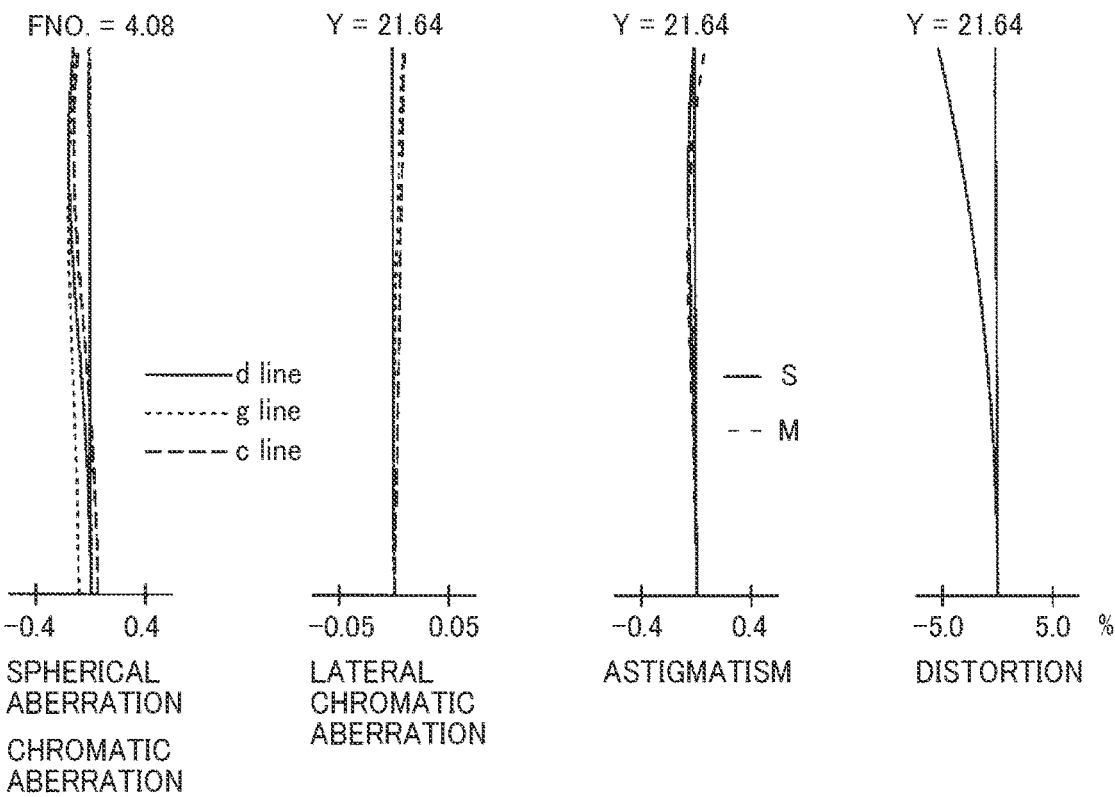
FIG. 55 is a collection of longitudinal aberration diagrams of the zoom lens in FIG. 7 focused on infinity at the short focal length end.
Figure 56:
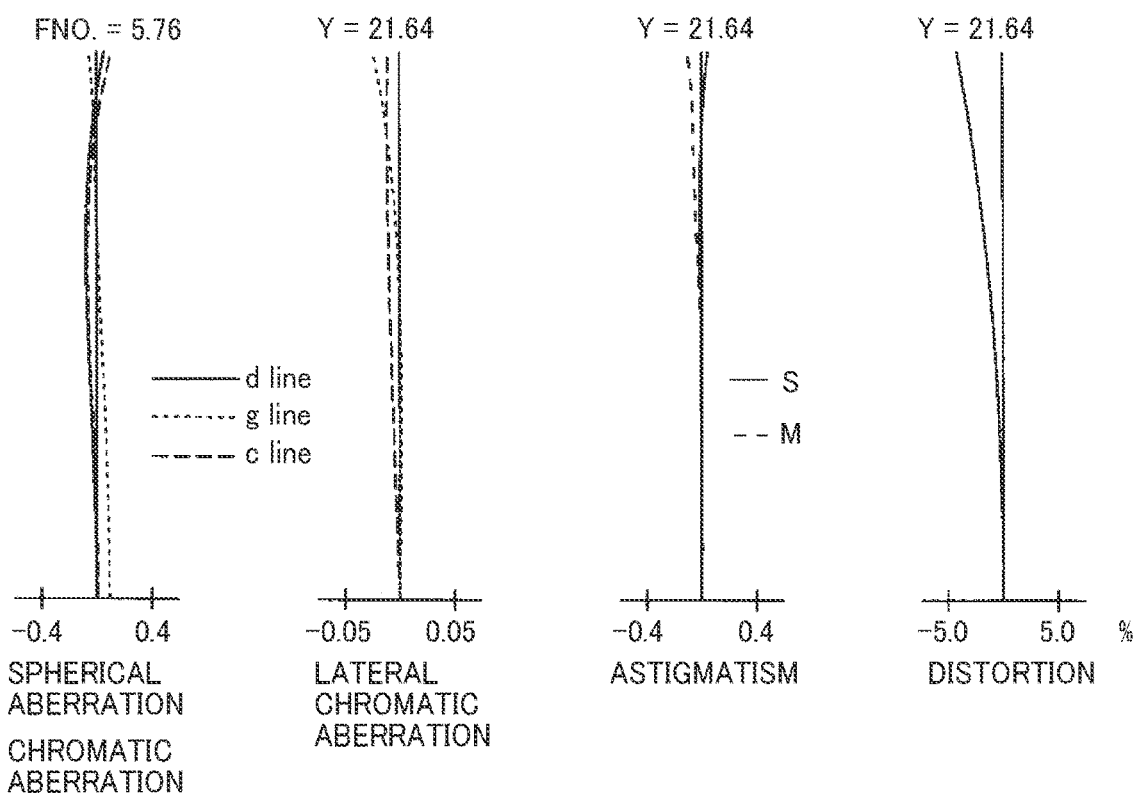
FIG. 56 is a collection of longitudinal aberration diagrams of the zoom lens in FIG. 7 focused on infinity at a long focal length end.

FIG. 55 is a collection of longitudinal aberration diagrams of the zoom lens focused on infinity at the short focal length end, and FIG. 56 is a collection of longitudinal aberration diagrams of the zoom lens focused on infinity at the long focal length end.

Figure 58:
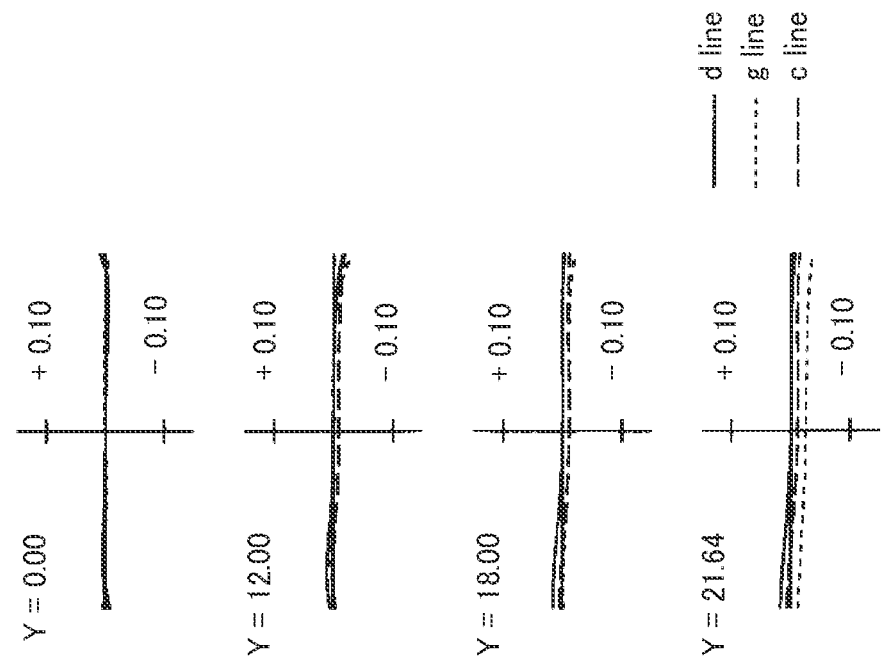
FIG. 58 is a collection of lateral aberration diagrams of the zoom lens in FIG. 7 focused on infinity at the long focal length end.
Figure 57:
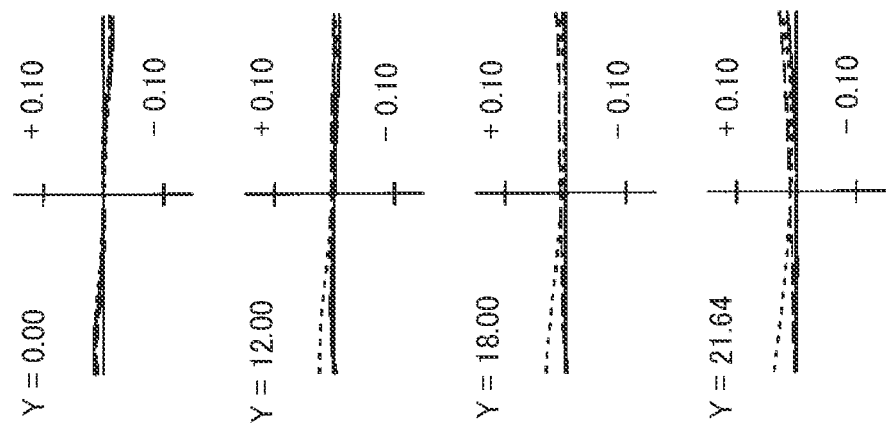
FIG. 57 is a collection of lateral aberration diagrams of the zoom lens in FIG. 7 focused on infinity at the short focal length end.

FIG. 57 is a collection of lateral aberration diagrams of the zoom lens focused on infinity at the short focal length end, and FIG. 58 is a collection of lateral aberration diagrams of the zoom lens focused on infinity at the long focal length end.

FIG. 59 is a collection of lateral aberration diagrams of the zoom lens focused on infinity at the short focal length end (in FIG. 57) during the operation of vibration isolation.

FIG. 60 is a collection of lateral aberration diagrams of the zoom lens focused on infinity at the long focal length end (in FIG. 58) during the operation of vibration isolation.

Table 25 presents surface data, and Table 26 presents various types of data. In Table 26, MP denotes magnification power.

Table 27 presents data regarding the zoom-lens groups, Table 28 presents data regarding principal-point locations, and Table 29 presents data regarding aspherical surface.

The zoom lens according to the seventh numerical example consists of, sequentially from the object side toward the image side, a first lens group G1 having positive refractive power, a second lens group G2 having negative refractive power, a third lens group G3 having positive refractive power, a fourth lens group G4 having negative refractive power, a fifth lens group G5 having positive refractive power, a sixth lens group G6 having negative refractive power, a seventh lens group G7 having positive refractive power, and an eighth lens group G8 having negative refractive power.

The third lens group G3, the fourth lens group G4, the fifth lens group G5, the sixth lens group G6, the seventh lens group G7, and the eighth lens group G8 constitute a rear lens group.

Between the second lens group G2 and the third lens group G3 (immediately in front of the third lens group G3), a stop SP for adjusting the intensity of light is disposed. The stop SP is movable together with the third lens group G3.

A plane-parallel plate CG is provided between the eighth lens group G8 and the image plane.

The second lens group G2 consists of a negative second sub-lens group-A G2A and a negative second sub-lens group-B G2B arranged in that order from the object side toward the image side. The second sub-lens group-A G2A consists of a negative lens component A1 and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens group G1 consists of a positive meniscus lens 11G with a convex surface facing the object, a negative meniscus lens 12G with a convex surface facing the object, and a positive meniscus lens 13G with a convex surface facing the object arranged in that order from the object side toward the image side. The negative meniscus lens 12G and the positive meniscus lens 13G are cemented to each other.

The second lens group G2 has the configuration as described below. The negative lens component A1 is a negative biconcave lens 21G.

The positive lens component A2 is a positive biconvex lens 22G.

The positive lens component B1 is a positive biconvex lens 23G.

The negative lens component B2 is a negative biconcave lens 24G. The negative lens component B3 is a negative biconcave lens 25G.

The third lens group G3 is a positive biconvex lens 31G.

The fourth lens group G4 is a negative meniscus lens 41G with a convex surface facing the image.

The fifth lens group G5 consists of a positive biconvex lens 51G, a positive biconvex lens 52G, a negative meniscus lens 53G with a convex surface facing the image, and a positive biconvex lens 54G, which are arranged in that order from the object side toward the image side. The positive biconvex lens 52G and the negative meniscus lens 53G are cemented to each other.

The sixth lens group G6 is a cemented lens formed of a positive meniscus lens 61G with a convex surface facing the image and a negative biconcave lens 62G.

The seventh lens group G7 is a positive biconvex lens 71G.

The eighth lens group G8 is a negative meniscus lens 81G with a convex surface facing the image.

The negative meniscus lens 81G has an aspherical surface facing the object.

TABLE 25

Surface Data
Zoom ratio: 5.38

| Surface No. | R | D | N(d) | ν(d) |
|---|---|---|---|---|
| 1 | 109.860 | 6.690 | 1.59349 | 67.0 |
| 2 | 433.259 | 0.200 | | |
| 3 | 96.332 | 2.800 | 1.72047 | 34.7 |
| 4 | 58.807 | 10.970 | 1.43875 | 95.0 |
| 5 | 480.880 | D5 | | |
| 6 | −273.283 | 1.600 | 1.95375 | 32.3 |
| 7 | 51.332 | 2.000 | | |

TABLE 25-continued

Surface Data
Zoom ratio: 5.38

| Surface No. | R | D | N(d) | ν(d) |
|---|---|---|---|---|
| 8 | 52.954 | 4.000 | 1.84666 | 23.8 |
| 9 | −1114.717 | 2.000 | | |
| 10 | 124.218 | 3.100 | 1.85025 | 30.0 |
| 11 | −119.660 | 1.000 | | |
| 12 | −178.939 | 1.200 | 1.69680 | 55.5 |
| 13 | 48.608 | 4.000 | | |
| 14 | −49.722 | 1.200 | 1.59410 | 60.5 |
| 15 | 635.015 | D15 | | |
| 16(Stop) | INFINITY | 0.500 | | |
| 17 | 41.342 | 5.360 | 1.43875 | 95.0 |
| 18 | −81.112 | D18 | | |
| 19 | −32.466 | 1.500 | 1.95375 | 32.3 |
| 20 | −65.786 | D20 | | |
| 21 | 505.437 | 4.600 | 1.79360 | 37.1 |
| 22 | −41.831 | 3.690 | | |
| 23 | 124.055 | 5.130 | 1.49700 | 81.6 |
| 24 | −30.809 | 1.700 | 2.00100 | 29.1 |
| 25 | −198.556 | 0.150 | | |
| 26 | 142.839 | 3.310 | 1.80610 | 33.3 |
| 27 | −192.589 | D27 | | |
| 28 | −551.352 | 2.710 | 1.74000 | 28.3 |
| 29 | −66.169 | 1.200 | 1.76385 | 48.5 |
| 30 | 43.279 | D30 | | |
| 31 | 51.069 | 7.800 | 1.57501 | 41.5 |
| 32 | −213.449 | D32 | | |
| 33* | −35.000 | 1.800 | 1.49710 | 81.6 |
| 34 | −328.747 | D34 | | |
| 35 | INFINITY | 1.500 | 1.51633 | 64.1 |
| 36 | INFINITY | — | | |

The mark "*" refers to a rotationally symmetric aspherical surface.

TABLE 26

Various Data

| | Infinity | | | Short-distance | | |
|---|---|---|---|---|---|---|
| | Wide-angle | Inter-mediate | Telephoto | Wide-angle | Inter-medium | Telephoto |
| FNO. | 4.1 | 5.1 | 5.8 | 4.0 | 5.4 | 6.2 |
| f | 72.11 | 200.00 | 388.00 | 63.41 | 121.74 | 145.99 |
| MP | 0.000 | 0.000 | 0.000 | −0.091 | −0.223 | −0.359 |
| W | 17.6 | 6.4 | 3.3 | 17.9 | 6.5 | 3.5 |
| Y | 21.64 | 21.64 | 21.64 | 21.64 | 21.64 | 21.64 |
| BF | 11.51 | 26.77 | 39.59 | 11.51 | 26.77 | 39.59 |
| L | 193.80 | 243.86 | 271.86 | 193.80 | 243.86 | 271.86 |
| D5 | 3.500 | 53.556 | 81.564 | 3.500 | 53.556 | 81.564 |
| D15 | 27.755 | 9.593 | 1.610 | 27.755 | 9.593 | 1.610 |
| D18 | 6.020 | 11.422 | 16.631 | 4.370 | 6.453 | 5.918 |
| D20 | 11.460 | 6.058 | 0.849 | 13.110 | 11.027 | 11.562 |
| D27 | 22.170 | 18.347 | 3.270 | 25.239 | 31.269 | 35.196 |
| D30 | 6.930 | 20.915 | 42.178 | 3.861 | 7.994 | 10.252 |
| D32 | 24.248 | 16.986 | 5.961 | 24.248 | 16.986 | 5.961 |
| D34 | 9.518 | 24.779 | 37.602 | 9.518 | 24.779 | 37.602 |

TABLE 27

Zoom-Lens Groups Data

| Group | Initial surface | Focal length |
|---|---|---|
| 1 | 1 | 168.05 |
| 2 | 6 | −43.81 |
| 3 | 17 | 63.26 |
| 4 | 19 | −68.72 |
| 5 | 21 | 44.24 |

TABLE 27-continued

Zoom-Lens Groups Data

| Group | Initial surface | Focal length |
|---|---|---|
| 6 | 28 | −51.52 |
| 7 | 31 | 72.45 |
| 8 | 33 | −78.96 |

TABLE 28

|  | Focal length | H1 | HH | H2 |
|---|---|---|---|---|
| 1st lens group | 168.052 | −2.342 | 7.260 | 15.741 |
| 2nd lens group | −43.807 | 9.603 | 6.096 | 4.401 |
| 3rd lens group | 63.259 | 1.775 | 1.584 | 2.501 |
| 4th lens group | −68.720 | −0.765 | 0.715 | 1.550 |
| 5th lens group | 44.239 | 3.618 | 5.727 | 9.235 |
| 6th lens group | −51.519 | 2.064 | 1.679 | 0.167 |
| 7th lens group | 72.447 | 0.967 | 2.794 | 4.040 |
| 8th lens group | −78.958 | −0.144 | 0.595 | 1.348 |
| 2nd sub-lens-A | −218.482 | −7.450 | 2.212 | 12.838 |
| 2nd sub-lens-B | −60.721 | 8.801 | 2.038 | −0.339 |

TABLE 29

Aspherical Surface Data

NO.33　K = −0.338 A4 = 0.6191E−05 A6 = 0.2880E−09 A8 = −0.2054E−11 A10 = 0.2950E−14

Eighth Numerical Example

FIGS. 61 to 67 and Tables 30 to 33 pertain to a zoom lens according to the eighth numerical example.

Figure 61:
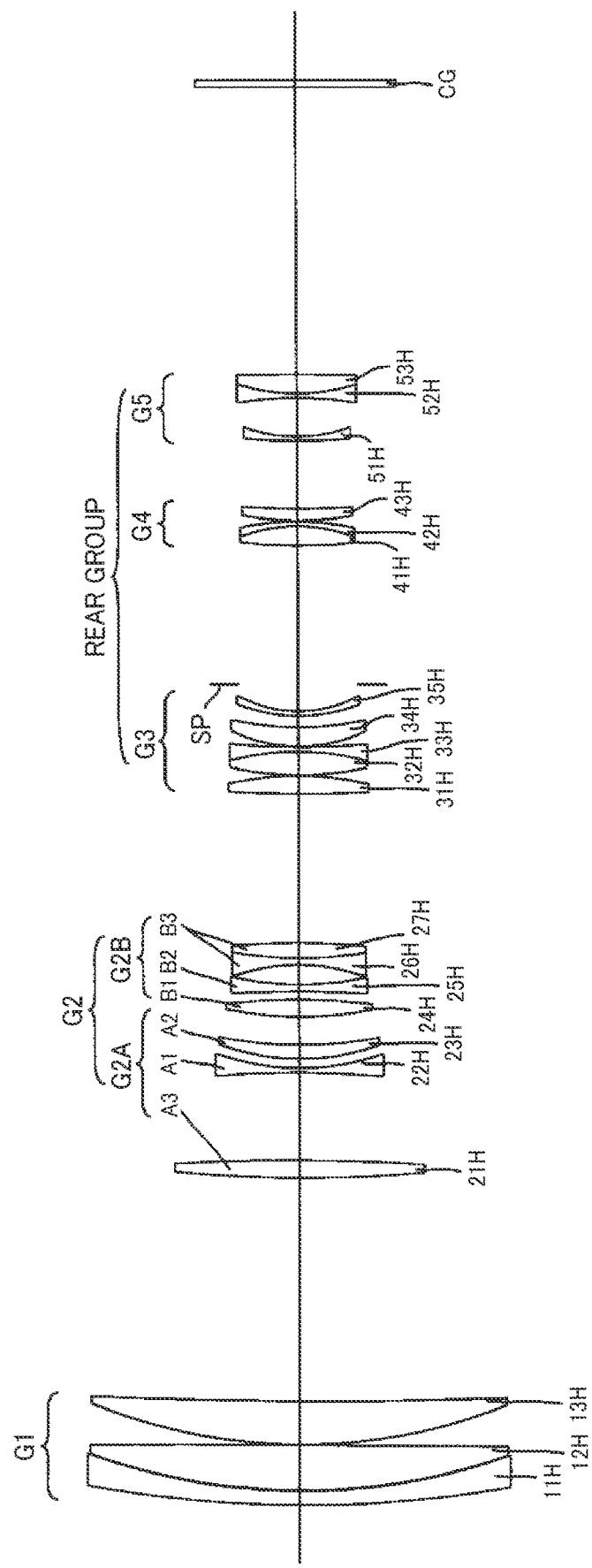
FIG. 61 is an illustration of a lens configuration of the zooming lens in FIG. 8 focused on infinity at a short focal length end.

FIG. 61 is an illustration of the configuration of the zoom lens focused on infinity at the short focal length end.

Figure 62:
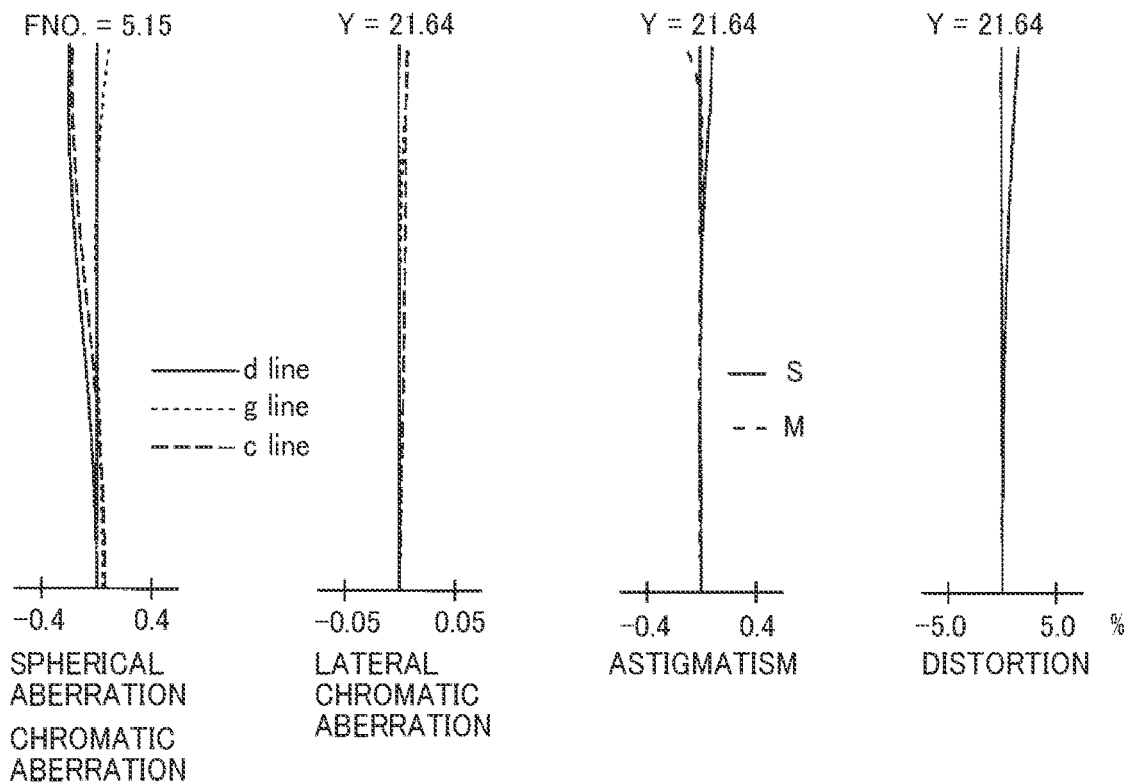
FIG. 62 is a collection of longitudinal aberration diagrams of the zoom lens in FIG. 8 focused on infinity at the short focal length end.
Figure 63:
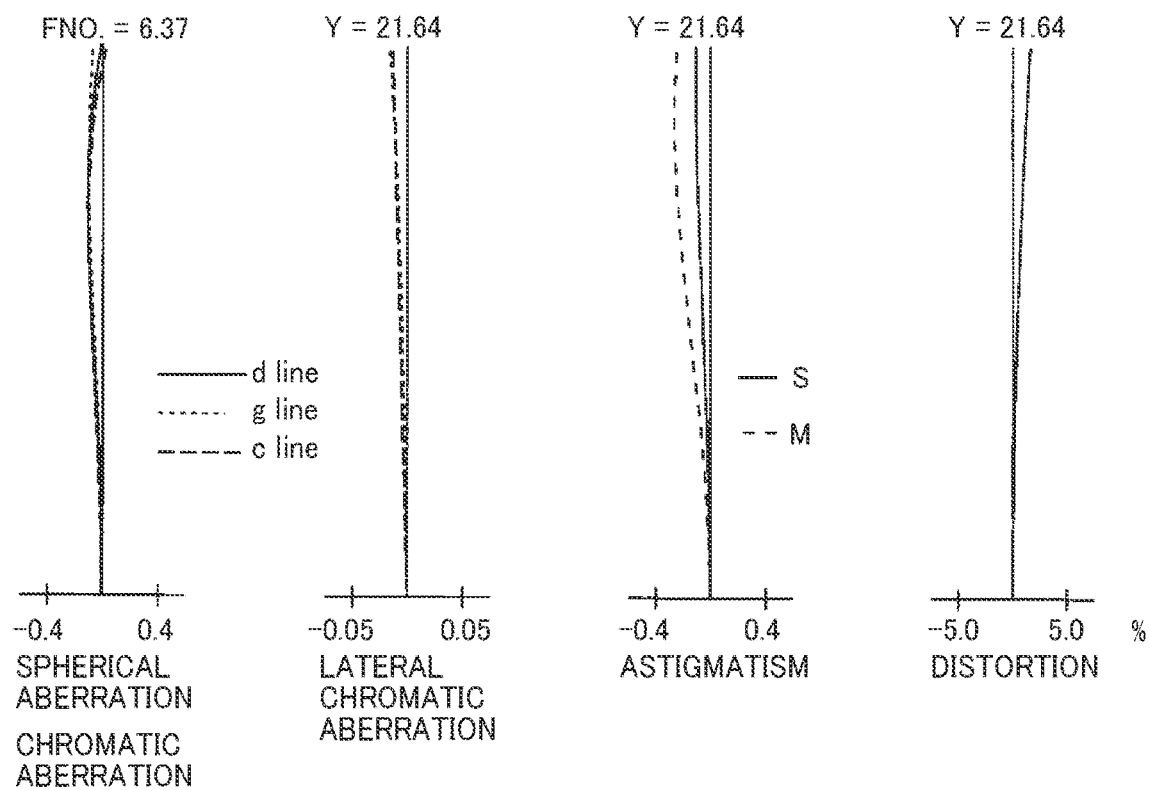
FIG. 63 is a collection of longitudinal aberration diagrams of the zoom lens in FIG. 8 focused on infinity at a long focal length end.

FIG. 62 is a collection of longitudinal aberration diagrams of the zoom lens focused on infinity at the short focal length end, and FIG. 63 is a collection of longitudinal aberration diagrams of the zoom lens focused on infinity at the long focal length end.

Figure 64:
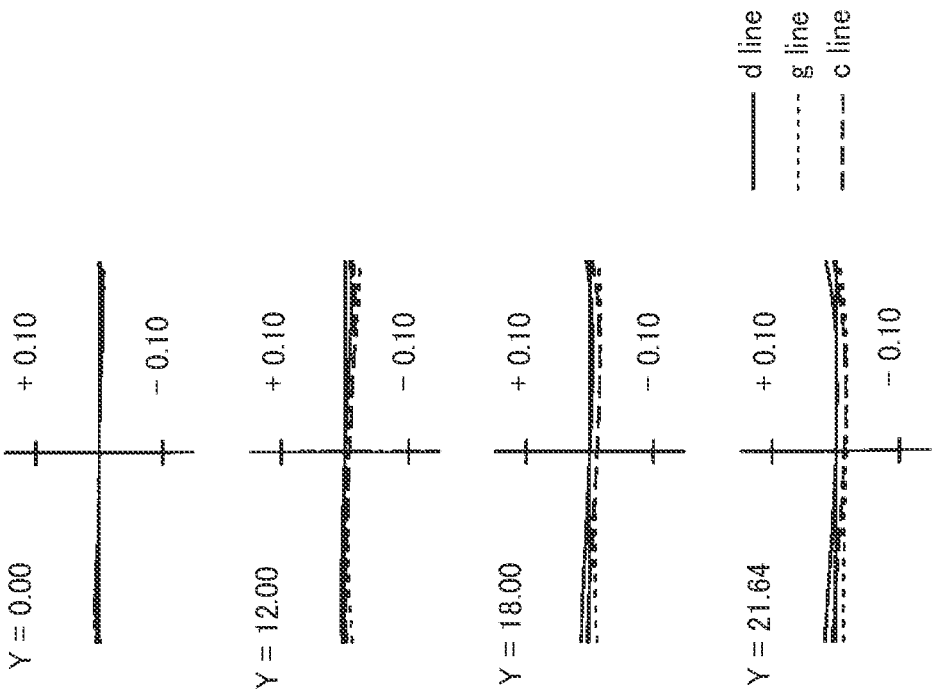
FIG. 64 is a collection of lateral aberration diagrams of the zoom lens in FIG. 8 focused on infinity at the short focal length end.
Figure 65:
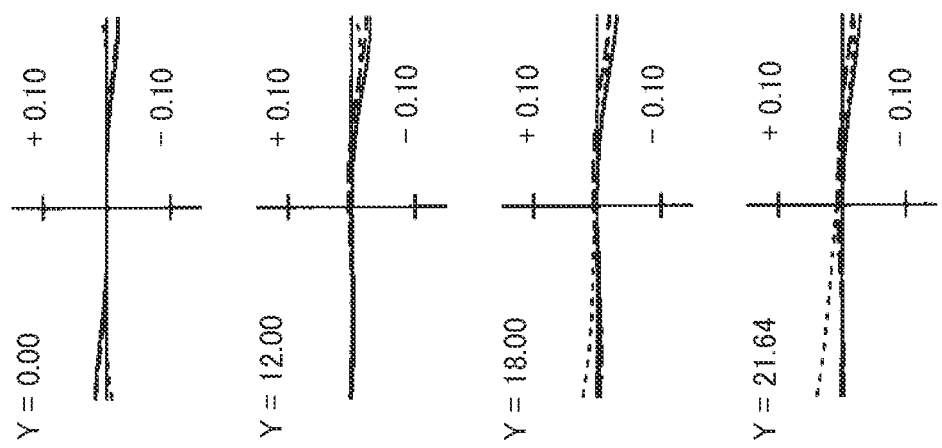
FIG. 65 is a collection of lateral aberration diagrams of the zoom lens in FIG. 8 focused on infinity at the long focal length end.

FIG. 64 is a collection of lateral aberration diagrams of the zoom lens focused on infinity at the short focal length end, and FIG. 65 is a collection of lateral aberration diagrams of the zoom lens focused on infinity at the long focal length end.

Figure 67:
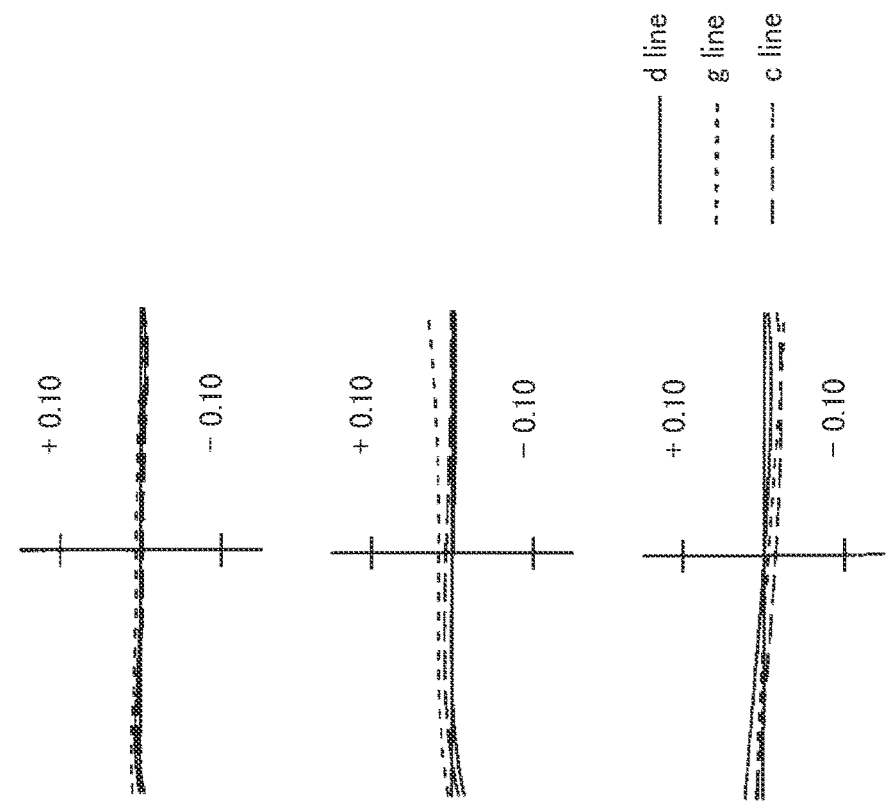
FIG. 67 is a collection of lateral aberration diagrams of the zoom lens in FIG. 8 focused on infinity at the long focal length end during the operation of vibration isolation.
Figure 66:
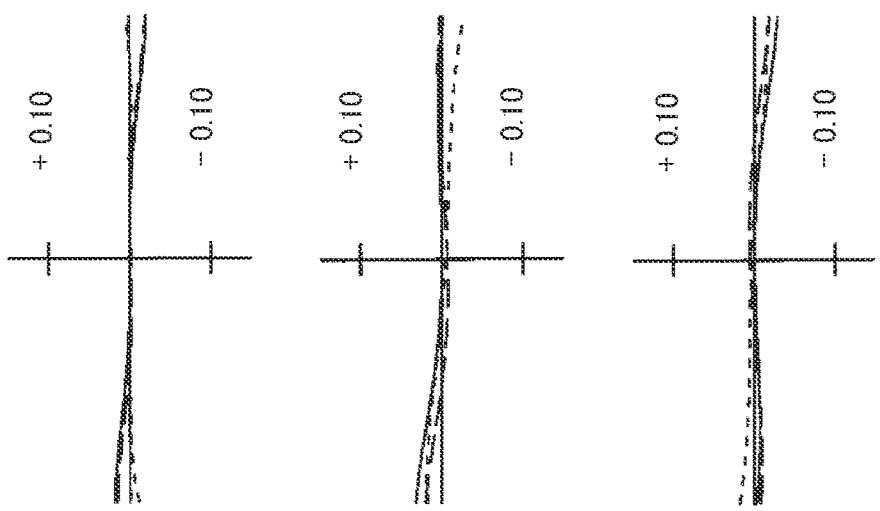
FIG. 66 is a collection of lateral aberration diagrams of the zoom lens in FIG. 8 focused on infinity at the short focal length end during the operation of vibration isolation.

FIG. 66 is a collection of lateral aberration diagrams of the zoom lens focused on infinity at the short focal length end (in FIG. 64) during the operation of vibration isolation. FIG. 67 is a collection of lateral aberration diagrams of the zoom lens focused on infinity at the long focal length end (in FIG. 65) during the operation of vibration isolation.

Table 30 presents surface data, and Table 31 presents various types of data. In Table 31, MP denotes magnification power.

Table 32 presents data regarding the zoom-lens groups, and Table 33 presents data regarding principal-point locations.

The zoom lens according to the eighth numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3.

A plane-parallel plate CG is provided between the fifth lens group G5 and the image plane.

The second lens group G2 consists of a negative second sub-lens group-A G2A and a negative second sub-lens group-B G2B arranged in that order from the object side toward the image side.

The second sub-lens group-A G2A consists of a positive lens component A3, a negative lens component A1, and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens group G1 consists of a positive meniscus lens 11H with a convex surface facing the object, a positive biconvex lens 12H, and a positive meniscus lens 13H with a convex surface facing the object, which are arranged in that order from the object side toward the image side.

The second lens group G2 has the configuration as described below. The positive lens component A3 is a positive biconvex lens 21H.

The negative lens component A1 is a negative biconcave lens 22H. The positive lens component A2 is a positive meniscus lens 23H with a convex surface facing the object.

The positive lens component B1 is a positive biconvex lens 24H. The negative lens component B2 is a negative biconcave lens 25H.

The negative lens component B3 is a cemented lens formed of a negative biconcave lens 26H and a positive biconvex lens 27H.

The third lens group G3 consists of a positive biconvex lens 31H, a positive biconvex lens 32H, a negative biconcave lens 33H, a positive meniscus lens 34H with a convex surface facing the object, and a negative meniscus lens 35H with a convex surface facing the object, which are arranged in that order from the object side.

The positive biconvex lens 32H and the negative biconcave lens 33H are cemented to each other.

The fourth lens group G4 consists of a positive biconvex lens 41H, a negative meniscus lens 42H with a convex surface facing the image, and a positive meniscus lens 43H with a convex surface facing the object, which are arranged in that order from the object side.

The positive biconvex lens 41H and the negative meniscus lens 42H are cemented to each other.

The fifth lens group G5 consists of, sequentially from the object side toward the image side, a negative meniscus lens 51H with a convex surface facing the object, a negative biconcave lens 52H, and a positive biconvex lens 53H.

The negative biconcave lens 52H and the positive biconvex lens 53H are cemented to each other.

TABLE 30

Surface Data
Zoom ratio: 3.77

| Surface No. | R | D | N(d) | v(d) |
|---|---|---|---|---|
| 1 | 261.410 | 3.000 | 1.83400 | 37.3 |
| 2 | 133.522 | 0.200 | | |
| 3 | 136.246 | 9.800 | 1.49700 | 81.6 |
| 4 | −5785.126 | 0.150 | | |
| 5 | 121.308 | 9.300 | 1.43700 | 95.1 |
| 6 | 1172.151 | D6 | | |
| 7 | 317.198 | 3.780 | 1.69895 | 30.1 |
| 8 | −416.867 | 19.000 | | |
| 9 | −204.809 | 1.000 | 1.83481 | 42.7 |
| 10 | 53.494 | 2.000 | | |
| 11 | 51.154 | 3.000 | 1.86966 | 20.0 |
| 12 | 93.169 | 6.092 | | |
| 13 | 87.757 | 3.500 | 1.66672 | 48.3 |
| 14 | −139.979 | 1.808 | | |
| 15 | −239.741 | 1.500 | 1.85150 | 40.8 |
| 16 | 68.832 | 4.200 | | |
| 17 | 42.911 | 1.500 | 1.65160 | 58.5 |
| 18 | 89.267 | 3.300 | 1.58144 | 40.7 |
| 19 | −143.679 | D19 | | |
| 20 | 276.863 | 3.873 | 1.77250 | 49.6 |
| 21 | −67.692 | 0.150 | | |
| 22 | 66.350 | 5.004 | 1.49700 | 81.6 |
| 23 | −57.763 | 1.000 | 1.91082 | 35.2 |
| 24 | 159.525 | 0.150 | | |
| 25 | 33.061 | 4.206 | 1.66672 | 48.3 |
| 26 | 67.558 | 2.455 | | |
| 27 | 36.245 | 1.000 | 1.83481 | 42.7 |
| 28 | 26.895 | 5.761 | | |
| 29(Stop) | INFINITY | D29 | | |
| 30 | 122.726 | 4.150 | 1.48749 | 70.2 |
| 31 | −35.076 | 1.000 | 1.83481 | 42.7 |
| 32 | −58.791 | 0.150 | | |
| 33 | 65.438 | 2.570 | 1.71700 | 47.9 |
| 34 | 170.753 | D34 | | |
| 35 | 110.221 | 1.000 | 1.87070 | 40.7 |
| 36 | 33.945 | 8.330 | | |
| 37 | −82.568 | 1.000 | 1.49700 | 81.6 |
| 38 | 42.858 | 4.059 | 1.80610 | 33.3 |
| 39 | −1937.311 | D39 | | |
| 40 | INFINITY | 1.500 | 1.51633 | 64.1 |
| 41 | INFINITY | — | | |

TABLE 31

Various Data

| | Infinity | | | Short-distance | | |
|---|---|---|---|---|---|---|
| | Wide-angle | Inter-mediate | Telephoto | Wide-angle | Inter-medium | Telephoto |
| FNO. | 5.1 | 5.5 | 6.4 | 5.1 | 5.8 | 7.9 |
| f | 154.50 | 250.00 | 582.00 | 121.48 | 167.48 | 179.17 |
| MP | 0.000 | 0.000 | 0.000 | −0.182 | −0.254 | −0.461 |
| W | 7.8 | 4.9 | 2.1 | 7.7 | 4.8 | 1.6 |
| Y | 21.64 | 21.64 | 21.64 | 21.64 | 21.64 | 21.64 |
| BF | 64.28 | 89.48 | 112.93 | 56.40 | 77.37 | 64.52 |
| L | 308.22 | 351.29 | 387.42 | 308.22 | 351.29 | 387.42 |
| D6 | 47.831 | 90.903 | 127.028 | 47.831 | 90.903 | 127.028 |
| D19 | 32.302 | 30.110 | 3.500 | 32.302 | 30.110 | 3.500 |
| D29 | 30.133 | 14.183 | 22.971 | 30.133 | 14.183 | 22.971 |
| D34 | 14.688 | 7.629 | 1.998 | 22.566 | 19.741 | 50.417 |
| D39 | 62.290 | 87.491 | 110.944 | 54.412 | 75.379 | 62.526 |

TABLE 32

Zoom-Lens Groups Data

| Group | Initial surface | Focal length |
|---|---|---|
| 1 | 1 | 256.10 |
| 2 | 7 | −45.13 |
| 3 | 20 | 70.65 |
| 4 | 30 | 66.30 |
| 5 | 35 | −63.84 |

TABLE 33

Principal-Point Location

| | Focal length | H1 | HH | H2 |
|---|---|---|---|---|
| 1st lens group | 256.098 | 5.763 | 7.393 | 9.295 |
| 2nd lens group | −45.126 | 41.839 | 4.358 | 4.483 |
| 3rd lens group | 70.653 | −6.390 | 7.977 | 22.012 |
| 4th lens group | 66.296 | 2.496 | 2.869 | 2.504 |
| 5th lens group | −63.841 | −0.454 | 2.366 | 12.477 |
| 2nd sub-lens-A | −143.827 | 35.720 | 0.687 | −7.627 |
| 2nd sub-lens-B | −70.104 | 11.042 | 3.267 | 1.500 |
| 2nd sub-lens group-AR | −85.031 | 0.282 | 1.902 | 3.816 |

Ninth Numerical Example

FIGS. 68 to 74 and Tables 34 to 37 pertain to a zoom lens according to the ninth numerical example.

Figure 68:
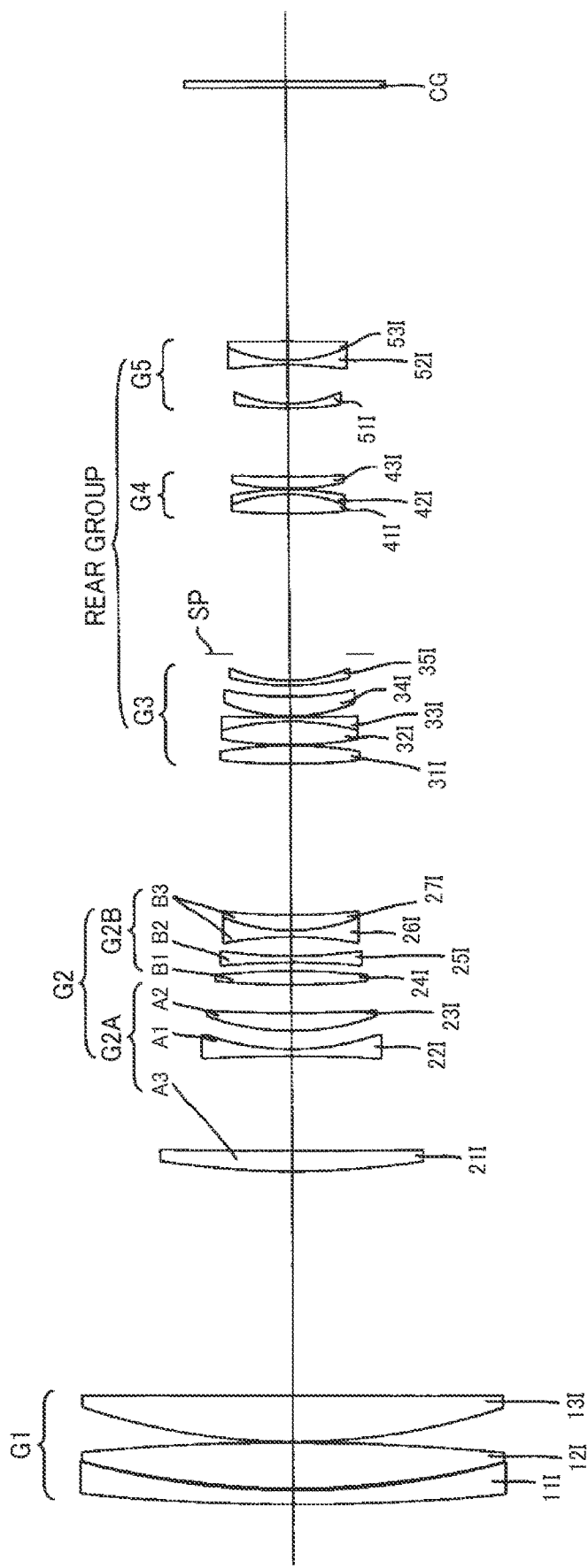
FIG. 68 is an illustration of a lens configuration of the zooming lens in FIG. 9 focused on infinity at a short focal length end.

FIG. 68 is an illustration of the configuration of the zoom lens focused on infinity at the short focal length end.

Figure 69:
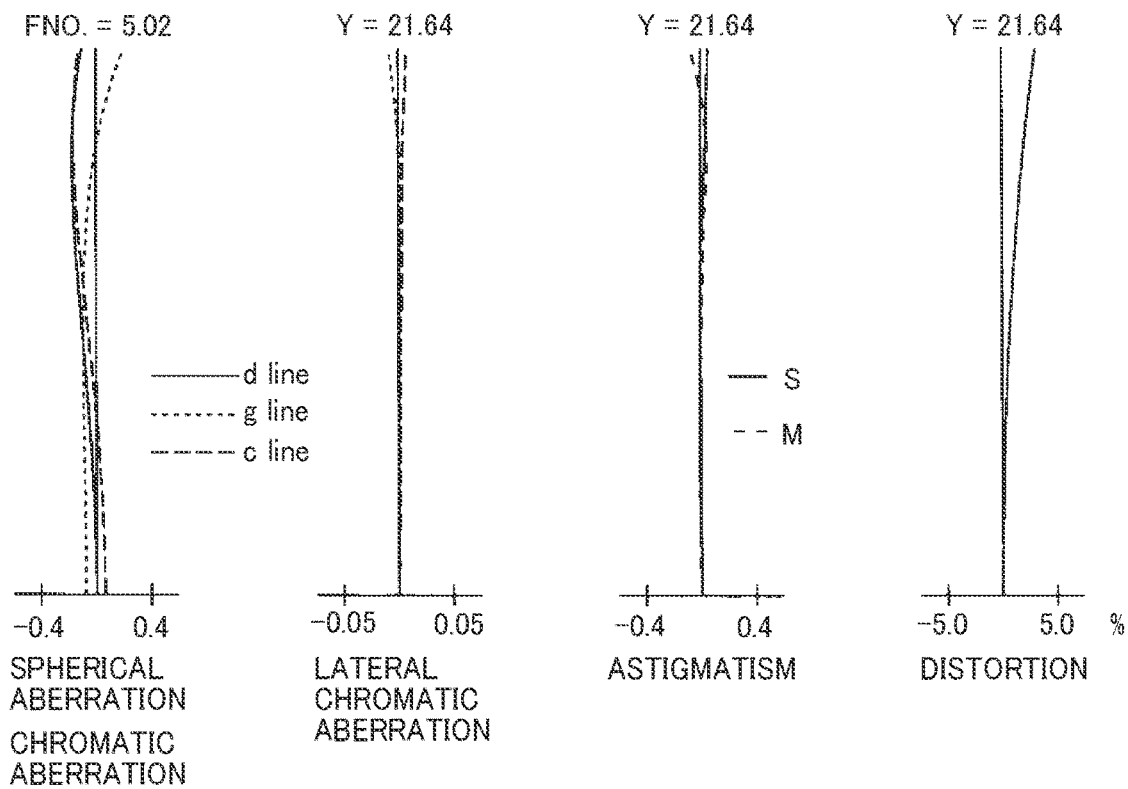
FIG. 69 is a collection of longitudinal aberration diagrams of the zoom lens in FIG. 9 focused on infinity at the short focal length end.
Figure 70:
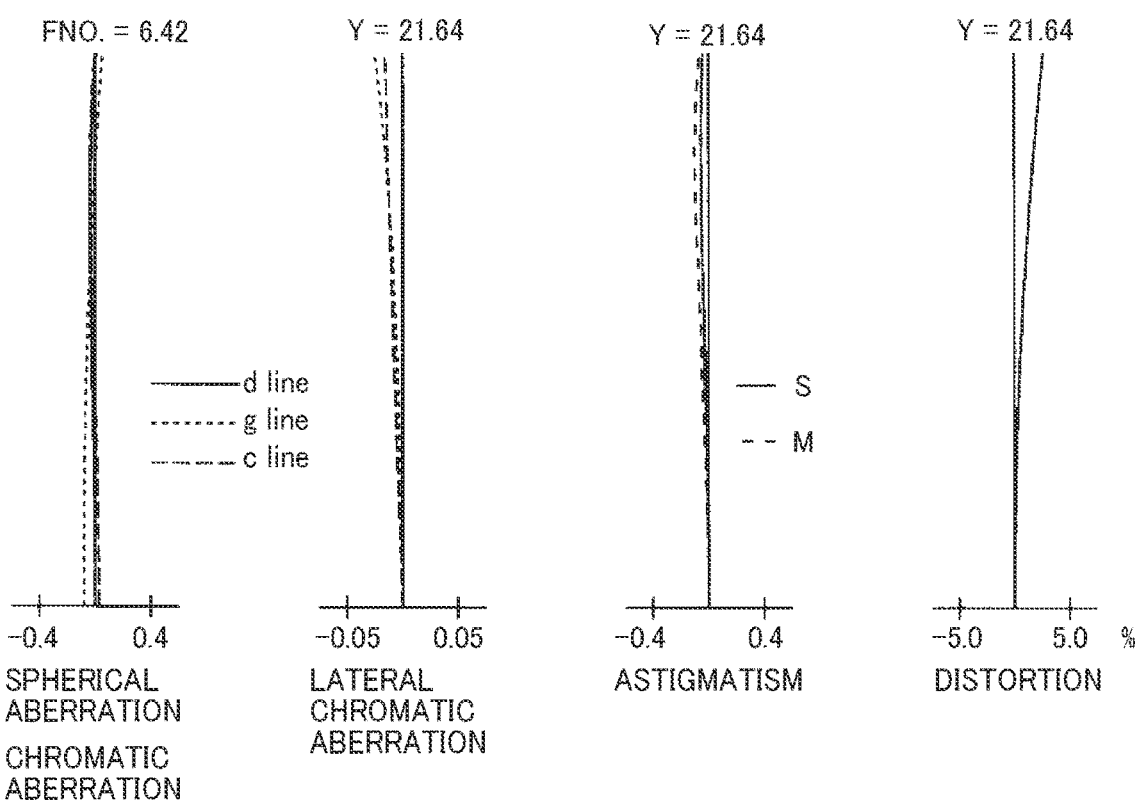
FIG. 70 is a collection of longitudinal aberration diagrams of the zoom lens in FIG. 9 focused on infinity at a long focal length end.

FIG. 69 is a collection of longitudinal aberration diagrams of the zoom lens focused on infinity at the short focal length end, and FIG. 70 is a collection of longitudinal aberration diagrams of the zoom lens focused on infinity at the long focal length end.

FIG. 71 is a collection of lateral aberration diagrams of the zoom lens focused on infinity at the short focal length end, and FIG. 72 is a collection of lateral aberration diagrams of the zoom lens focused on infinity at the long focal length end.

Figure 73:
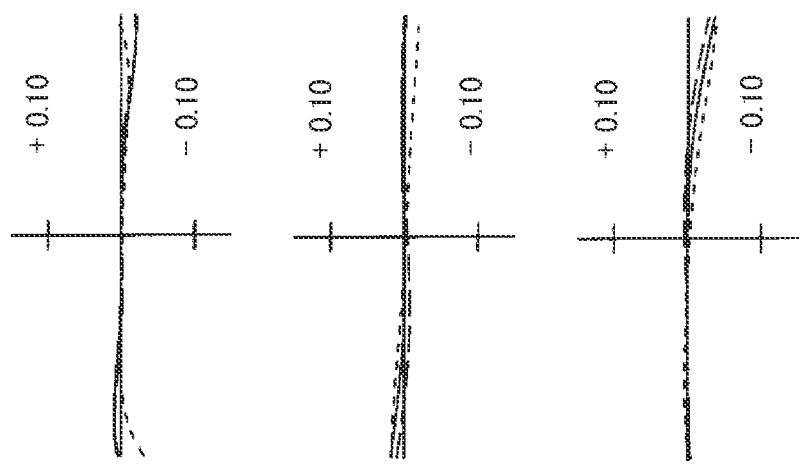
FIG. 73 is a collection of lateral aberration diagrams of the zoom lens in FIG. 9 focused on infinity at the long focal length end during the operation of vibration isolation.

FIG. 73 is a collection of lateral aberration diagrams of the zoom lens focused on infinity at the short focal length end (in FIG. 71) during the operation of vibration isolation.

Figure 74:
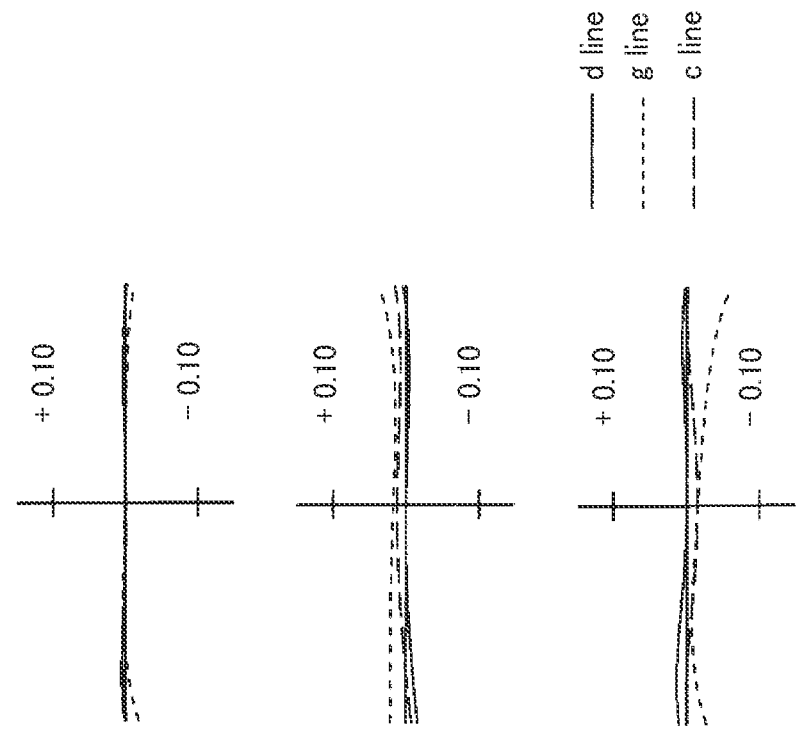
FIG. 74 is a collection of lateral aberration diagrams of the zoom lens in FIG. 9 focused on infinity at the long focal length end during the operation of vibration isolation.

FIG. 74 is a collection of lateral aberration diagrams of the zoom lens focused on infinity at the long focal length end (in FIG. 72) during the operation of vibration isolation.

Table 34 presents surface data, and Table 35 presents various types of data. In Table 35, MP denotes magnification power.

Table 36 presents data regarding the zoom-lens groups, and Table 37 presents data regarding principal-point locations.

The zoom lens according to the ninth numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3. A plane-parallel plate CG is provided between the fifth lens group G5 and the image plane.

The second lens group G2 includes a negative second sub-lens group-A G2A and a negative second sub-lens group-B G2B arranged in that order from the object side toward the image side.

The second sub-lens group-A G2A includes a positive lens component A3, a negative lens component A1, and a positive lens component A2 arranged in that order from the object side toward the image side.

The second sub-lens group-B G2B includes a positive lens component B1, a negative lens component B2, and a negative lens component B3 arranged in that order from the object side toward the image side.

The first lens group G1 consists of a positive meniscus lens 11I with a convex surface facing the object, a positive biconvex lens 12I, and a positive meniscus lens 13I with a convex surface facing the object, which are arranged in that order from the object side toward the image side.

The second lens group G2 has the configuration as described below. The positive lens component A3 is a positive meniscus lens 21I with a convex surface facing the object.

The negative lens component A1 is a negative biconcave lens 22I. The positive lens component A2 is a positive meniscus lens 23I with a convex surface facing the object.

The positive lens component B1 is a positive biconvex lens 24I.

The negative lens component B2 is a negative biconcave lens 25I. The negative lens component B3 is a cemented lens formed of a negative biconcave lens 26I and a positive meniscus lens 27I with a convex surface facing the object.

The third lens group G3 consists of a positive biconvex lens 31I, a positive biconvex lens 32I, a negative meniscus lens 33I with a convex surface facing the image, a positive meniscus lens 34I with a convex surface facing the object, and a negative meniscus lens 35I with a convex surface facing the object, which are arranged in that order from the object side toward the image side.

The positive biconvex lens 32I and the negative meniscus lens 33I are cemented to each other.

The fourth lens group G4 consists of a positive biconvex lens 41I, a negative meniscus lens 42I with a convex surface facing the image, and a positive meniscus lens 43I with a convex surface facing the object, which are arranged in that order from the object side toward the image side.

The positive biconvex lens 41I and the negative meniscus lens 42I are cemented to each other.

The fifth lens group G5 consists of, sequentially from the object side toward the image side, a negative meniscus lens 51I with a convex surface facing the object, a negative biconcave lens 52I, and a positive biconvex lens 53I. The negative biconcave lens 52I and the positive biconvex lens 53I are cemented to each other.

TABLE 34

Surface Data
Zoom ratio: 3.77

| Surface No. | R | D | N(d) | ν(d) |
|---|---|---|---|---|
| 1 | 455.412 | 3.000 | 1.83400 | 37.3 |
| 2 | 171.265 | 0.460 | | |
| 3 | 182.703 | 9.800 | 1.43700 | 95.1 |
| 4 | −475.113 | 0.150 | | |
| 5 | 140.924 | 9.800 | 1.49700 | 81.6 |

TABLE 34-continued

Surface Data
Zoom ratio: 3.77

| Surface No. | R | D | N(d) | ν(d) |
|---|---|---|---|---|
| 6 | 26475.675 | D6 | | |
| 7 | 188.045 | 4.350 | 1.80518 | 25.4 |
| 8 | 2843.567 | 20.253 | | |
| 9 | −329.879 | 1.500 | 1.91082 | 35.2 |
| 10 | 57.267 | 3.923 | | |
| 11 | 54.640 | 3.700 | 1.84666 | 23.8 |
| 12 | 260.362 | 6.092 | | |
| 13 | 168.015 | 3.000 | 1.56732 | 42.8 |
| 14 | −146.861 | 1.808 | | |
| 15 | −173.534 | 1.400 | 2.00100 | 29.1 |
| 16 | 106.849 | 4.100 | | |
| 17 | −78.053 | 1.400 | 1.71700 | 47.9 |
| 18 | 40.815 | 3.300 | 1.85025 | 30.0 |
| 19 | 136.817 | D19 | | |
| 20 | 161.369 | 3.873 | 1.80440 | 39.6 |
| 21 | −93.526 | 0.150 | | |
| 22 | 84.937 | 5.004 | 1.49700 | 81.6 |
| 23 | −59.753 | 1.000 | 1.90366 | 31.3 |
| 24 | 559.262 | 0.150 | | |
| 25 | 34.934 | 4.206 | 1.59410 | 60.5 |
| 26 | 70.439 | 2.455 | | |
| 27 | 52.295 | 1.000 | 1.72916 | 54.1 |
| 28 | 32.475 | 5.761 | | |
| 29(Stop) | INFINITY | D29 | | |
| 30 | 144.714 | 4.150 | 1.53775 | 74.7 |
| 31 | −34.522 | 1.000 | 1.90043 | 37.4 |
| 32 | −63.102 | 0.150 | | |
| 33 | 59.095 | 2.570 | 1.72916 | 54.7 |
| 34 | 309.511 | D34 | | |
| 35 | 85.173 | 1.000 | 1.87070 | 40.7 |
| 36 | 28.320 | 8.330 | | |
| 37 | −89.733 | 1.000 | 1.49700 | 81.6 |
| 38 | 31.692 | 4.059 | 1.68893 | 31.1 |
| 39 | −879.779 | D39 | | |
| 40 | INFINITY | 1.500 | 1.51633 | 64.1 |
| 41 | INFINITY | — | | |

TABLE 35

Various Data

| | Infinity | | | Short-distance | | |
|---|---|---|---|---|---|---|
| | Wide-angle | Inter-mediate | Telephoto | Wide-angle | Inter-medium | Telephoto |
| FNO. | 5.0 | 6.0 | 6.4 | 4.9 | 6.3 | 7.6 |
| f | 154.50 | 250.00 | 582.00 | 119.14 | 158.39 | 179.13 |
| MP | 0.000 | 0.000 | 0.000 | −0.177 | −0.276 | −0.450 |
| W | 7.7 | 4.8 | 2.1 | 7.8 | 4.5 | 1.6 |
| Y | 21.64 | 21.64 | 21.64 | 21.64 | 21.64 | 21.64 |
| BF | 56.50 | 83.82 | 105.14 | 49.55 | 72.75 | 67.43 |
| L | 305.36 | 329.92 | 384.55 | 305.36 | 329.92 | 384.55 |
| D6 | 47.837 | 72.406 | 127.028 | 47.837 | 72.406 | 127.028 |
| D19 | 32.302 | 20.542 | 3.500 | 32.302 | 20.542 | 3.500 |
| D29 | 30.133 | 16.429 | 22.992 | 30.133 | 16.429 | 22.992 |
| D34 | 14.688 | 12.832 | 1.998 | 21.642 | 23.908 | 39.699 |
| D39 | 54.513 | 81.833 | 103.146 | 47.559 | 70.757 | 65.445 |

TABLE 36

Zoom-Lens Groups Data

| Group | Initial surface | Focal length |
|---|---|---|
| 1 | 1 | 262.85 |
| 2 | 7 | −48.28 |
| 3 | 20 | 73.55 |

TABLE 36-continued

Zoom-Lens Groups Data

| Group | Initial surface | Focal length |
|---|---|---|
| 4 | 30 | 57.25 |
| 5 | 35 | −53.53 |

TABLE 37

Principal-Point Location

| | Focal length | H1 | HH | H2 |
|---|---|---|---|---|
| 1st lens group | 262.854 | 9.737 | 7.602 | 5.871 |
| 2nd lens group | −48.284 | 50.033 | 3.714 | 1.079 |
| 3rd lens group | 73.552 | −6.407 | 7.770 | 22.235 |
| 4th lens group | 57.248 | 2.771 | 2.983 | 2.116 |
| 5th lens group | −53.530 | −0.109 | 2.229 | 12.269 |
| 2nd sub-lens-A | −836.029 | 72.551 | −0.706 | −38.119 |
| 2nd sub-lens-B | −49.820 | 8.793 | 3.795 | 2.420 |
| 2nd sub-lens group-AR | −180.316 | −7.147 | 1.916 | 14.353 |

Tenth Numerical Example

FIGS. 75 to 81 and Tables 38 to 41 pertain to a zoom lens according to the tenth numerical example.

Figure 75:
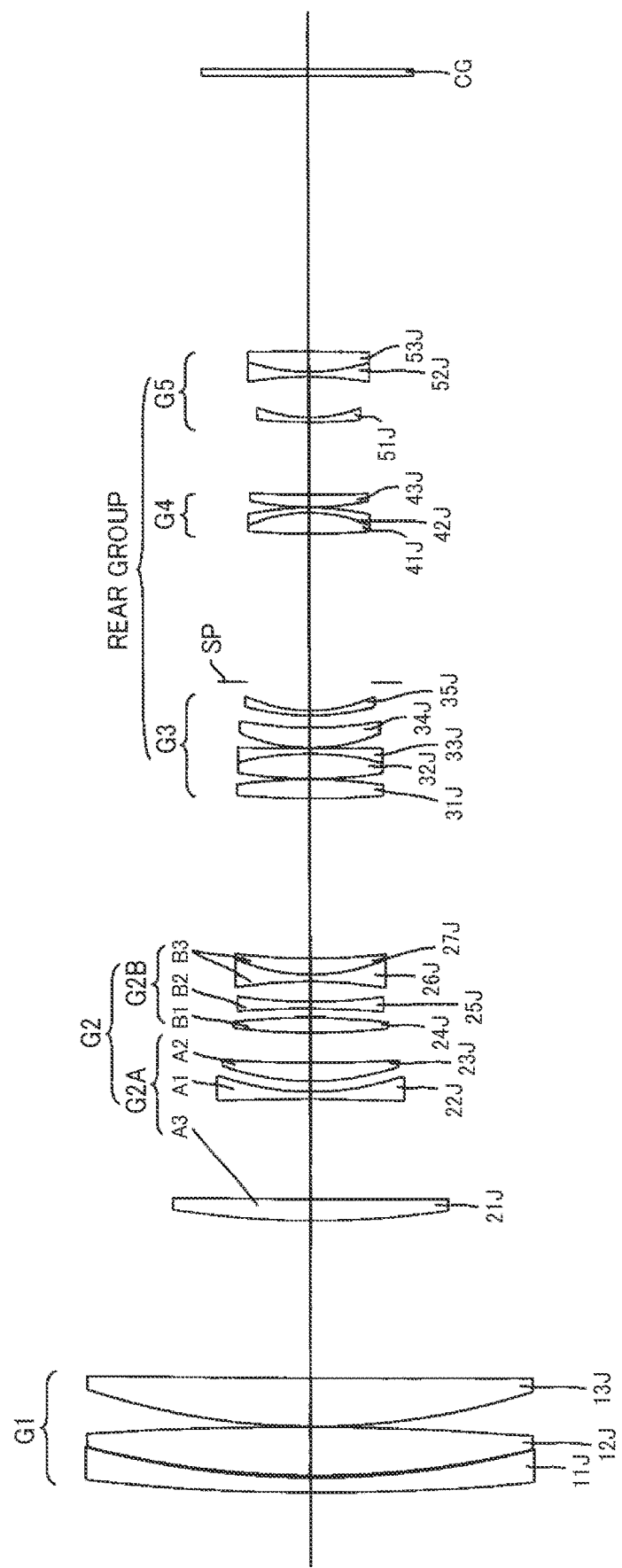
FIG. 75 is an illustration of a lens configuration of the zooming lens in FIG. 10 focused on infinity at a short focal length end.

FIG. 75 is an illustration of the configuration of the zoom lens focused on infinity at the short focal length end.

Figure 76:
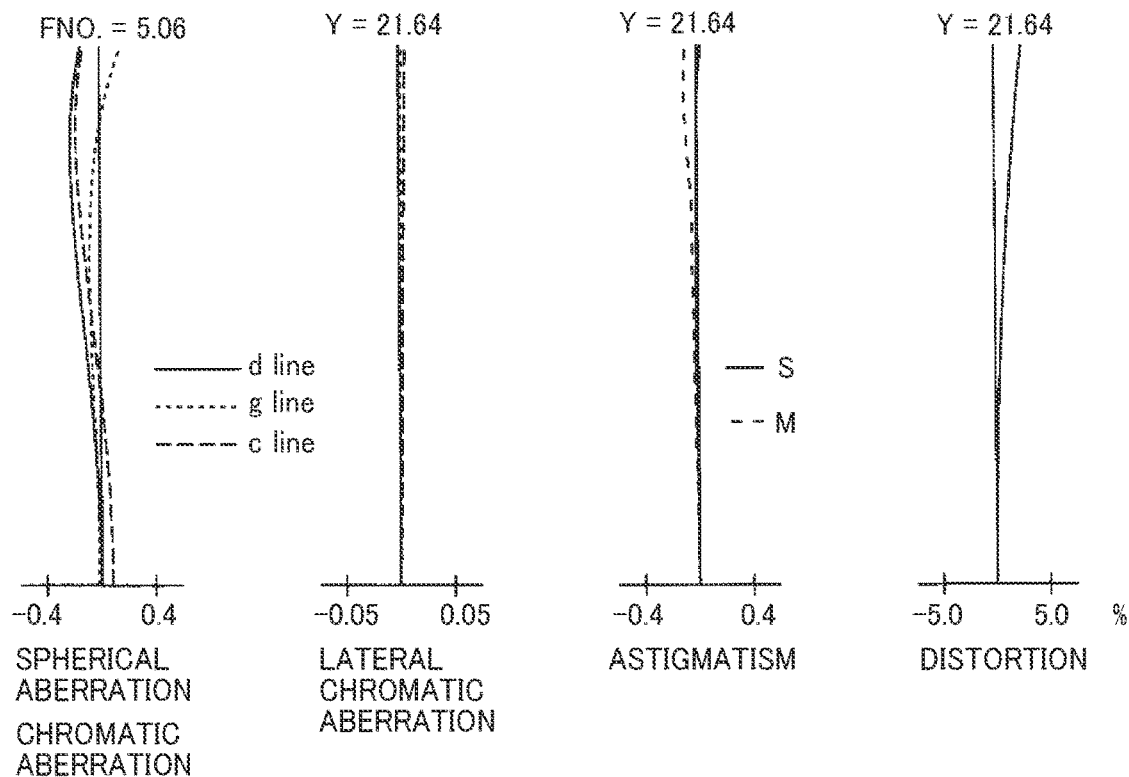
FIG. 76 is a collection of longitudinal aberration diagrams of the zoom lens in FIG. focused on infinity at the short focal length end.
Figure 77:
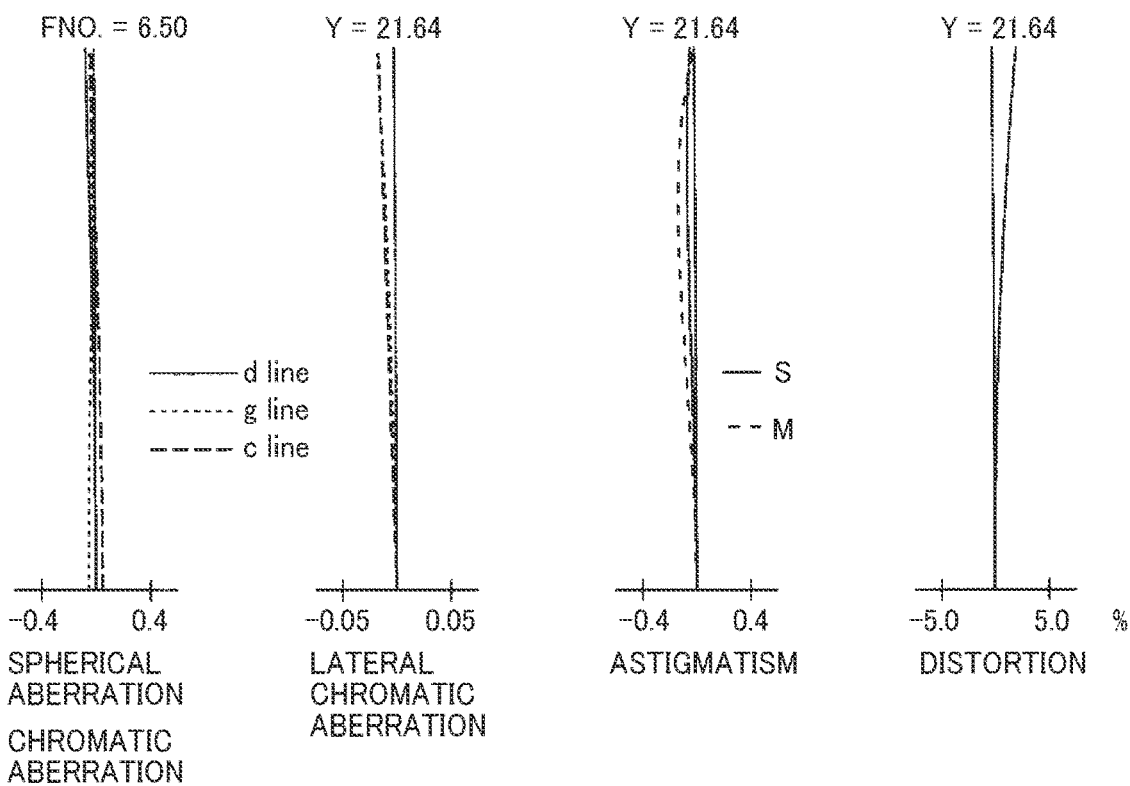
FIG. 77 is a collection of longitudinal aberration diagrams of the zoom lens in FIG. focused on infinity at a long focal length end.

FIG. 76 is a collection of longitudinal aberration diagrams of the zoom lens focused on infinity at the short focal length end, and FIG. 77 is a collection of longitudinal aberration diagrams of the zoom lens focused on infinity at the long focal length end.

Figure 78:
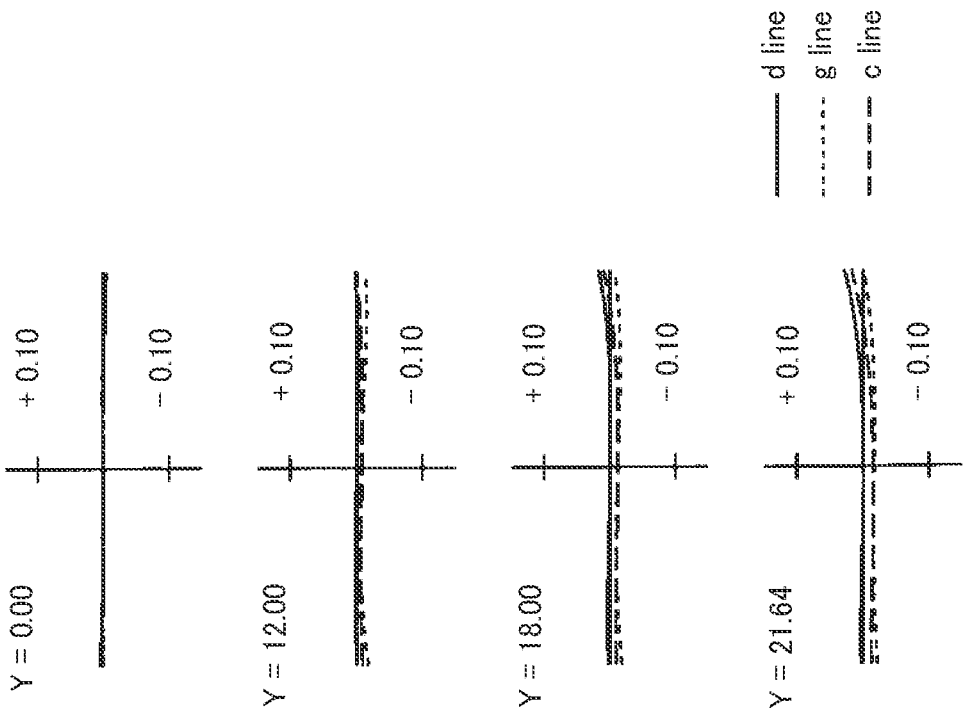
FIG. 78 is a collection of lateral aberration diagrams of the zoom lens in FIG. 10 focused on infinity at the short focal length end.
Figure 79:
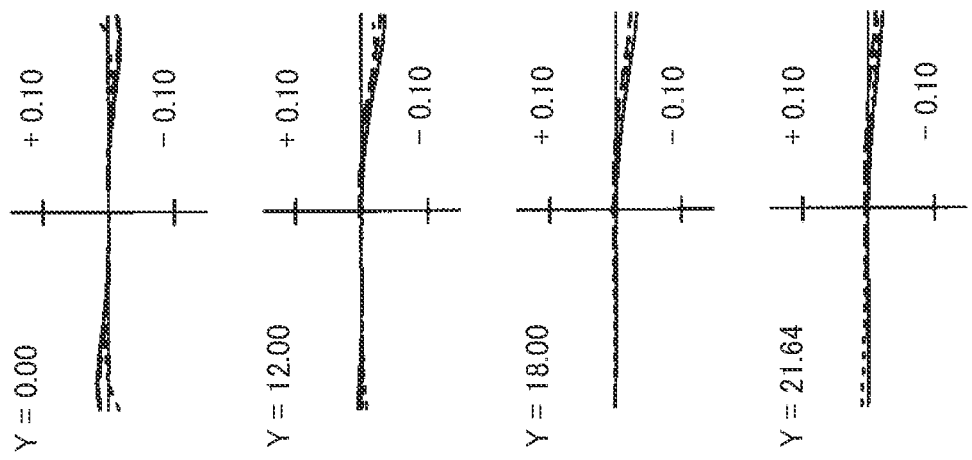
FIG. 79 is a collection of lateral aberration diagrams of the zoom lens in FIG. 10 focused on infinity at the long focal length end.

FIG. 78 is a collection of lateral aberration diagrams of the zoom lens focused on infinity at the short focal length end, and FIG. 79 is a collection of lateral aberration diagrams of the zoom lens focused on infinity at the long focal length end.

Figure 81:
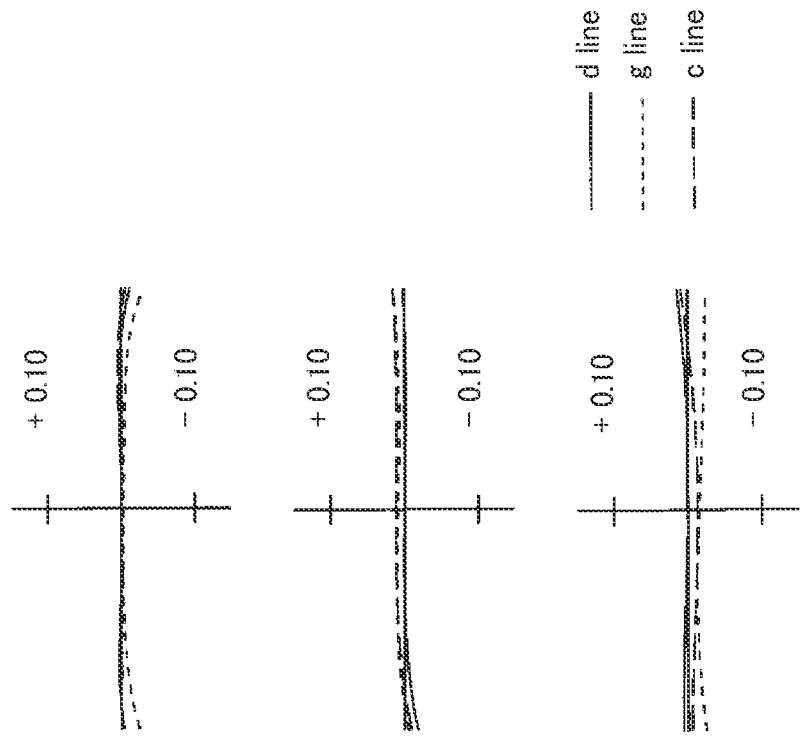
FIG. 81 is a collection of lateral aberration diagrams of the zoom lens in FIG. 10 focused on infinity at the long focal length end during the operation of vibration isolation.
Figure 80:
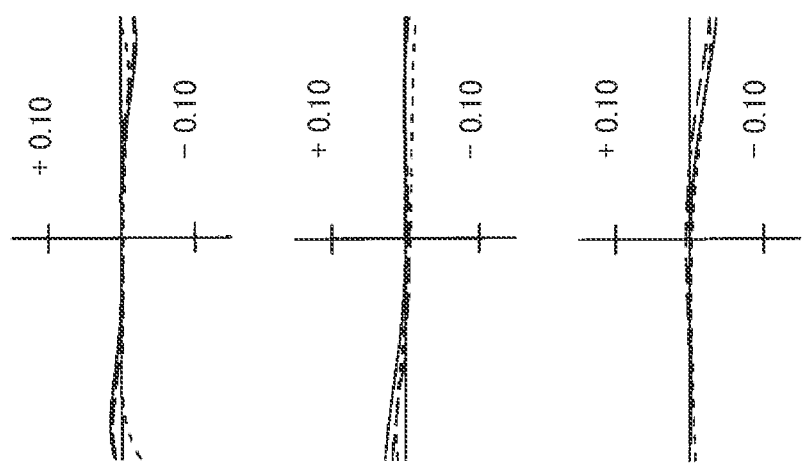
FIG. 80 is a collection of lateral aberration diagrams of the zoom lens in FIG. 10 focused on infinity at the short focal length end during the operation of vibration isolation.

FIG. 80 is a collection of lateral aberration diagrams of the zoom lens focused on infinity at the short focal length end (in FIG. 78) during the operation of vibration isolation. FIG. 81 is a collection of lateral aberration diagrams of the zoom lens focused on infinity at the long focal length end (in FIG. 79) during the operation of vibration isolation.

Table 38 presents surface data, and Table 39 presents various types of data. In Table 39, MP denotes magnification power.

Table 40 presents data regarding the zoom-lens groups, and Table 41 presents data regarding principal-point locations.

The zoom lens according to the tenth numerical example includes, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3.

A plane-parallel plate CG is provided between the fifth lens group G5 and the image plane.

The second lens group G2 consists of a positive second sub-lens group-A G2A and a negative second sub-lens group-B G2B arranged in that order from the object side toward the image side.

The second sub-lens group-A G2A consists of a positive lens component A3, a negative lens component A1, and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens group G1 consists of a negative meniscus lens 11J with a convex surface facing the object, a positive biconvex lens 12J, and a positive meniscus lens 13J with a convex surface facing the object, which are arranged in that order from the object side toward the image side.

The second lens group G2 has the configuration as described below. The positive lens component A3 is a positive meniscus lens 21J with a convex surface facing the object.

The negative lens component A1 is a negative biconcave lens 22J. The positive lens component A2 is a positive meniscus lens 23J with a convex surface facing the object.

The positive lens component B1 is a positive biconvex lens 24J. The negative lens component B2 is a negative biconcave lens 25J.

The negative lens component B3 is a cemented lens formed of a negative biconcave lens 26J and a positive meniscus lens 27J with a convex surface facing the object.

The third lens group G3 consists of a positive biconvex lens 31J, a positive biconvex lens 32J, a negative meniscus lens 33J with a convex surface facing the image, a positive meniscus lens 34J with a convex surface facing the object, and a negative meniscus lens 35J with a convex surface facing the object, which are arranged in that order from the object side toward the image side.

The positive biconvex lens 32J and the negative meniscus lens 33J are cemented to each other.

The fourth lens group G4 consists of a positive biconvex lens 41J, a negative meniscus lens 42J with a convex surface facing the image, and a positive meniscus lens 43J with a convex surface facing the object, which are arranged in that order from the object side toward the image side.

The positive biconvex lens 41J and the negative meniscus lens 42J are cemented to each other.

The fifth lens group G5 consists of, sequentially from the object side toward the image side, a negative meniscus lens 51J with a convex surface facing the object, a negative biconcave lens 52J, and a positive biconvex lens 53J.

The negative biconcave lens 52J and the positive biconvex lens 53J are cemented to each other.

TABLE 38

Surface Data
Zoom ratio: 3.77

| Surface No. | R | D | N(d) | v(d) |
|---|---|---|---|---|
| 1 | 458.519 | 3.000 | 1.83400 | 37.3 |
| 2 | 175.318 | 0.460 | | |
| 3 | 187.429 | 9.800 | 1.43700 | 95.1 |
| 4 | −622.076 | 0.150 | | |
| 5 | 145.310 | 9.800 | 1.49700 | 81.6 |
| 6 | 8543.665 | D6 | | |
| 7 | 187.012 | 4.350 | 1.85478 | 24.8 |
| 8 | 4026.710 | 20.253 | | |
| 9 | 435.583 | 1.500 | 1.83400 | 37.3 |

TABLE 38-continued

Surface Data
Zoom ratio: 3.77

| Surface No. | R | D | N(d) | v(d) |
|---|---|---|---|---|
| 10 | 55.559 | 2.176 | | |
| 11 | 54.271 | 3.700 | 1.80518 | 25.4 |
| 12 | 276.628 | 6.092 | | |
| 13 | 139.425 | 3.000 | 1.51742 | 52.4 |
| 14 | −151.374 | 1.808 | | |
| 15 | −179.211 | 1.400 | 2.00100 | 29.1 |
| 16 | 107.957 | 4.100 | | |
| 17 | −97.309 | 1.400 | 1.72000 | 50.2 |
| 18 | 39.185 | 3.300 | 1.80610 | 33.3 |
| 19 | 140.116 | D19 | | |
| 20 | 192.189 | 3.873 | 1.80610 | 40.9 |
| 21 | −106.256 | 0.150 | | |
| 22 | 94.751 | 5.004 | 1.49700 | 81.6 |
| 23 | −58.747 | 1.000 | 1.90366 | 31.3 |
| 24 | 743.356 | 0.150 | | |
| 25 | 35.137 | 4.206 | 1.59410 | 60.5 |
| 26 | 79.672 | 2.455 | | |
| 27 | 49.921 | 1.000 | 1.69680 | 55.5 |
| 28 | 31.138 | 5.761 | | |
| 29(Stop) | INFINITY | D29 | | |
| 30 | 146.033 | 4.150 | 1.56873 | 63.1 |
| 31 | −32.427 | 1.000 | 1.87070 | 40.7 |
| 32 | −59.974 | 0.150 | | |
| 33 | 58.849 | 2.570 | 1.69680 | 55.5 |
| 34 | 361.804 | D34 | | |
| 35 | 95.778 | 1.000 | 1.95375 | 32.3 |
| 36 | 29.269 | 8.330 | | |
| 37 | 66.921 | 1.000 | 1.53775 | 74.7 |
| 38 | 40.890 | 4.059 | 1.85478 | 24.8 |
| 39 | −1091.084 | D39 | | |
| 40 | INFINITY | 1.500 | 1.51633 | 64.1 |
| 41 | INFINITY | — | | |

TABLE 39

Various Data

| | Infinity | | | Short-distance | | |
|---|---|---|---|---|---|---|
| | Wide-angle | Intermediate | Telephoto | Wide-angle | Intermedium | Telephoto |
| FNO. | 5.1 | 5.5 | 6.5 | 5.0 | 5.6 | 5.6 |
| f | 154.50 | 250.00 | 582.00 | 118.00 | 156.89 | 118.00 |
| MP | 0.000 | 0.000 | 0.000 | −0.184 | −0.257 | −0.184 |
| W | 7.8 | 4.8 | 2.1 | 7.8 | 4.7 | 7.2 |
| Y | 21.64 | 21.64 | 21.64 | 21.64 | 21.64 | 21.64 |
| BF | 58.09 | 75.68 | 107.27 | 52.40 | 66.20 | 52.40 |
| L | 289.00 | 341.00 | 390.18 | 289.00 | 341.00 | 390.18 |
| D6 | 31.647 | 83.642 | 132.822 | 31.647 | 83.642 | 31.647 |
| D19 | 32.302 | 28.842 | 3.500 | 32.302 | 28.842 | 32.302 |
| D29 | 30.133 | 20.774 | 22.448 | 30.133 | 20.774 | 30.133 |
| D34 | 14.688 | 9.915 | 1.998 | 20.380 | 19.395 | 20.380 |
| D39 | 56.099 | 73.692 | 105.277 | 50.408 | 64.212 | 50.408 |

TABLE 40

Zoom-Lens Groups Data

| Group | Initial surface | Focal length |
|---|---|---|
| 1 | 1 | 287.40 |
| 2 | 7 | −59.13 |
| 3 | 20 | 82.67 |
| 4 | 30 | 52.70 |
| 5 | 35 | −46.18 |

TABLE 41

Principal-Point Location

| | Focal length | H1 | HH | H2 |
|---|---|---|---|---|
| 1st lens group | 287.397 | 9.651 | 7.601 | 5.958 |
| 2nd lens group | −59.131 | 54.656 | 1.115 | −2.692 |
| 3rd lens group | 82.667 | −6.635 | 7.674 | 22.559 |
| 4th lens group | 52.699 | 2.745 | 2.997 | 2.127 |
| 5th lens group | −46.183 | 0.203 | 2.533 | 11.653 |
| 2nd sub-lens-A | 6206.164 | −533.288 | 47.882 | 517.384 |
| 2nd sub-lens-B | −53.547 | 8.954 | 3.673 | 2.381 |
| 2nd sub-lens group-AR | −218.616 | −3.930 | 2.209 | 9.097 |

Eleventh Numerical Example

FIGS. 82 to 88 and Tables 42 to 45 pertain to a zoom lens according to the eleventh numerical example.

Figure 82:
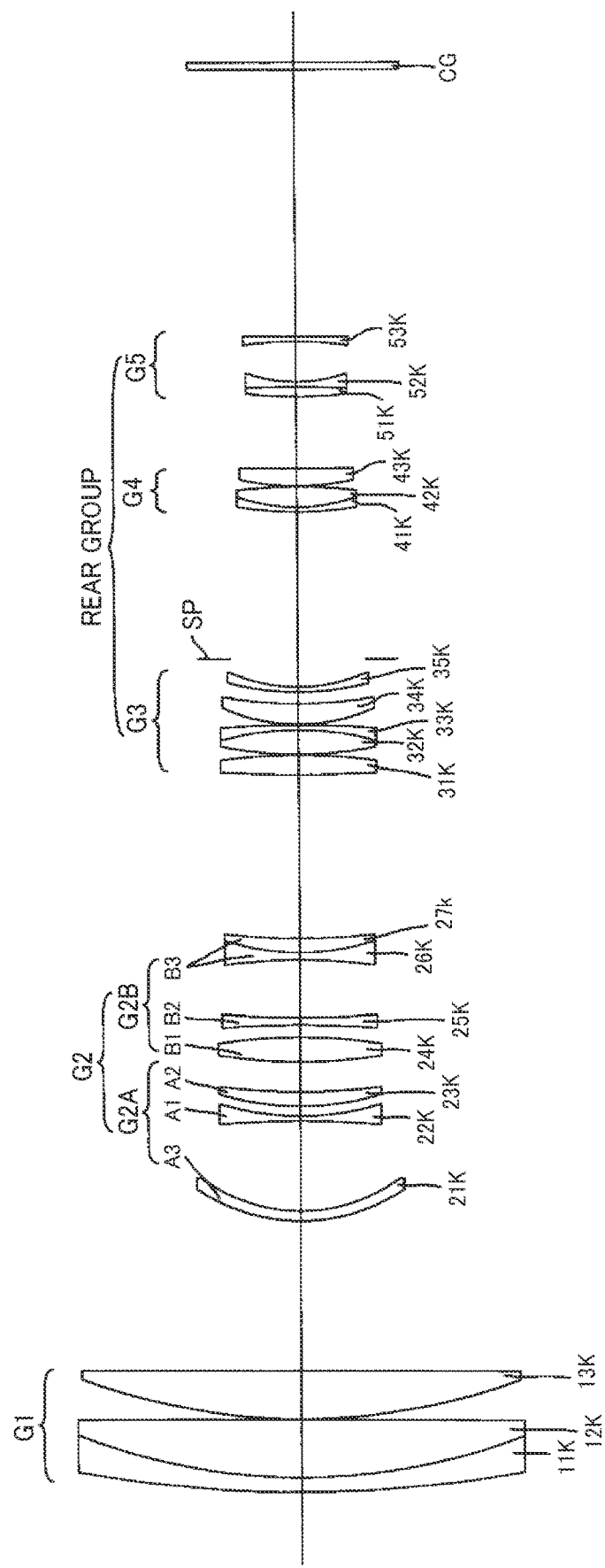
FIG. 82 is an illustration of a lens configuration of the zooming lens in FIG. 11 focused on infinity at a short focal length end.

FIG. 82 is an illustration of the configuration of the zoom lens focused on infinity at the short focal length end.

Figure 83:
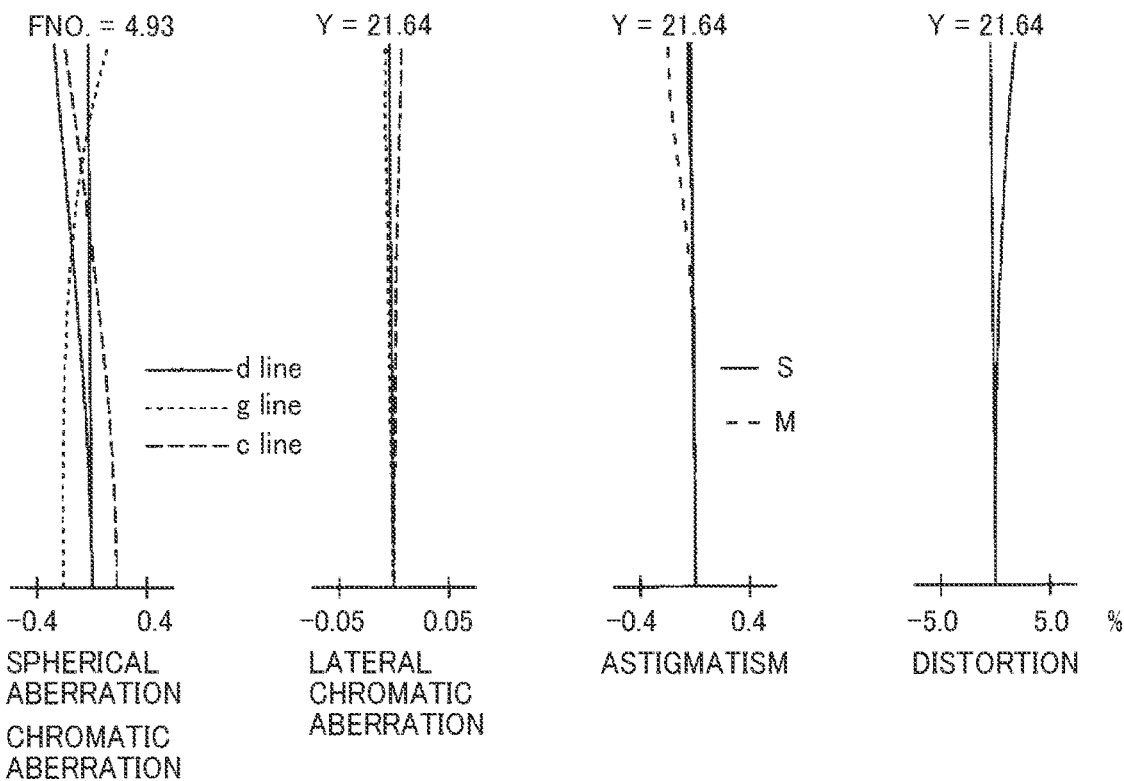
FIG. 83 is a collection of longitudinal aberration diagrams of the zoom lens in FIG. 11 focused on infinity at the short focal length end.
Figure 84:
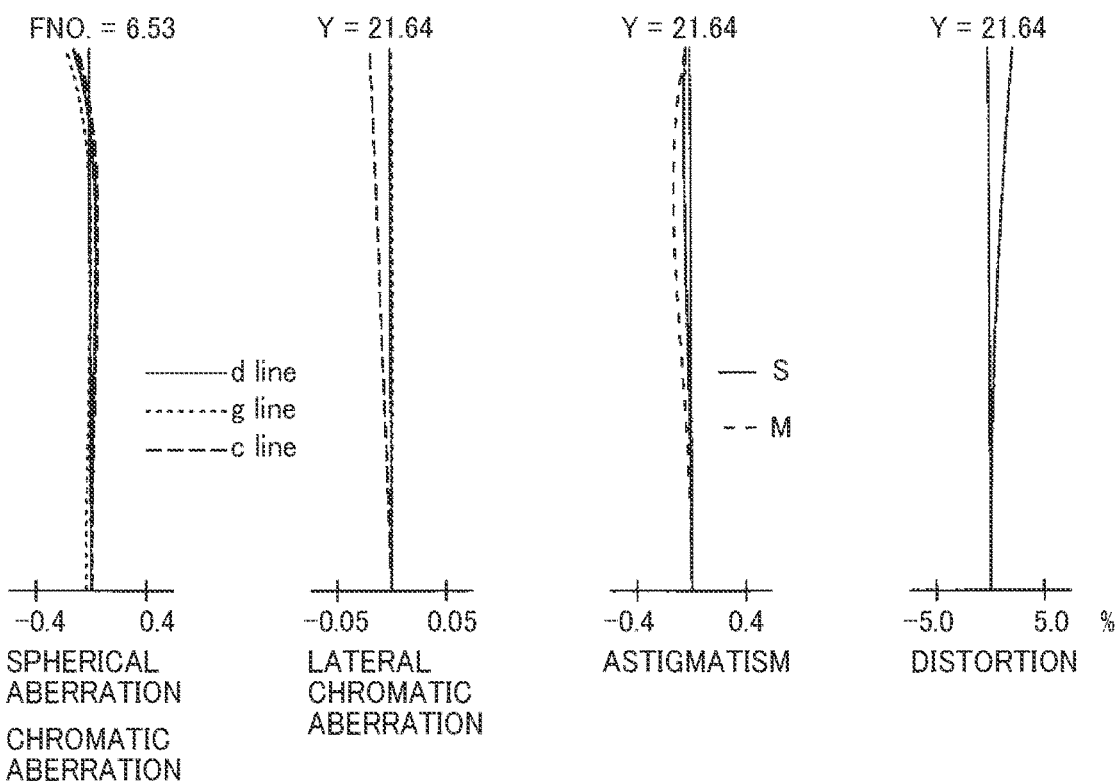
FIG. 84 is a collection of longitudinal aberration diagrams of the zoom lens in FIG. 11 focused on infinity at a long focal length end.

FIG. 83 is a collection of longitudinal aberration diagrams of the zoom lens focused on infinity at the short focal length end, and FIG. 84 is a collection of longitudinal aberration diagrams of the zoom lens focused on infinity at the long focal length end.

FIG. 85 is a collection of lateral aberration diagrams of the zoom lens focused on infinity at the short focal length end, and FIG. 86 is a collection of lateral aberration diagrams of the zoom lens focused on infinity at the long focal length end.

Figure 88:
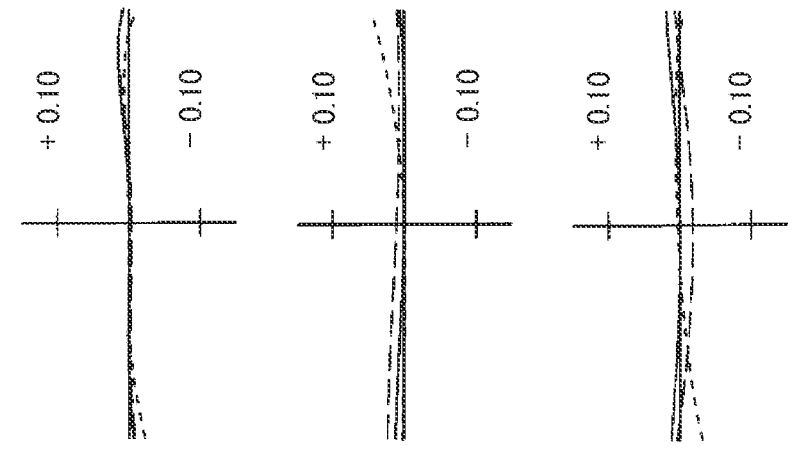
FIG. 88 is a collection of lateral aberration diagrams of the zoom lens in FIG. 8 focused on infinity at the long focal length end during the operation of vibration isolation.
Figure 87:
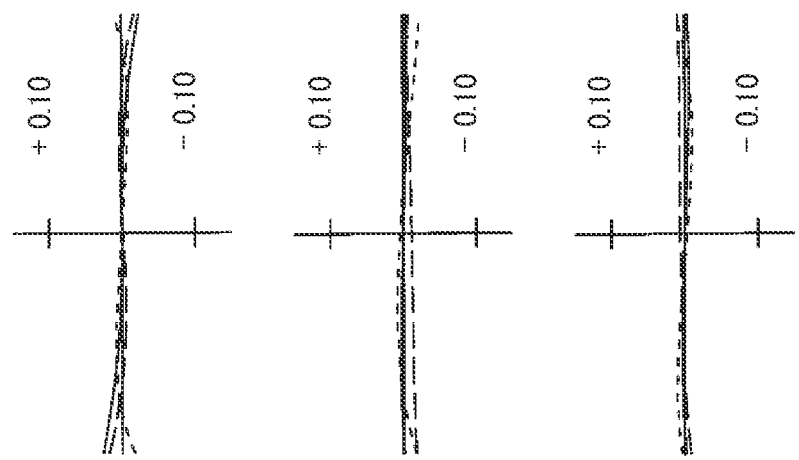
FIG. 87 is a collection of lateral aberration diagrams of the zoom lens in FIG. 11 focused on infinity at the short focal length end during the operation of vibration isolation.

FIG. 87 is a collection of lateral aberration diagrams of the zoom lens focused on infinity at the short focal length end (in FIG. 85) during the operation of vibration isolation. FIG. 88 is a collection of lateral aberration diagrams of the zoom lens focused on infinity at the long focal length end (in FIG. 86) during the operation of vibration isolation.

Table 42 presents surface data, and Table 43 presents various types of data.

Table 44 presents data regarding the zoom-lens groups, and Table 45 presents data regarding principal-point locations.

The zoom lens according to the eleventh numerical example consists of, sequentially from the object side toward the image side, a first lens group G1 having positive refractive power, a second lens group G2 having negative refractive power, a third lens group G3 having positive refractive power, a fourth lens group G4 having positive refractive power, and a fifth lens group G5 having negative refractive power.

The third lens group G3, the fourth lens group G4, and the fifth lens group G5 form a rear group.

Between the third lens group G3 and the fourth lens group G4 (immediately behind the third lens group G3), a stop SP for adjusting the intensity of light is disposed. The stop SP is movable together with the third lens group G3.

A plane-parallel plate CG is provided between the fifth lens group G5 and the image plane.

The second lens group G2 consists of a negative second sub-lens group-A G2A and a negative second sub-lens group-B G2B arranged in that order from the object side toward the image side.

The second sub-lens group-A G2A consists of a negative lens component A4, a negative lens component A1, and a positive lens component A2 arranged in that order from the object side toward the image side.

The second sub-lens group-B G2B consists of a positive lens component B1, a negative lens component B2, and a negative lens component B3 arranged in that order from the object side toward the image side.

The first lens group G1 consists of, sequentially from the object side toward the image side, a negative meniscus lens 11K with a convex surface facing the object, a positive biconvex lens 12K, and a positive biconvex lens 13K.

The positive meniscus lens 11K and the positive biconvex lens 12K are cemented to each other.

The second lens group G2 has the configuration as described below. The negative lens component A4 is a negative meniscus lens 21K with a convex surface facing the object.

The negative lens component A1 is a negative biconcave lens 22K. The positive lens component A2 is a positive meniscus lens 23K with a convex surface facing the object.

The positive lens component B1 is a positive biconvex lens 24K.

The negative lens component B2 is a negative biconcave lens 25K.

The negative lens component B3 is a cemented lens formed of a negative biconcave lens 26K and a positive meniscus lens 27K with a convex surface facing the object.

The third lens group G3 consists of a positive biconvex lens 31K, a positive biconvex lens 32K, a negative meniscus lens 33K with a convex surface facing the image, a positive meniscus lens 34K with a convex surface facing the object, and a negative meniscus lens 35K with a convex surface facing the object, which are arranged in that order from the object side toward the image side.

The positive biconvex lens 32K and the negative meniscus lens 33K are cemented to each other.

The fourth lens group G4 consists of a negative meniscus lens 41K with a convex surface facing the object, a positive biconvex lens 42K, and a positive meniscus lens 43K with a convex surface facing the object, which are arranged in that order from the object side.

The negative meniscus lens 41K and the positive biconvex lens 42K are cemented to each other.

The fifth lens group G5 consists of a positive biconvex lens 51K, a negative biconcave lens 52K, and a negative meniscus lens 53K with a convex surface facing the image, which are arranged in that order from the object side toward the image side.

The positive biconvex lens 51K and the negative biconcave lens 52K are cemented to each other.

TABLE 42

Surface Data
Zoom ratio: 4.80

| Surface No. | R | D | N(d) | v(d) |
|---|---|---|---|---|
| 1 | 256.694 | 3.000 | 1.80610 | 40.7 |
| 2 | 125.679 | 11.800 | 1.43700 | 95.1 |
| 3 | 4747.869 | 0.150 | | |
| 4 | 129.531 | 9.800 | 1.49700 | 81.6 |
| 5 | −11397.768 | D5 | | |
| 6 | 38.561 | 2.000 | 1.74000 | 28.3 |
| 7 | 34.469 | 18.253 | | |
| 8 | −196.027 | 1.000 | 1.80400 | 46.5 |
| 9 | 57.373 | 2.000 | | |
| 10 | 58.556 | 3.000 | 1.85478 | 24.8 |
| 11 | 143.549 | 6.092 | | |
| 12 | 114.810 | 5.000 | 1.51823 | 59.0 |
| 13 | −108.788 | 2.500 | | |
| 14 | −200.219 | 1.500 | 1.69680 | 55.5 |
| 15 | 200.501 | 11.683 | | |
| 16 | −118.932 | 1.500 | 1.73400 | 51.5 |
| 17 | 50.246 | 2.933 | 1.85000 | 27.0 |

TABLE 42-continued

Surface Data
Zoom ratio: 4.80

| Surface No. | R | D | N(d) | v(d) |
|---|---|---|---|---|
| 18 | 139.434 | D18 | | |
| 19 | 311.008 | 3.873 | 1.67300 | 38.2 |
| 20 | −123.779 | 0.150 | | |
| 21 | 81.967 | 5.000 | 1.49700 | 81.6 |
| 22 | −61.169 | 1.000 | 1.95375 | 32.3 |
| 23 | −227.665 | 0.150 | | |
| 24 | 38.264 | 4.206 | 1.61340 | 44.3 |
| 25 | 86.675 | 2.455 | | |
| 26 | 59.317 | 1.000 | 1.72151 | 29.2 |
| 27 | 34.907 | 5.761 | | |
| 28(Stop) | INFINITY | D28 | | |
| 29 | 75.972 | 1.000 | 2.05090 | 26.9 |
| 30 | 38.297 | 4.150 | 1.51742 | 52.4 |
| 31 | −107.567 | 0.150 | | |
| 32 | 55.288 | 3.570 | 1.69700 | 48.5 |
| 33 | 707.173 | D33 | | |
| 34 | 86.247 | 2.000 | 1.85478 | 24.8 |
| 35 | −238.208 | 1.000 | 1.72916 | 54.1 |
| 36 | 30.459 | 8.330 | | |
| 37 | −76.981 | 1.000 | 1.72916 | 54.1 |
| 38 | −2401.229 | D38 | | |
| 39 | INFINITY | 1.500 | 1.51633 | 64.1 |
| 40 | INFINITY | — | | |

TABLE 43

Various Data

| | Infinity | | | Short-distance | | |
|---|---|---|---|---|---|---|
| | Wide-angle | Inter-mediate | Telephoto | Wide-angle | Inter-medium | Telephoto |
| FNO. | 4.9 | 5.7 | 6.5 | 5.7 | 8.3 | 13.2 |
| f | 123.50 | 250.00 | 592.46 | 100.22 | 156.47 | 176.22 |
| MP | 0.000 | 0.000 | 0.000 | −0.155 | −0.252 | −0.453 |
| W | 9.7 | 4.8 | 2.0 | 9.2 | 4.1 | 1.0 |
| Y | 21.64 | 21.64 | 21.64 | 21.64 | 21.64 | 21.64 |
| BF | 56.76 | 80.92 | 106.60 | 52.61 | 72.23 | 77.98 |
| L | 292.46 | 351.79 | 387.30 | 292.46 | 351.79 | 387.30 |
| D5 | 30.404 | 89.736 | 125.249 | 30.404 | 89.736 | 125.249 |
| D18 | 33.465 | 28.444 | 3.500 | 33.465 | 28.444 | 3.500 |
| D28 | 30.133 | 16.798 | 22.956 | 30.133 | 16.798 | 22.956 |
| D33 | 14.688 | 8.887 | 1.998 | 18.843 | 17.573 | 30.615 |
| D38 | 54.774 | 78.931 | 104.606 | 50.619 | 70.245 | 75.988 |

TABLE 44

Zoom-Lens Groups Data

| Group | Initial surface | Focal length |
|---|---|---|
| 1 | 1 | 240.26 |
| 2 | 6 | −47.14 |
| 3 | 19 | 78.75 |
| 4 | 29 | 61.18 |
| 5 | 34 | −43.26 |

TABLE 45

Principal-Point Location

| | Focal length | H1 | HH | H2 |
|---|---|---|---|---|
| 1st lens group | 240.263 | 8.496 | 8.078 | 8.176 |
| 2nd lens group | −47.139 | 32.644 | 11.154 | 13.662 |
| 3rd lens group | 78.746 | −4.075 | 7.108 | 20.562 |
| 4th lens group | 61.182 | 2.828 | 3.361 | 2.681 |

TABLE 45-continued

Principal-Point Location

|  | Focal length | H1 | HH | H2 |
|---|---|---|---|---|
| 5th lens group | −43.257 | 5.771 | 1.973 | 4.586 |
| 2nd sub-lens-A | −90.134 | 18.215 | 2.431 | 5.608 |
| 2nd sub-lens-B | −148.73 | 33.831 | 1.434 | −10.149 |
| 2nd sub-lens group-AR | −108.705 | −0.554 | 1.837 | 4.717 |

Table 46 presents image-blurring correction amount and the movement amount of a vibration-isolating lens group for the correction of image blurring in the first numerical example to the eleventh numerical example (Examples 1 to 11). In Table 46, V1 lens group refers to vibration-isolating lens group, and V1 correction amount refers to vibration-isolating correction amount. The unit of the amount of movement is mm.

TABLE 46

|  | VI Lens Group | VI correction Amount | Wide-Angle End | Drive Amount Intermediate | Telephoto |
|---|---|---|---|---|---|
| Example 1 | G2A | ±0.40° | ±0.524 | ±0.677 | ±0.998 |
| Example 2 | G2A | ±0.40° | ±0.524 | ±0.693 | ±1.005 |
| Example 3 | B2 | ±0.40° | ±0.486 | ±0.647 | ±1.008 |
| Example 4 | B2, B3 | ±0.40° | ±0.274 | ±0.369 | ±0.567 |
| Example 5 | B1 | ±0.35° | ±0.678 | ±0.944 | ±1.154 |
| Example 6 | B2, B3 | ±0.35° | ±0.340 | ±0.504 | ±0.658 |
| Example 7 | G2B | ±0.35° | ±0.412 | ±0.655 | ±0.978 |
| Example 8 | A1, A2(AR) | ±0.28° | ±0.660 | ±0.872 | ±1.195 |
| Example 9 | B3 | ±0.28° | ±0.662 | ±0.783 | ±1.315 |
| Example 10 | B3 | ±0.28° | ±0.684 | ±0.925 | ±1.387 |
| Example 11 | A1, A2 (AR) B3 | ±0.28° ±0.28° | ±0.684 ±0.575 | ±1.011 ±0.917 | ±1.423 ±1.423 |

Table 47 presents values for respective conditional expressions (1) to (30) of the first numerical example to the first numerical example (Examples 1 to 11 indicated below).

TABLE 47

|  | Example 1 | Example 2 | Example 3 | Example 4 |
|---|---|---|---|---|
| Conditional Expression (1) | 1.07 | 0.91 | 0.75 | 0.75 |
| Conditional Expression (2) | 4.04 | 4.04 | 4.04 | 4.26 |
| Conditional Expression (3) | 1.03 | 1.08 | 1.20 | 1.90 |
| Conditional Expression (4) | 1.94 | 1.94 | 1.78 | 1.84 |
| Conditional Expression (5) | 0.37 | 0.40 | 0.62 | 0.76 |
| Conditional Expression (6) | −0.88 | −1.12 | −1.69 | 2.70 |
| Conditional Expression (7) | −0.40 | N/A | N/A | N/A |
| Conditional Expression (8) | 1.01 | N/A | N/A | N/A |
| Conditional Expression (9) | 0.31 | N/A | N/A | N/A |
| Conditional Expression (10) | N/A | 25.29 | N/A | N/A |
| Conditional Expression (11) | N/A | N/A | N/A | N/A |
| Conditional Expression (12) | N/A | N/A | N/A | 63.30 |
| Conditional Expression (13) | N/A | N/A | N/A | N/A |
| Conditional Expression (14) | N/A | N/A | N/A | N/A |
| Conditional Expression (15) | N/A | N/A | 27.23 | N/A |
| Conditional Expression (16) | N/A | N/A | N/A | N/A |
| Conditional Expression (17) | N/A | N/A | N/A | N/A |
| Conditional Expression (18) | 2.03 | 2.02 | 2.02 | 3.58 |
| Conditional Expression (19) | 1.35 | 1.28 | 1.37 | 1.63 |
| Conditional Expression (20) | −2.07 | −2.28 | −2.85 | −3.88 |
| Conditional Expression (21) | −0.94 | −0.81 | −0.59 | −0.58 |
| Conditional Expression (22) | −0.80 | −0.78 | −0.83 | −0.93 |
| Conditional Expression (23) | −0.71 | −0.68 | −0.79 | −0.81 |
| Conditional Expression (24) | −5.57 | −5.54 | −5.95 | −5.25 |
| Conditional Expression (25) | 0.56 | 0.55 | 0.54 | 0.55 |
| Conditional Expression (26) | 0.43 | 0.43 | 0.44 | 0.43 |
| Conditional Expression (27) | −0.82 | −0.82 | −0.78 | −0.92 |
| Conditional Expression (28) | 0.89 | 0.89 | 0.89 | 0.89 |
| Conditional Expression (29) | 0.66 | 0.59 | 0.61 | 0.68 |
| Conditional Expression (30) | −8.30 | 8.31 | −8.82 | −7.93 |

|  | Example 5 | Example 6 | Example 7 | Example 8 |
|---|---|---|---|---|
| Conditional Expression (1) | 1.40 | 0.74 | 0.84 | 0.70 |
| Conditional Expression (2) | 3.77 | 3.78 | 5.38 | 3.78 |
| Conditional Expression (3) | 0.90 | 2.40 | 3.60 | 1.21 |
| Conditional Expression (4) | 3.21 | 4.64 | 2.41 | 3.26 |
| Conditional Expression (5) | 0.36 | 0.51 | 0.61 | 0.50 |
| Conditional Expression (6) | −0.67 | −1.62 | −1.19 | −1.16 |
| Conditional Expression (7) | N/A | N/A | N/A | −0.40 |
| Conditional Expression (8) | N/A | N/A | N/A | 1.05 |
| Conditional Expression (9) | N/A | N/A | N/A | 0.33 |
| Conditional Expression (10) | N/A | N/A | N/A | N/A |
| Conditional Expression (11) | N/A | N/A | 60.47 | N/A |
| Conditional Expression (12) | N/A | 63.33 | N/A | N/A |
| Conditional Expression (13) | 31.67 | N/A | N/A | N/A |
| Conditional Expression (14) | 67.00 | N/A | N/A | N/A |
| Conditional Expression (15) | N/A | N/A | N/A | N/A |
| Conditional Expression (16) | N/A | N/A | N/A | N/A |
| Conditional Expression (17) | N/A | N/A | N/A | N/A |
| Conditional Expression (18) | 2.03 | 3.56 | 2.40 | 2.37 |
| Conditional Expression (19) | 1.51 | 1.30 | 0.97 | 2.26 |
| Conditional Expression (20) | −1.84 | −2.76 | 2.32 | −2.31 |
| Conditional Expression (21) | −2.01 | −2.02 | −1.66 | −1.72 |
| Conditional Expression (22) | −0.66 | −0.78 | −1.14 | −1.05 |
| Conditional Expression (23) | −0.42 | −0.43 | −0.46 | −1.12 |
| Conditional Expression (24) | −3.73 | −3.79 | −3.84 | −5.68 |
| Conditional Expression (25) | 0.63 | 0.55 | 0.43 | 0.44 |
| Conditional Expression (26) | 0.36 | 0.42 | 0.46 | 0.31 |
| Conditional Expression (27) | −0.46 | −0.59 | −0.60 | −0.64s |
| Conditional Expression (28) | 0.83 | 0.84 | 0.70 | 0.67 |
| Conditional Expression (29) | 1.32 | 1.30 | 0.85 | 0.71 |
| Conditional Expression (30) | −7.63 | −9.13 | −5.49 | −7.79 |

|  | Example 9 | Example 10 | Example 11 |
|---|---|---|---|
| Conditional Expression (1) | 0.59 | 0.60 | 1.35 |
| Conditional Expression (2) | 3.77 | 3.77 | 4.80 |
| Conditional Expression (3) | 3.62 | 4.08 | 0.73 |
| Conditional Expression (4) | 1.88 | 1.56 | 0.91 |
| Conditional Expression (5) | 1.06 | 1.10 | 0.68 |
| Conditional Expression (6) | −2.78 | −2.63 | −0.73 |
| Conditional Expression (7) | N/A | N/A | −0.48 |
| Conditional Expression (8) | N/A | N/A | 0.98 |
| Conditional Expression (9) | N/A | N/A | 0.33 |
| Conditional Expression (10) | N/A | N/A | N/A |
| Conditional Expression (11) | N/A | N/A | N/A |
| Conditional Expression (12) | N/A | N/A | N/A |
| Conditional Expression (13) | N/A | N/A | N/A |
| Conditional Expression (14) | N/A | N/A | N/A |
| Conditional Expression (15) | N/A | N/A | N/A |
| Conditional Expression (16) | 17.88 | 16.96 | 21.73 |
| Conditional Expression (17) | N/A | N/A | 1.09 |
| Conditional Expression (18) | 2.16 | 2.05 | 2.01(2AR) 2.01(B3) |
| Conditional Expression (19) | 2.36 | 2.29 | 2.32 |
| Conditional Expression (20) | −3.94 | −3.78 | −1.95 |
| Conditional Expression (21) | −1.06 | −1.08 | −1.00 |
| Conditional Expression (22) | −1.07 | −0.94 | −1.04 |
| Conditional Expression (23) | −1.14 | −0.90 | −1.22 |
| Conditional Expression (24) | −5.44 | −4.86 | −5.10 |
| Conditional Expression (25) | 0.45 | 0.49 | 0.41 |
| Conditional Expression (26) | 0.32 | 0.35 | 0.39 |
| Conditional Expression (27) | −0.60 | −0.49 | −0.64 |
| Conditional Expression (28) | 0.66 | 0.67 | 0.65 |
| Conditional Expression (29) | 0.90 | 1.28 | 1.09 |
| Conditional Expression (30) | −9.20 | −11.78 | −11.74 |

As found from Table 47, the first numerical example to the eleventh numerical example satisfy conditional expressions (1) to (30). As is clear from the longitudinal aberration diagrams and lateral aberration diagrams, various aberrations are relatively properly corrected.

Irrespective of fewer lenses constituting the focusing lens, the fluctuations in aberration with a change in shooting distance at both the short focal length end and the long focal length end can be reduced or eliminated, and can also be successfully corrected during the operation of the vibration isolation.

Even When a lens or a lens group having no substantial power is added to the zoom lens of the present embodiments, such a configuration may fall within the range of the present invention.

The zoom lens according to the embodiments of the present disclosure is not limited to the five-group zoom lens, the six-group zoom lens, or the eight-group zoom lens as described in the numerical examples above.

In the zoom lens according to the embodiments of the present disclosure, any surface may be aspherical surface or diffraction surface. Examples of aspherical surfaces include glass mold aspherical surfaces, ground aspherical surfaces directly formed on the lens surface, composite aspherical surfaces (hybrid aspherical surfaces) in an aspherical surface is provided on a resin layer applied on the lens surface, and plastic aspherical surfaces whose lens is made of resin material.

A digital camera (imaging device) 100 incorporating the zoom lens according to an embodiment of the present disclosure is described below with reference to FIGS. 89A and 89B, and 90.

Figure 89A:
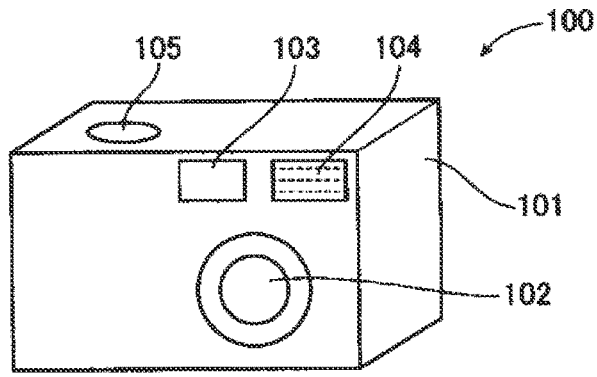
FIGS. 89A and 89B are illustrations of an image-capturing device incorporating the zoom lens according to an embodiment.
Figure 89B:
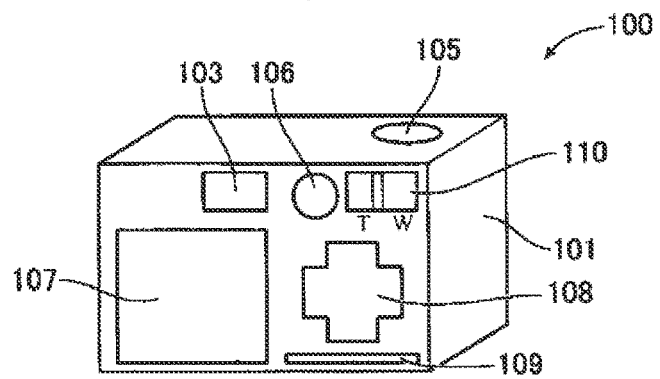
Figure 90:
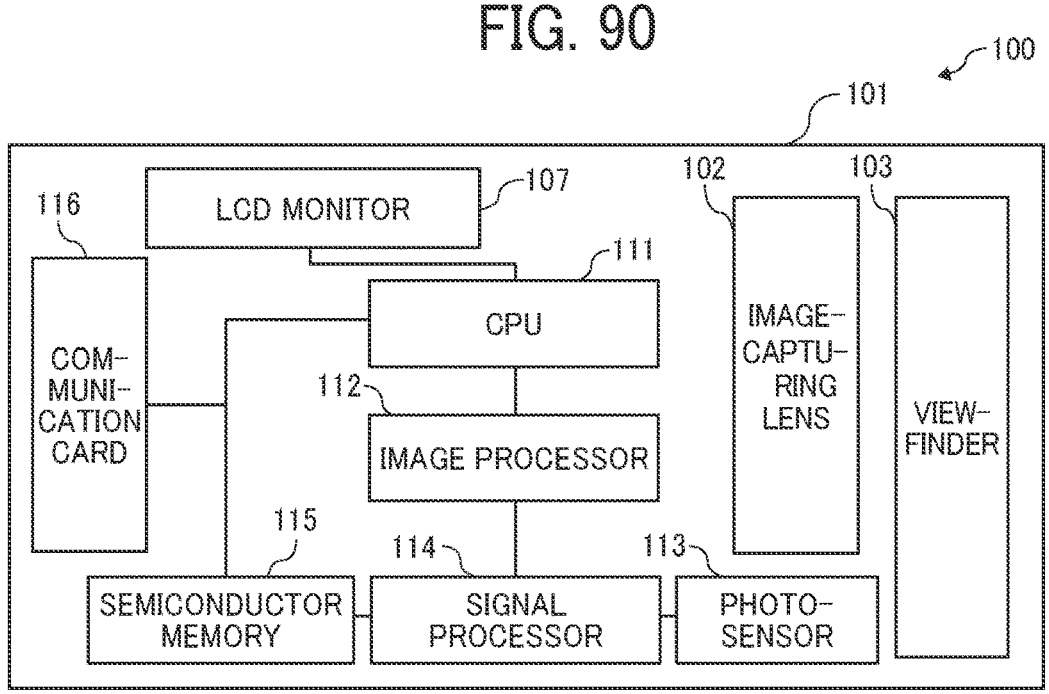
FIG. 90 is a block diagram of the imaging device are illustrations of an image-capturing device incorporating the zoom lens according to an embodiment.

As illustrated in FIGS. 89A and 89B, a digital camera 100 includes a camera body (housing) 101, an image-capturing lens 102, a viewfinder 103, a flash 104, a shutter release button 105, a power button 106, a liquid crystal display (LCD) monitor 107, an operation button 108, a memory card slot 109, and a zoom switch 110.

The camera body 101 houses the components of the digital camera 100. The image-capturing lens 102 is, for example, a unit in which the zoom lens according to an embodiment is incorporated into a lens barrel. The viewfinder 103 is a viewing window for determining the subject and the composition.

The flash 104 emits a flash when shooting at night or shooting in a dark place.

The shutter release button 105 is a physical switch for performing shooting with the digital camera 100.

The power button 106 is a physical switch for switching the power of the digital camera 100 on and off. The LCD monitor 107 displays, for example, an image captured by the digital camera 100.

The operation button 108 is a physical switch for setting a shooting mode or the like of the digital camera 100. The memory card slot 109 is a slot into which a memory card for storing, for example, an image captured by the digital camera 100 is inserted.

The zoom switch 110 is a physical switch for changing magnification (zooming) between the short focal-length end and the long focal-length end.

By operating the zoom switch 110, the distance between the lens groups of the zoom lens according to an embodiment is appropriately changed.

The digital camera 100 further includes a central processing unit (CPU) 111, an image processor 112, a photosensor 113, a signal processor 114, a semiconductor memory 115, and a communication card 116, which are functional components within the camera body 101.

The CPU 111 performs various types of arithmetic processing inside the digital camera 100.

The image processor 112 performs various types of image processing on an image captured by the digital camera 100.

The photosensor 113 takes in and receives external light that is used for photometric processing.

The signal processor 114 performs various types of signal processing such as a shooting instruction signal and an image processing signal.

The semiconductor memory 115 constitutes a temporary storage area for an image captured by the digital camera 100.

The communication card 116 is used for enabling wireless communication or the like with an external device.

The above-described configuration of the digital camera 100 is only one example, and various design changes are possible. In other words, the specific embodiments of the digital camera 100 has a certain latitude.

The zoom lens according to the embodiment may be applied to, instead of the above-described digital camera 100, for example, an interchangeable lens, a portable information terminal apparatus, a video camera, a film camera, an optical sensor, and a projection optical system (projector).

Figure 91:
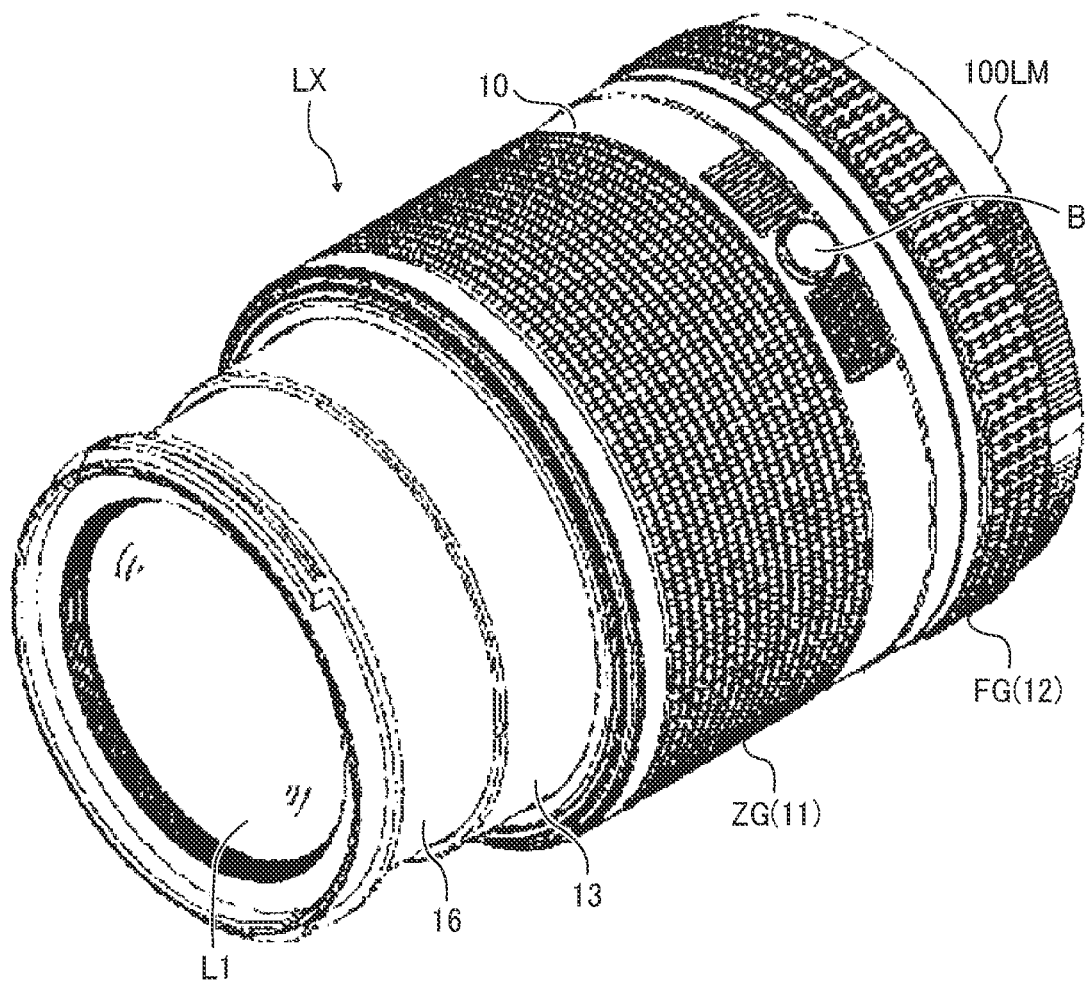
FIG. 91 is an illustration of an external appearance of a lens barrel incorporating the zoom lens according to an embodiment.

FIG. 91 is an illustration of an external appearance of a lens barrel LX (an image-capturing device) incorporating the zoom lens according to an embodiment.

The lens barrel LX is configured as, for example, a zoom interchangeable lens of a single-lens reflex camera.

The lens barrel LX includes a fixed lens barrel 10, and a lens mount 100LM is fixed to a rear surface of the fixed lens barrel 10.

On the peripheral surface of the fixed lens barrel 10, a zoom ring 11 is fitted in a front area in the direction of the optical axis, and a focus ring 12 is fitted in a rear area.

Rubber rings ZG and FG are fixed to each peripheral surface of the zoom ring 11 and the focus ring 12, which increases the texture during the operation.

The lens barrel LX is detachable from and attachable to a camera body due to the lens mount 100LM on the fixed lens barrel 10. Further, rotating the zoom ring 11 enables zooming from the long focus (telephoto) side to the short focus (wide) side.

By shifting the zoom ring 11 further to the short focal length side while pressing the retractable button B provided on the peripheral surface, the retracted state in which the length of the lens barrel LX is minimized can be set.

Focusing is automatically performed by a built-in motor, but manual focusing by rotating the focus ring 12 is also possible.

Inside the fixed lens barrel 10, an outer linear-motion cylinder 13 and an inner linear-motion cylinder are coaxially arranged with a gap in the cylinder radial direction are provided.

The rear end portions of the linear-motion cylinders are formed as a single integrated unit, and by engaging a cam groove on the zoom ring 11 with a linear groom in the direction of the optical axis on the fixed lens barrel 10, the linear-motion cylinders linearly moves together as a single integrated unit within the fixed lens barrel 10, with the rotation of the zoom ring 11.

A helicoid cylinder having a helicoid groove formed on the outer peripheral surface is fitted around the outer peripheral surface of the inner linear-motion cylinder.

The helicoid cylinder moves in the cylinder axial direction together with the inner linear-motion cylinder. Further, the helicoid cylinder cooperates with the zoom ring 11 such that the helicoid cylinder rotates around the cylinder axis on the peripheral surface of the inner linear-motion cylinder, with the rotation of the zoom ring 11.

A front linear-motion cylinder 16 is fitted between the helicoid cylinder and the outer linear-motion cylinder 13 in the radial direction.

The front linear-motion cylinder 16 is fitted into a helicoid groove of the helicoid cylinder, and is movable in the direction of the optical axis with the rotation of the helicoid cylinder. A lens L1 is supported by the front end of the front linear-motion cylinder 16.

The lens L1 in FIG. 91 is, for example, the lens (11A, 11B, 11C, 11D, 11E, 11F, 11G, 11H, 11I, 11J, 11K) closest to the object within the first lens group G1 of the zoom lens according to at least one embodiment.

Further, the lens barrel LX is provided with a component (for example, an ON-OFF switch for operating the vibration isolation) for exhibiting and assisting the function of the zoom lens according to an embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A zoom lens comprising, sequentially from an object side toward an image side:
    a first lens group having positive refractive power;
    a second lens group having negative refractive power; and
    a rear group,
    the second lens group consisting of, sequentially from the object side toward the image side:
    a second sub-first lens group having positive or negative power; and
    a second sub-second lens group having negative power,
    the second sub-second lens group consisting of, sequentially from the object side toward the image side:
    a positive second-first lens component;
    a negative second-second lens component; and
    a negative second-third lens component, wherein
    during zooming from a short focal length end to a long focal length end, a distance between the first lens group and the second lens group increases, and a distance between the second lens group and the rear group decreases, and
    a part of the second lens group is movable in a direction perpendicular to an optical axis during correction of image blurring.

2. The zoom lens according to claim 1, wherein the second lens group is stationary in a direction of the optical axis during the zooming from the short focal length end to the long focal length end.

3. The zoom lens according to claim 1, wherein the positive second-first lens component has a convex surface facing an image and closest to the image within the positive second-first lens component.

4. The zoom lens according to claim 1, wherein the second sub-first lens group includes one or more negative lens components, and
    wherein a negative lens component closest to an image among the one or more negative lens components has a concave surface facing the image and closest to the image within the negative lens component.

5. The zoom lens according to claim 1, wherein conditional expression (1) below is satisfied:

$$0 < H1\_2B/D2B < 2.3 \quad (1)$$

where
H1_2B denotes a distance between a refractive surface closest to an object within the second sub-second lens group and a front principal point of the second sub-second lens group, and
D2B denotes a distance along the optical axis between the refractive surface closest to the object within the second sub-second lens group and a refractive surface closest to an image within the second sub-second lens group.

6. The zoom lens according to claim 1, wherein conditional expression (2) below is satisfied:

$$2.5 < fT/fW \quad (2)$$

where
fT denotes a focal length of an entirety of the zoom lens focused on infinity at the long focal length end, and
fW denotes a focal length of the entirety of the zoom lens focused on infinity at the short focal length end.

7. The zoom lens according to claim 1, wherein the second sub-first lens group includes one or more negative lens components, and
    wherein when lenses of a negative lens component closest to an image among the one or more negative lens components through a lens closest to the image within the second sub-first lens group are defined as a second sub-third lens group, conditional expression (3) below is satisfied:

$$0.6 < f2AR/f2B < 20 \quad (3)$$

where
f2AR denotes a focal length of the second sub-third lens group, and
f2B denotes a focal length of the second sub-second lens group.

8. The zoom lens according to claim 1, wherein conditional expression (4) below is satisfied:

$$0.5 < B1\_RR/B3\_RF < 20 \quad (4)$$

where
B1_RR denotes a radius of curvature of a refractive surface closest to an image within the positive second-first lens component, and
B3_RF denotes a radius of curvature of a refractive surface closest an object within the negative second-third lens component.

9. The zoom lens according to claim 1, wherein conditional expression (5) below is satisfied:

$$0.1 < fB23\_Air/f2B < 1.5 \quad (5)$$

where
fB23_Air denotes a focal length of an air lens formed by a refractive surface closest to an image within the negative second-second lens component and a refractive surface closest to an object within the negative second-third lens component, and
f2B denotes a focal length of the second sub-second lens group.

10. The zoom lens according to claim 1, wherein conditional expression (6) below is satisfied:

$$-10 < fB1/f2B < -0.4 \quad (6)$$

where
fB1 denotes a focal length of the positive second-first lens component, and
f2B denotes a focal length of the second sub-second lens group.

11. The zoom lens according to claim 1,
wherein the second sub-first lens group includes one or more negative lens components and one or more positive lens components, and
wherein a negative lens component closest to an image among the one or more negative lens components and a positive lens component, which is closer to the image than and adjacent to the negative lens component, among the one or more positive lens components serve as a vibration-isolating lens group movable in the direction perpendicular to the optical axis to correct image blurring, and
wherein at least one of conditional expressions (7), (8), and (9) is satisfied:

$$-1.0 < fA1/fA2 < -0.01 \quad (7)$$

$$0.5 < A1\_RR/A2\_RF < 2.0 \quad (8)$$

$$0.001 < D2RF/D2FR < 0.6 \quad (9)$$

where
fA1 denotes a focal length of the negative lens component,
fA2 denotes a focal length of the positive lens component,
A1_RR denotes a radius of curvature of a refractive surface closest to an image within the negative lens component,
A2_RF denotes a radius of curvature of a refractive surface closest to an object within the positive lens component,
D2RF denotes a distance along the optical axis between the refractive surface closest to the image within the negative lens component and the refractive surface closest to the object within the positive lens component, and
D2FR denotes a distance along the optical axis between a refractive surface closest to the object within the negative lens component and a refractive surface closest to the image within the positive lens component.

12. The zoom lens according to claim 1,
wherein the second sub-first lens group includes one or more negative lens components,
wherein a negative lens component closest to an image within the one or more negative lens components is a cemented lens composed of a negative lens and a positive lens and is a vibration-isolating lens group movable in the direction perpendicular to the optical axis to correct image blurring, and
wherein conditional expression (10) below is satisfied:

$$10 < v\_A1N - v\_A1P \quad (10)$$

where
v_A1N denotes an Abbe number of the negative lens of the negative lens component, and
v_A1P denotes an Abbe number of the positive lens of the negative lens component.

13. The zoom lens according to claim 1,
wherein the second sub-second lens group as a whole is a vibration-isolating lens group movable in the direction perpendicular to the optical axis to correct image blurring, and
wherein conditional expression (11) below is satisfied:

$$45 < v\_BMAX \quad (11)$$

where
v_BMAX denotes largest Abbe number among negative lenses in the second sub-second lens group.

14. The zoom lens according to claim 1,
wherein the negative second-second lens component and the negative second-third lens component of the second sub-second lens group serve as a vibration-isolating lens group movable in the direction perpendicular to the optical axis to correct image blurring, and
wherein conditional expression (12) below is satisfied:

$$45 < v\_B23MAX \quad (12)$$

where
v_B23MAX denotes a larger Abbe number between a negative lens of the negative second-second lens component and a negative lens of the negative second-third lens component in the second sub-second lens group.

15. The zoom lens according to claim 1,
wherein the positive second-first lens component of the second sub-second lens group is a cemented lens composed of a negative lens and a positive lens and is a vibration-isolating lens group movable in the direction perpendicular to the optical axis to correct image blurring, and
wherein conditional expressions (13) and (14) below are satisfied:

$$10 < v\_B1P - v\_B1N \quad (13)$$

$$40 < v\_B1P \quad (14)$$

where
v_B1P denotes an Abbe number of the positive lens of the positive second-first lens component, and
v_B1N denotes an Abbe number of the negative lens of the positive second-first lens component.

16. The zoom lens according to claim 1,
wherein the negative second-second lens component of the second sub-second lens group is a cemented lens composed of a negative lens and a positive lens and is a vibration-isolating lens group movable in the direction perpendicular to the optical axis to correct image blurring, and
wherein conditional expression (15) below is satisfied:

$$10 < v\_B2N - v\_B2P \quad (15)$$

where
v_B2N denotes an Abbe number of the negative lens of the negative second-second lens component, and
v_B2P denotes an Abbe number of the positive lens of the negative second-second lens component.

17. The zoom lens according to claim 1,
wherein the negative second-third lens component of the second sub-second lens group is a cemented lens composed of a negative lens and a positive lens and is a vibration-isolating lens group movable in the direction perpendicular to the optical axis to correct image blurring, and
wherein conditional expression (16) below is satisfied:

$$10 < v\_B3N - v\_B3P \quad (16)$$

where
v_B3N denotes an Abbe number of the negative lens of the negative second-third lens component, and
v_B3P denotes an Abbe number of the positive lens of the negative second-third lens component.

18. The zoom lens according to claim 1,
wherein the second lens group includes:
a first vibration-isolating lens group; and
a second vibration-isolating lens group closer to an image than the first vibration-isolating lens group, each of the first vibration-isolating lens group and the second vibration-isolating lens group is movable in the direction perpendicular to the optical axis to correct image blurring, and wherein conditional expression (17) below is satisfied:

$$0.3 < |fV1|/|fV2| < 2.5 \qquad (17)$$

where fV1 denotes a focal length of the first vibration-isolating lens group, and fV2 denotes a focal length of the second vibration-isolating lens group.

19. A lens barrel comprising the zoom lens according to claim 1.

20. An image-capturing device comprising the zoom lens according to claim 1.

* * * * *